(12) United States Patent
Card et al.

(10) Patent No.: US 6,924,822 B2
(45) Date of Patent: Aug. 2, 2005

(54) MAGNIFICATION METHODS, SYSTEMS, AND COMPUTER PROGRAM PRODUCTS FOR VIRTUAL THREE-DIMENSIONAL BOOKS

(75) Inventors: Stuart Kent Card, Los Altos Hill, CA (US); Richard Carl Gossweiler, III, Sunnyvale, CA (US); Allison Gyle Woodruff, Foster City, CA (US); Jock Douglas MacKinlay, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 421 days.

(21) Appl. No.: 09/741,037

(22) Filed: Dec. 21, 2000

(65) Prior Publication Data

US 2003/0052900 A1 Mar. 20, 2003

(51) Int. Cl.[7] .................................................. G09G 5/00
(52) U.S. Cl. .................... 345/660; 345/715; 345/517
(58) Field of Search ................................. 345/660, 419, 345/619, 620; 707/102, 103, 104; 715/517–520, 764, 776

(56) References Cited

U.S. PATENT DOCUMENTS

| | | | |
|---|---|---|---|
| 5,632,009 A | 5/1997 | Rao et al. .................... 715/509 |
| 5,670,984 A | 9/1997 | Robertson et al. .......... 345/585 |
| 5,805,118 A | 9/1998 | Mishra et al. ................ 345/1.1 |
| 5,835,905 A | 11/1998 | Pirolli et al. .................... 707/3 |
| 5,838,326 A | 11/1998 | Card et al. ................... 345/775 |
| 5,847,709 A | 12/1998 | Card et al. ................... 345/850 |
| 5,859,637 A * | 1/1999 | Tidwell, II ................... 345/336 |
| 5,880,742 A | 3/1999 | Rao et al. .................... 345/440 |
| 5,883,635 A | 3/1999 | Rao et al. .................... 345/440 |
| 5,907,845 A * | 5/1999 | Cox et al. .................... 707/102 |
| 6,075,536 A | 6/2000 | Kunieda et al. ............. 345/848 |
| 6,085,202 A | 7/2000 | Rao et al. .................... 715/509 |
| 6,088,032 A | 7/2000 | Mackinlay ................... 345/848 |

OTHER PUBLICATIONS

Kikuchi et al., User Interface for a Digital Library to Support Construction of a "Virtual Personal Library", Proceedings of MULTIMEDIA, 1996 IEEE, pp. 429–432.*

Anderson et al., *Spread of Activation*, Journal of Experimental Psychology: Learning, memory, and Cognition 1984, vol. 10., No. 4, pp 791–797.

Bier et al., *A Taxonomy of See–Through Tools*, Proceedings CHI '94, Boston, MA, 1994, pp 358–364.

Card et al., *Catalogues: A Metaphor for Computer Application Delivery*, Human–Computer Interaction—INTERACT '87, Elsevier Science Publishers (North–Holland), pp 959–963 (1987).

(Continued)

*Primary Examiner*—Phu K. Nguyen
(74) *Attorney, Agent, or Firm*—Finnegan, Henderson Farabow, Garrett & Dunner LLP

(57) ABSTRACT

A system is described for displaying images of a virtual three-dimensional book having one or more virtual pages. The system comprises a display system capable of executing a display program wherein images of the virtual three-dimensional book are produced on the display system. The display system may include a magnification function producing a virtual magnifier moveable over the virtual pages. The display system may also include a the "stretchy page" display method wherein one section of the page is directly magnified, while other adjacent sections may be directly magnified in a horizontal or vertical direction, but not both directions. Moreover, a virtual page may also be tilted about a central axis of the virtual page to accommodate viewing of a desired section on the display system. Finally, a computer program product comprising a computer usable medium having computer readable code embodied therein for producing images of a virtual three-dimensional book is also disclosed.

36 Claims, 52 Drawing Sheets

OTHER PUBLICATIONS ard et al., *The WebBook and the Web Forager: An Information Workspace for the World–Wide Web*, CHI '96 Conference Proceedings, Association for Computing Machinery, 1996 10 pgs.

Cummings et al., *University Libraries and Scholarly Communication: Study Prepared for the Andrew W. Mellon Foundation*, Chapter 9, Nov. 1992, 16 pgs.

Egan et al., *Formative Design–Evaluation of SuperBook*, ACM Transactions on Information Systems, vol. 7, No., 1, Jan. 1989, pp 30–57.

Furnas, G.W., *The Fisheye view: a new look at structured files*, Bell Laboratories Technical Memorandum #81–11221–9, Oct. 12, 1981, 19 pgs.

Greenberg et al., *Using Distortion–Oriented Displays to Support Workspace Awareness*, Research Report 96/581/01, Department of Computer Science, University of Calgary, Nov. 1996, 16 pgs.

Hubberman et al., *Phase Transitions in Artificial Intelligence Systems*, Elsevier Science Publishers B.V. (North–Holland) 1987, pp 155–170.

Kay et al., *Personal Dynamic Media*, IEEE Computer, Mar. 1977, pp 31–40.

Keahey et al., *Nonlinear Magnification Fields*, Proceedings of the IEEE Symposium on Information Visualization, IEEE Visualization, Oct. 1997, 12 pgs.

Keahey, T. Alan, *The Generalized Detail–in–Context Problem*, Proceedings of IEEE Visualization '98, Information Visualization Symposium, Oct. 1998, 10 pgs.

Leung et al., *A Review and Taxonomy of Distortion–Oriented Presentation Techniques*, ACM Transactions on Computer–Human Interaction 1, No. 2, pp 126–160 (1994).

Moll–Carrillo et al., *Articulating a Metaphor Through User Centered Design*, CHI '95, ACM Conference on Human Factors in Software, ACM Press: New York, pp 566–572.

Mulvany, Nancy C., *What's Going On in Indexing?*, ACM Journal of Computer Documentation, May 1997, 8 pgs.

Nation et al., *Visualizing Websites Using a Hierarchical Table of Contents Browser: WebTOC*, Proceedings of Designing for the Web: Practices and Reflections, Denver, Jun. 12, 1997, 13 pgs.

Pirolli et al., *Information Foraging*, Psychological Review, vol. 106, No. 4, 1999, pp 643–675.

Rao et al., *The Table Lens: Merging Graphical and Symbolic Representations in an Interactive Focus ×Context Visualization for Tabular Information*, Proceedings of the ACM SIGCHI Conference on Human Factors in Computing Systems, Boston, MA, 1994, pp 1–7.

Robertson et al., *The Document Lens*, Proceedings of UIST 93, pp 101–108 (1993).

Gheel et al., *Data and Metadata for Finding and Reminding*, Information Visualization, 1999 Proceedings. 1999 IEEE International Conference; London, UK, Jul. 14–16, 1999, Los Alamitos, CA, Jul. 14, 1999, pp. 446–451.

* cited by examiner

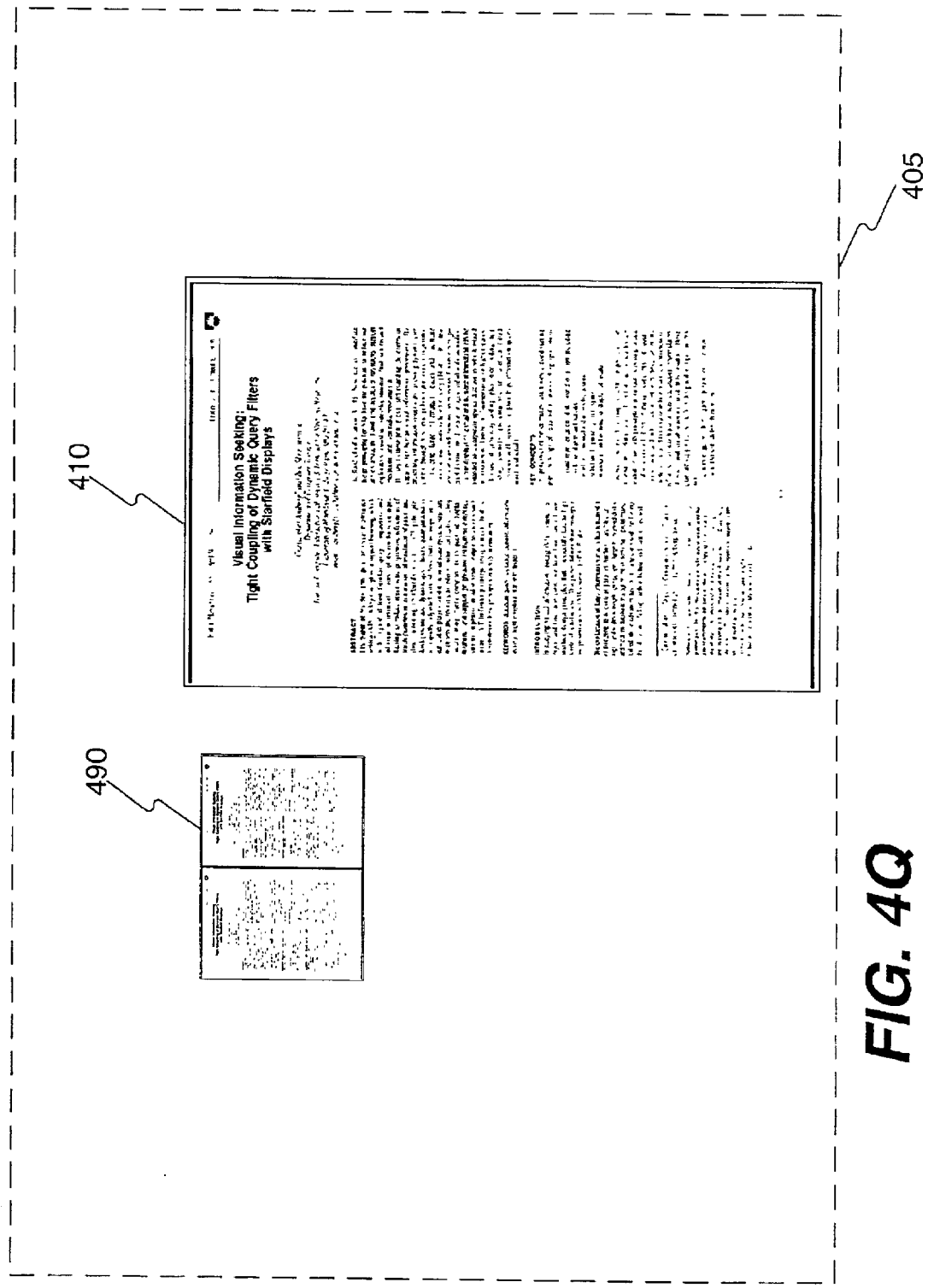

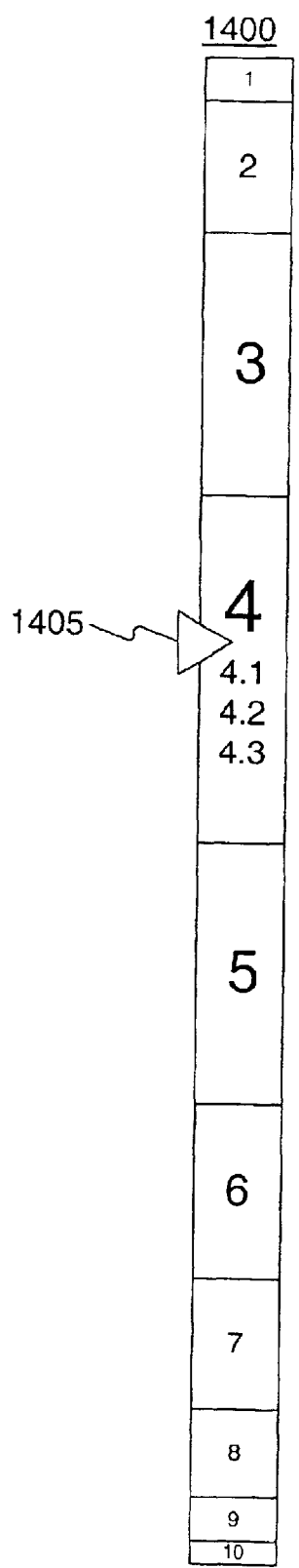
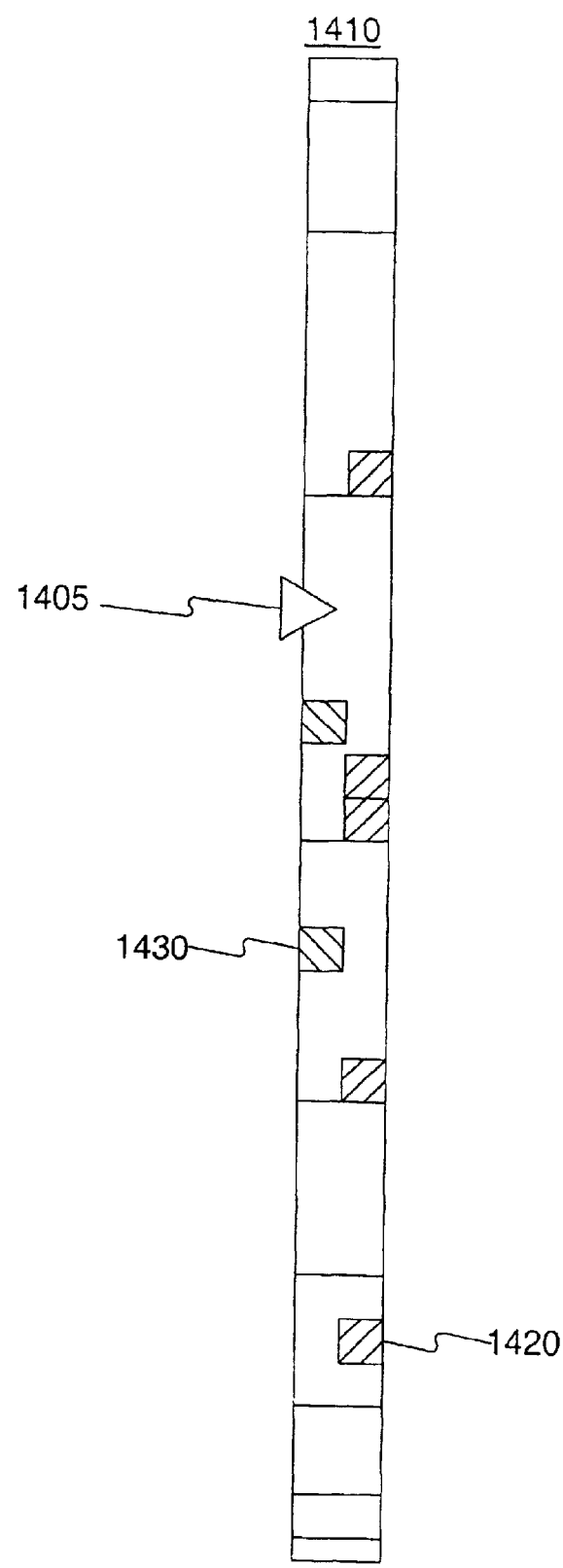
FIG. 14A  FIG. 14B

1700
| | |
|---|---|
| 1720 | 1740 |
| 1710 | 1750 |
| 1730 | 1760 |
FIG. 17A
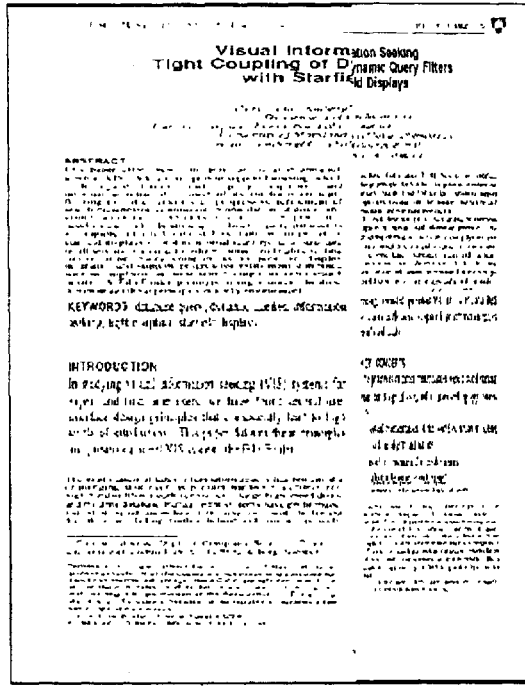
FIG. 17B
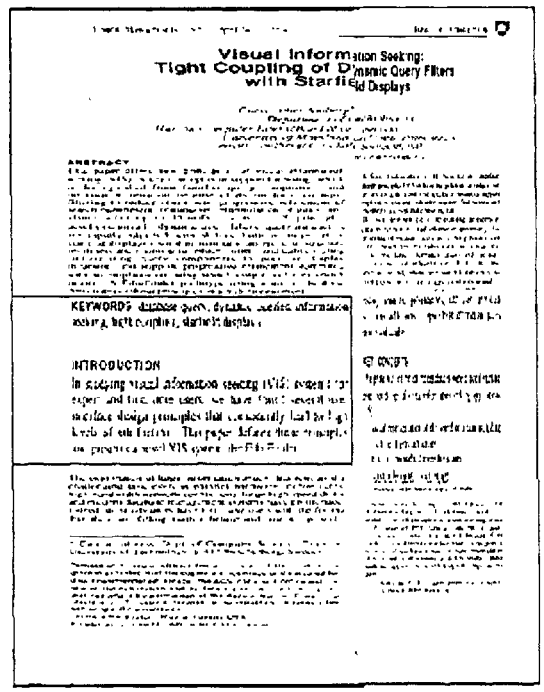
FIG. 17C

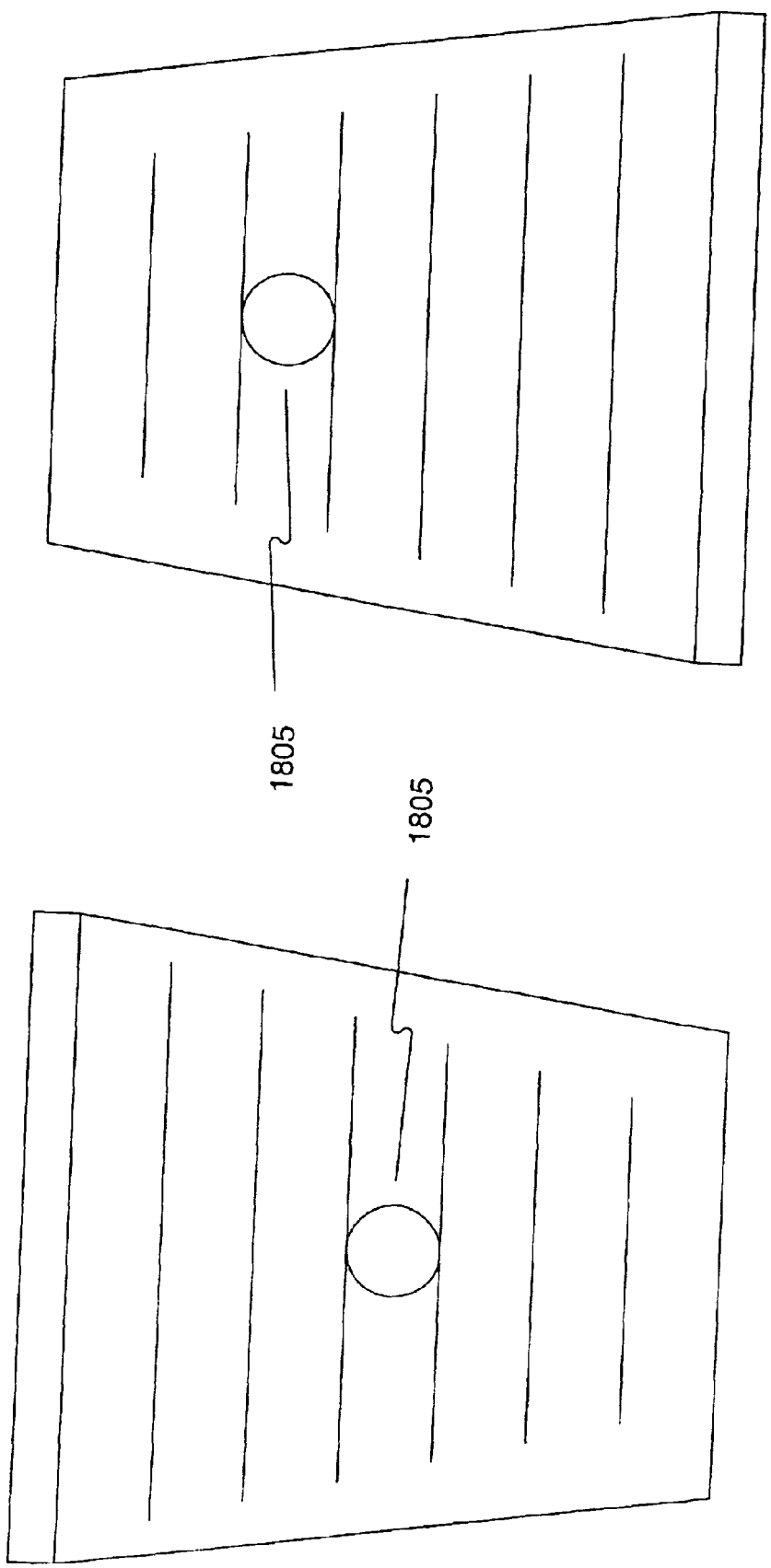

2000

INDEX ⎯ 2010 fisheye views algorithms ⎯ 2020
    for fisheye views, 327–329
clustering, fisheye views from,
    197–199
Degree Of Interest (DOI)
    functions
        fisheye views 311, 314–315,
        316, 317, 318, 327, 328–
        329, 354–355
    Table Lens, 344, 345
    visual transfer functions and
        display levels, 341–342
distortion-oriented presentation
    techniques, 350–366
    Bifocal Display (bifocal lens),
        354, 363
    fisheye views 354–355
    fisheye views graphical, 356–
        357, 366
    hybrid techniques and
        application domains, 361–
        362
    implementation issues, 360–
        361
    mathematical derivation of
        transformation and
        magnification functions,
        362–366
    nondistortion-oriented
        techniques vs., 350–351
    overview, 341, 351–352, 362
    performance issues, 360

Perspective Wall, 355–356,
    363–366
polyfocal projection, 352–353,
    363
taxonomy of techniques, 350,
    357–359
unified theory for, 359–360
fisheye views 311–330. *See also*
focus + context
    algorithms, 327–329
    alternative methods, 313
    automatic multifovea fisheye,
        329
    bifocal lens vs., 331
    from clustering (SemNet), 197–
        199
    components, 315–316
    convexity condition, 328
    count-until structure, 323, 326
    Degree Of Interest (DOI)
        functions, 311, 314–315,
        316, 317, 318, 327, 328–
        329, 354–355
    of Euclidean space, 327
    everyday examples, 311
    fictitious subway network of
        Hollands et al., 355
    fisheye definition, 316
    Furnas' report versions, 311
    graphical, 326, 356–357, 366
    of hierarchically structured
        sequential files, 319, 321–
        326

INDEX    ⌐2200       ⌐2210 fisheye views      space algorithms    ⌐2230
   for fisheye views, 327–329
clustering, fisheye views from, 197–199
Degree Of Interest (DOI) functions
   fisheye views 311, 314–315,
   316, 317, 318, 327, 328–
   329, 354–355
     visual transfer functions and
       display levels, 341–342
distortion-oriented presentation
   techniques, 350–366
   Bifocal Display (bifocal lens),
     354, 363
   fisheye views 354–355
   fisheye views graphical, 356–
     357, 366
   Degree Of Interest (DOI)
     functions, 311, 314–315,
     316, 317, 318, 327, 328–
     329, 354–355
   of Euclidean space 327
   fisheye definition, 316
   graphical, 326, 356–357, 366
   magnification function, 366
focus + context, 307–408. *See*
    *also* bifocal lens; fisheye
    views hyperbolic browser;
visual transfer functions
   bifocal lens, 331–340
     combining distortion and
       filtering, 308 distortion, 308–309
distortion-oriented
   presentation techniques.
   341, 350–366
fisheye views 311–330
focus/context space ratio, 332
hyperbolic browser, 381–408
micro-macro readings, 307
Table Lens, 32, 341, 343–349
3D distortion viewing, 342, 368–379
visual transfer functions. 341–379
zoom factor, 331–332
graphs
   graphical fisheye views 326,
     356–357, 366
   Level of Detail (LOD)
     in fisheye views 311, 315–316
   magnification and, 342
size. *See also* scale; zooming
   fisheye view size issues, 329
space ⌐2240
   bifocal lens focus/context
     space ratio, 332
   in Document Lens, 35
   fisheye views of Euclidean
     space, 327
   focus/context space ratio, 332
   3D point perspective, fisheye
     views from, 199–200
   trees, 149–186. *See also*
     hyperbolic browser; PDQ

*FIG. 22*

TABLE OF CONTENTS 2310

2300

Preface 000
1 Information Visualization
2 Space
2.1 Physical Data 000
2.2 1D, 2D, 3D 000
2.3 Multiple Dimensions >3 000
2.4 Trees 000
2.5 Networks 000
3 Interaction
3.1 Dynamic Queries 000
3.2 Interactive Analysis 000
3.3 Overview + Detail 000
4 Focus + Context
4.1 Fisheye Views 000
4.2 Bifocal Lens 000
4.3 Visual Transfer Functions 000
4.4 Alternate Geometry 000
5 Data Mapping Document Visualization
5.1 Text in 1D 000
5.2 Text in 2D 000
5.3 Text in 3D 000
5.4 Text in 3D + Time 000
6 Infosphere, Workspace, tools, objects
6.1 Internet and Infosphere 000
6.2 Information Workspaces 000
6.3 Visually-Enhanced Objects 000
7 Using Vision to Think
8 APPLICATIONS AND IMPLICATIONS
9 CONCLUSION
Bibliography 000
Index 000

*FIG. 23A*

TABLE OF CONTENTS

Preface 000
1 Information Visualization
2 Space
3 Interaction
4 Focus + Context
4.1 Fisheye Views
 The FISH-EYE View: A New Look at Structured Files
 G. W. Furnas
4.2 Bifocal Lens
 Data Base Navigation: An Office Environment for the Professional
 R. Spence, M. D. Apperley
4.3 Visual Transfer Functions
 The Table Lens: Merging Graphical and Symbolic Representations in an Interactive Focus + Context Visualization for Tabular Information
 R. Rao, S. K. Card
 A Review and Taxonomy of Distortion-Oriented Presentation Techniques
 Y. K. Leung, M. D. Apperley
 Extending Distortion Viewing from 2D to 3D
 M. Shedagh, T. Carpendale, D. J. Cowperthwaite, F. David Fracchia
4.4 Alternate Geometry
 The Hyperbolic Browser: A Focus + Context Technique for Visualizing Large Hierarchies
 J. Lamping, R. Rao
5 Data Mapping: Document Visualization
6 Infosphere, Workspace, tools, objects
7 Using Vision to Think
8 APPLICATIONS AND IMPLICATIONS
9 CONCLUSION
Bibliography 000
Index 000

| TABLE OF CONTENTS | 2410 |
|---|---|
| fisheye | |

Preface ............................................................................................................................. 000

1. Information Visualization ............................................................................................. 000

2. Space .......................................................................................................................... 000

3. Interaction ................................................................................................................... 000

3.3. Overview + Detail .................................................................................................. *000*
 LifeLines: Visualizing Personal Histories
 Browsing Hierarchical Data with Multi-Level Dynamic Queries and Pruning 4. Focus + Context ......................................................................................................... 000

4.1. Fisheye Views — 2420 .......................................................................................... *000*
 The FISHEYE View: A New Look at Structured Files
   G. W. Furnas

4.2. Bifocal Lens ........................................................................................................... *000*
 Data Base Navigation: An Office Environment for the Professional

4.3. Visual Transfer Functions ..................................................................................... *000*
 The Table Lens: Merging Graphical and Symbolic Representations in
   an Interactive Focus + Context Visualization for Tabular Information
 A Review and Taxonomy of Distortion-Oriented Presentation Techniques
 Extending Distortion Viewing from 2D to 3D

4.4. Alternate Geometry ............................................................................................... *000*
 The Hyperbolic Browser: A Focus + Context Technique for Visualizing
 Large Hierarchies 5. Data Mapping: Document Visualization .................................................................... 000

5.1. Text in 1D ............................................................................................................... *000*
 SeeSoft—A Tool for Visualizing Line Oriented Software Statistics 6. Infosphere, Workspace, tools, objects ........................................................................ 000

6.2. Information Workspaces ....................................................................................... *000*
 The Information Visualizer: An Information Workspace
 Pad++: A Zooming Graphical Interface for Exploring Alternative Interface Physics

6.3. Visually-Enhanced Objects ................................................................................... *000*
 The Document Lens

7. Using Vision to Think .................................................................................................. 000
 The Cost-of-Knowledge Characteristic Function: Display Evaluation for
 Direct-Walk Dynamic Information Visualizations 8. APPLICATIONS AND IMPLICATIONS ..................................................................... 000

9. CONCLUSION ............................................................................................................ 000
 Bibliography ................................................................................................................ 000
   Index 000

MAGNIFICATION METHODS, SYSTEMS, AND COMPUTER PROGRAM PRODUCTS FOR VIRTUAL THREE-DIMENSIONAL BOOKS

RELATED APPLICATIONS

The following identified U.S. patent applications are relied upon and are incorporated by reference in their entirety in this application:

U.S. patent application Ser. No. 09/741,036, entitled "METHODS, SYSTEMS, AND COMPUTER PROGRAM PRODUCTS FOR THE DISPLAY AND OPERATION OF VIRTUAL THREE-DIMENSIONAL BOOKS," filed on the same date herewith by Stuart Card, et al.;

U.S. patent application Ser. No. 09/741,035, entitled "INDEXING METHODS, SYSTEMS, AND COMPUTER PROGRAM PRODUCTS FOR VIRTUAL THREE-DIMENSIONAL BOOKS," filed on the same date herewith by Stuart Card, at al.;

U.S. patent application Ser. No. 091741,034, entitled "NAVIGATION METHODS, SYSTEMS, AND COMPUTER PROGRAM PRODUCTS FOR VIRTUAL THREE-DIMENSIONAL BOOKS," filed on the same date herewith by Stuart Card, et al.; and U.S. patent application Ser. No. 09/741,038, entitled "METHODS, SYSTEMS, AND COMPUTER PROGRAM PRODUCTS FOR DISPLAY OF INFORMATION RELATING TO A VIRTUAL THREE-DIMENSIONAL BOOK," filed on the same date herewith by Stuart Card, et al.

FIELD OF THE INVENTION

The present invention relates to the field of image display systems, and, in particular, user interfaces for the display and operation of large-scale informational sources, such as hypertext, three-dimensional books, databases, and other repositories of information.

BACKGROUND OF THE INVENTION

The ability of users to access and interact with information in electronic form (i.e., the reading of, manipulation of, and navigation through data) gains ever-increasing importance as the volume of accessible information increases. Electronic information is generally stored in the form of documents that are displayed to the user upon request. Users or readers of information must accustom themselves to the controls for accessing and interacting with the electronic information.

The documents accessed by a user may include documents created by a user via a text-editing computer program such as a word processor. In addition, documents may also be scanned into a computer resulting in an electronic version of a paper document. The scanning operation may include the optical character recognition of the document so that both the graphical information (digitized images of the pages) and contextual information (a text file of the document) from the document may be stored together or otherwise linked. Electronic documents are also widely available over the Internet via the World Wide Web, among other electronic document sources. Documents may then be displayed with a display system, such as with a computer having a monitor, or other similar display devices, for example.

A typical method of displaying an electronic document is to represent the document as a continuous scroll with an associated scroll-bar for advancing the displayed representation. Most word processing programs and Web browsers utilize this scroll metaphor for displaying electronic information. The display of electronic documents as a continuous scroll, in the conventional manner, may possess a number of deficiencies in displaying certain types of documents. For example, users may have difficulty accessing and interacting with information when a conventional scroll is applied to a large document.

Another metaphor for displaying electronic information is that of a three-dimensional book. U.S. Pat. Nos. 5,838,326 and 5,847,709 to Card et al., which are expressly incorporated herein by reference, disclose a program for displaying a document workspace for interacting with electronic documents in the form of three-dimensional books. The purpose of the document workspace is to allow a large number of document objects to be displayed together (mitigating the limitations of the small screen space) in order to support information-intensive activities. Interaction with pages is similar to the functionality of a World Wide Web browser. The design aims to provide very rapid access to a small number of pages, smoothly integrated with slower access to a large number.

An exemplary document workspace is illustrated with reference to FIG. 1. The document workspace is arranged hierarchically, based on interaction rates, into three main levels: a Focus Space (for the document objects in active use), Immediate Memory Space (for document objects in use), and Tertiary Space (for document objects not in use). In FIG. 1, a document object 5 is in the focus space. The immediate memory space comprises a "desk" 10 and an area behind the focus space. The desk 10 may also contain document objects, e.g., document object 15.

The tertiary space is where document objects may be positioned when they are not in use. For example, document objects that are used for reference purposes are placed in the tertiary space. Referring to FIG. 1, the tertiary space is represented as a bookcase 20 includes document objects 30 and 35, for example.

If the user "touches" one of documents in bookcase 20, it will automatically "fly" to the focus space. Simultaneously, any document object then in the focus space will fly to a position in the immediate space. The "flying" of objects is an animation which shows the movement of objects from one space to another. The user is thus able to access information from the plurality of displayed document objects by bringing the document into the focus space. The user may manipulate the positioning and view of the documents through any known method, for example, via a drag and drop operation.

As used herein, a document object is any entity that can be manipulated in a document workspace. A document object contains two basic types of information: content information and display/manipulation information. The content information refers to the text and image data for the underlying document. The display/manipulation information refers to data defining how the text and image data is to be presented to the user.

Known systems have been relatively successful in displaying books having a small number of pages. However, the display of larger books containing hundreds of pages or more poses challenges in how to interact with these large documents.

SUMMARY OF THE INVENTION

The present invention discloses systems and computer program products for improving the ability of users to interact with electronic documents. Many of these improvements are described with respect to large-scale books containing many pages of information. However, the features of the disclosed invention are also applicable to smaller documents, as well as forms of information other than books.

The present invention comprises a system for displaying images of a virtual three-dimensional book having one or more virtual pages. The system comprises a display system capable of executing a display program. Images of the virtual three-dimensional book are produced on the display system.

A magnification function provides for a virtual magnifier moveable over the virtual pages. The virtual magnifier may comprise a central region of direct magnification and one or more transition regions transitioning from direct magnification to no magnification. Such a virtual magnifier may substantially define a virtual pyramidic solid.

The display system may also include another magnification function known as the "stretchy page" display method. With this method, one section of the page is directly magnified, while other adjacent sections may be directly magnified in a horizontal or vertical direction, but not both directions. The magnification of the page thus comprises a piecewise step function along any horizontal or vertical axis of the page.

A virtual page may also be tilted about a central axis of the virtual page to accommodate viewing of a desired section on the display system. In this way, a portion of the page tilted toward the surface of the display becomes easier to read.

Finally, a computer program product comprising a computer usable medium is also described. The computer usable medium has computer readable code embodied therein for producing images of a virtual three-dimensional book. The computer readable code may comprise various functions described with the display system of the instant invention.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIGS. 14A and 14B show two exemplary scroll bar according to the invention.

FIGS. 17A–17C show an exemplary page having warped magnification according to the invention.

FIGS. 18A and 18B show an exemplary method of displaying a page to a user according to the invention.

FIG. 20 shows an exemplary index page created using a single search term according to the invention.

FIG. 22 shows an exemplary index page created using two search terms according to the invention.

FIGS. 23A and 23B show an exemplary table of contents page before and after a user interacts with the page according to the invention.

FIG. 24 shows an exemplary table of contents page created using a single search term according to the invention.

DESCRIPTION OF THE PREFERRED EMBODIMENTS

Figure 1:
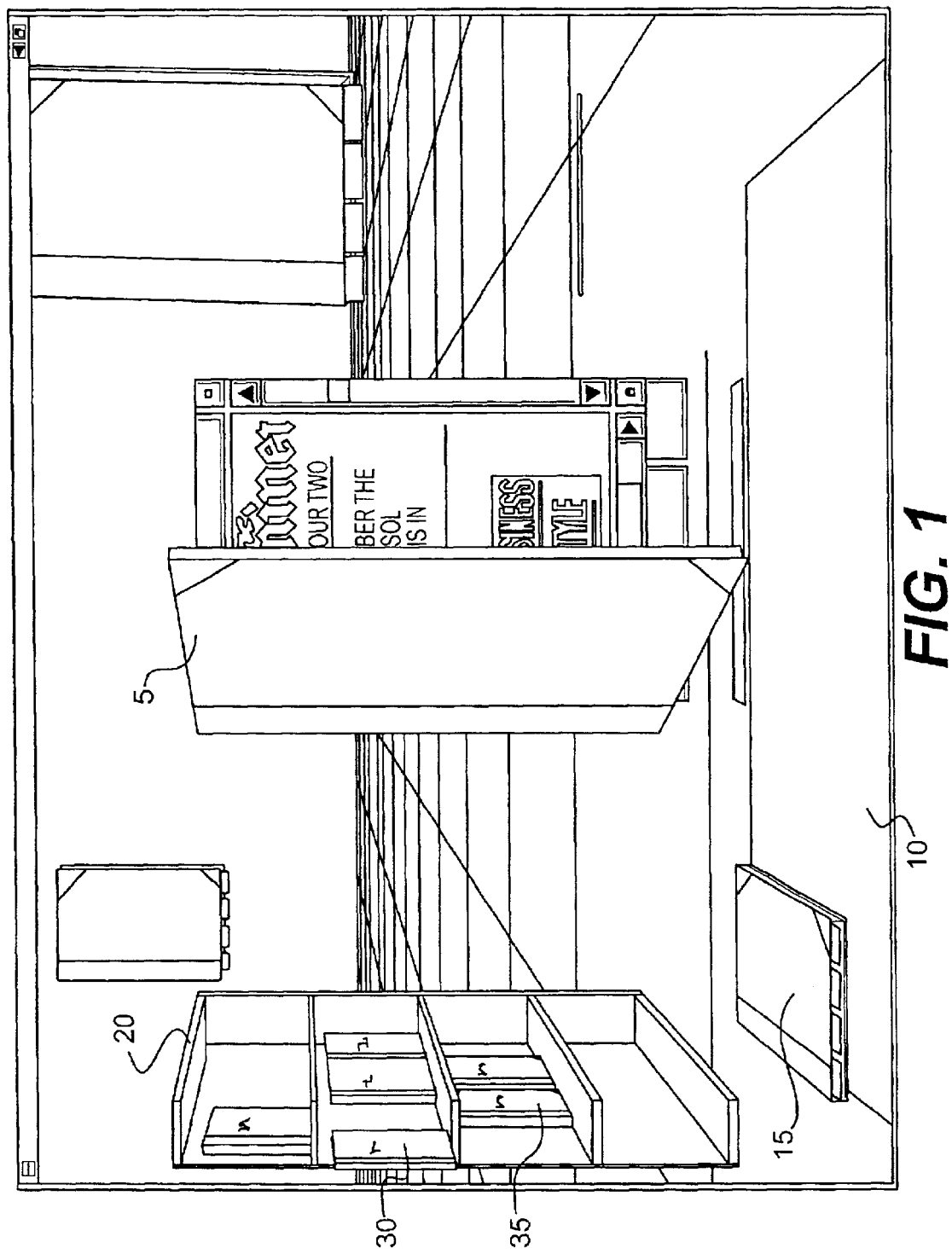
FIG. 1 is an image of an exemplary interface for viewing a three-dimensional book according to the invention.

The present invention represents a number of advances by the inventors of this application over and including work previously performed and filed as patent applications. The following patents and patent applications are expressly hereby incorporated by reference in this application: U.S. Pat. No. 5,632,009 entitled "Method and System for Producing a Table Image Showing no Direct Data Representation", U.S. Pat. No. 5,670,984 entitled "Image Lens"; U.S. Pat. No. 5,835,905 entitled "System for Predicting Documents Relevant to Focus Documents by Spreading Activation Through Network Representations of a Linked Collection of Documents"; U.S. Pat. No. 5,838,326 entitled "System for Moving Document Objects in a 3-D Workspace"; U.S. Pat. No. 5,847,709 entitled "3-D Document Workspace with Focus, Immediate and Tertiary Spaces"; U.S. Pat. No. 5,880,742 entitled "Spreadsheet Image Showing Data Items as Indirect Graphical Representations"; U.S. Pat. No. 5,883,635 entitled "Producing a Single-image View of a Multi-Image Table using Graphical Representations of the Table Data"; U.S. Pat. No. 6,085,202 entitled "Method and System for Producing a Table Image Having Focus and Context Regions"; and U.S. patent application Ser. No. 09/488,563 entitled "A Medium Containing Information Gathered from Material Including a Source and Interface for Graphically Displaying the Information."

Reference will now be made in detail to the present exemplary embodiments of the invention. Wherever possible, the same reference numbers will be used throughout the drawings to refer to the same or like parts.

Systems and methods for displaying images of a virtual three dimensional book can be implemented on any suitable display system. In a preferred embodiment, the images can be displayed using a Silicon Graphics "Reality Engine$^2$" computer and a monitor or using a personal computer (with or without a graphics accelerator) and a monitor, for example. However, one skilled in the art could utilize any display system capable of executing a computer program product in accordance with the present invention. As used herein, the word "display" may comprise an entire display area, a bounded and/or fractional portion of a display area, or an area defined over more than one display.

It is convenient to use a book metaphor for describing the display of electronic documents. The three-dimensional book metaphor mimics the aspects of physical books to provide a feeling of familiarity to the user. The metaphor, however, becomes a limitation on the ability of the user to fully interact with the document. For example, a user may desire to view more than the two facing pages that would be available when reading a physical book. A related problem is that small computer display sizes limit the ability of the user to simultaneously interact with more than one page.

A first solution to the multiple page viewing limitation is to modify the book metaphor to permit the user to "slide-out" pages from the book. The term "slide-out" as used here only relates to the display of the virtual book Thus, "sliding-out" a virtual page only serves to display that virtual page in a different position on the computer display separate from the visual representation of the rest of the virtual three-dimensional book. In this way, "sliding-out" does not denote the removal of data associated with a virtual page from its logical order in the electronic representation of a virtual three-dimensional book. A "slide-out" page will still appear in the electronic representation of the virtual three-dimensional book despite the fact it may appear separately from the virtual three-dimensional book on the display.

Figure 2:
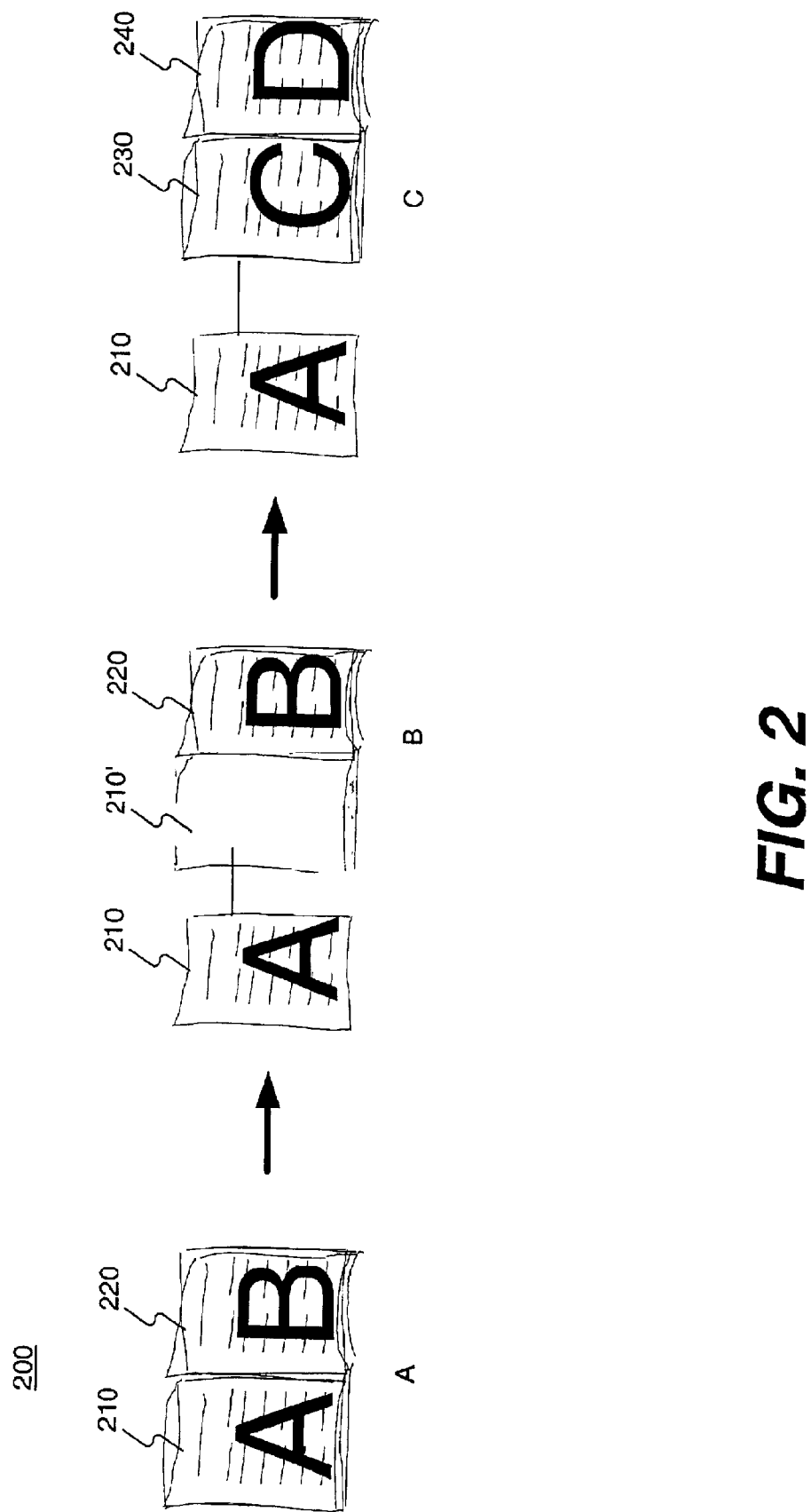
FIGS. 2A–2C are diagrams of the process of creating a slide-out page according to the invention.

FIG. 2A shows a virtual three-dimensional book 200 having two facing pages 210 and 220. The facing pages 210 and 220 may be constructed by, for example, mapping a bit map of an image of the pages from memory onto a virtual object comprised of triangular facets. The process of using a bit map to map texture onto a virtual object is well known in the art and will not be further discussed here.

The slide-out process is carried out by a user by, for example, selecting a page 210 and dragging it out of the book. The process can be shown as the page simply appearing outside the book or by animating an action such as a page being slid-out and placed outside the book. As shown in FIG. 2B, once page 210 is outside the book, the image of the book may be modified by either showing a copy of page 210 in a differentiated manner, for example, as gray or colored text or image 210', or by showing the book as if page 210 were no longer part of the book, i.e., by showing the previous page. After page 210 has been slid out, as shown in FIG. 2C, the user can then advance to the next page to reveal pages 230 and 240, while keeping page 210 in view.

The slide-out page metaphor may also be applied to other user interfaces for information displays beyond three-dimensional books. For example, a spreadsheet program may include the slide-out page functionality to allow a user to slide out worksheets from a workbook in a fashion analogous to sliding out virtual pages from a virtual three-dimensional book. Similarly, the slide-out page may be used to manipulate individual presentation slides in a presentation graphics program. These and other such combinations and permutations of the slide-out metaphor as applied to user interfaces are within the scope of the present invention.

A second solution to the multiple page viewing limitation is to modify the representation of the book. While the representation of an electronic document in the three-dimensional book format provides a visually pleasing and familiar context for the reader, a format with two facing pages simultaneously in view (for example, pages 210 and 220 of FIG. 2A) may dominate too much of the available display space. Therefore, instead of showing both facing pages in a full-on view, the three-dimensional book 200 may be represented as a rocker book 300 as shown in FIG. 3A. In the rocker book format, a page 310 is shown generally as a plane parallel to the surface of the display while another page 320 is represented as being tilted at an angle toward the user. The data comprising page 320 are mapped onto the tilted page, thereby providing a view of at least some of the information contained therein to provide context to the user.

Figure 3B:
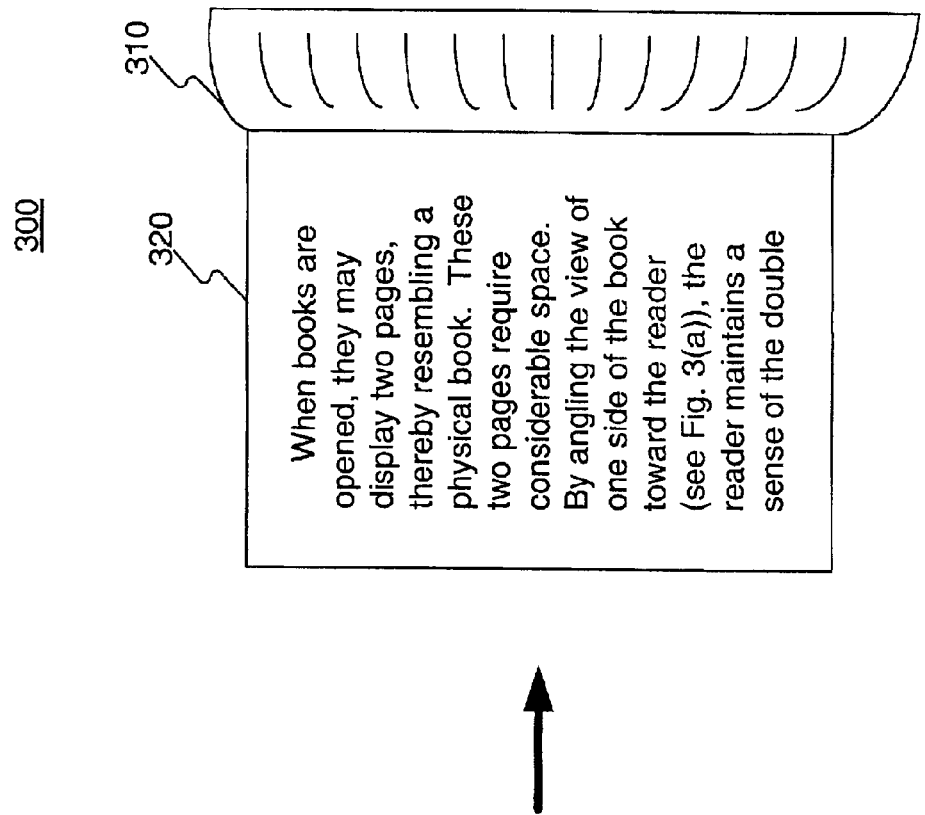
FIGS. 3A–3B are diagrams of a rocker book being animated from a first position to a second position according to the invention.
Figure 3A:
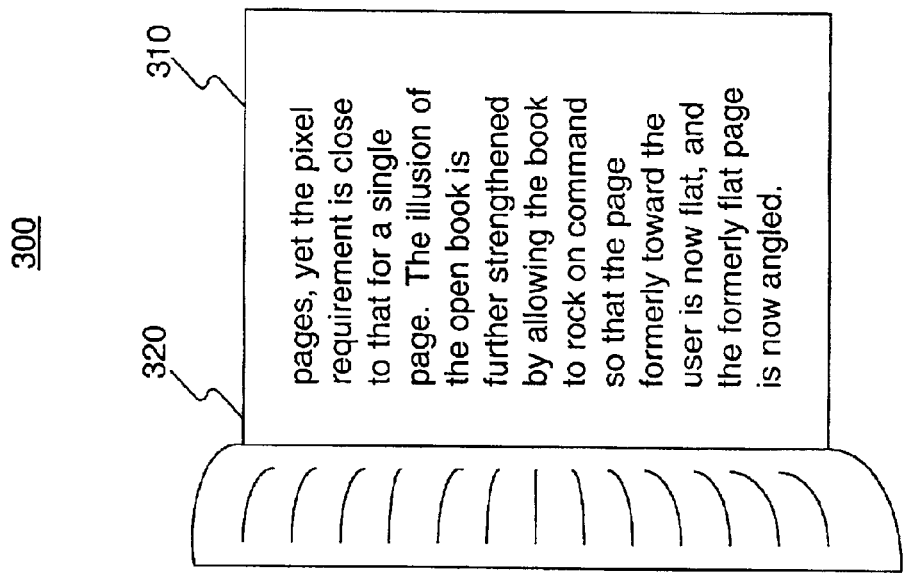

When transitioning the view from page 310 of the book to its facing page 320 the book metaphor can be used to provide an animation of the book 300 being turned in a rocking motion as shown in FIG. 3B. The speed of the animation can be set to extend the feeling of three-dimensionality of the book 300. Animating the transition from the static state 310 to the static state 320 (or vice versa) aids the user in interpreting these states as two views of a single object.

Another method for permitting multiple page viewing is to scale pages to be displayed at different sizes. The full-size page corresponds to the actual size of a page from a book scanned into the computer. This actual page size may be, for example, 8½×11" or some slightly-reduced size to fit on the display. As discussed above, a full-size page may take up too much of the display.

Smaller page sizes are therefore provided, these smaller page sizes providing different amounts of information to the user. A large page size of, for example, 6" scaled down from the 11" page size, is readable for a user using a magnification function, which increases the size of a desired portion of the image. The magnification function will be discussed below.

Figure 4A:
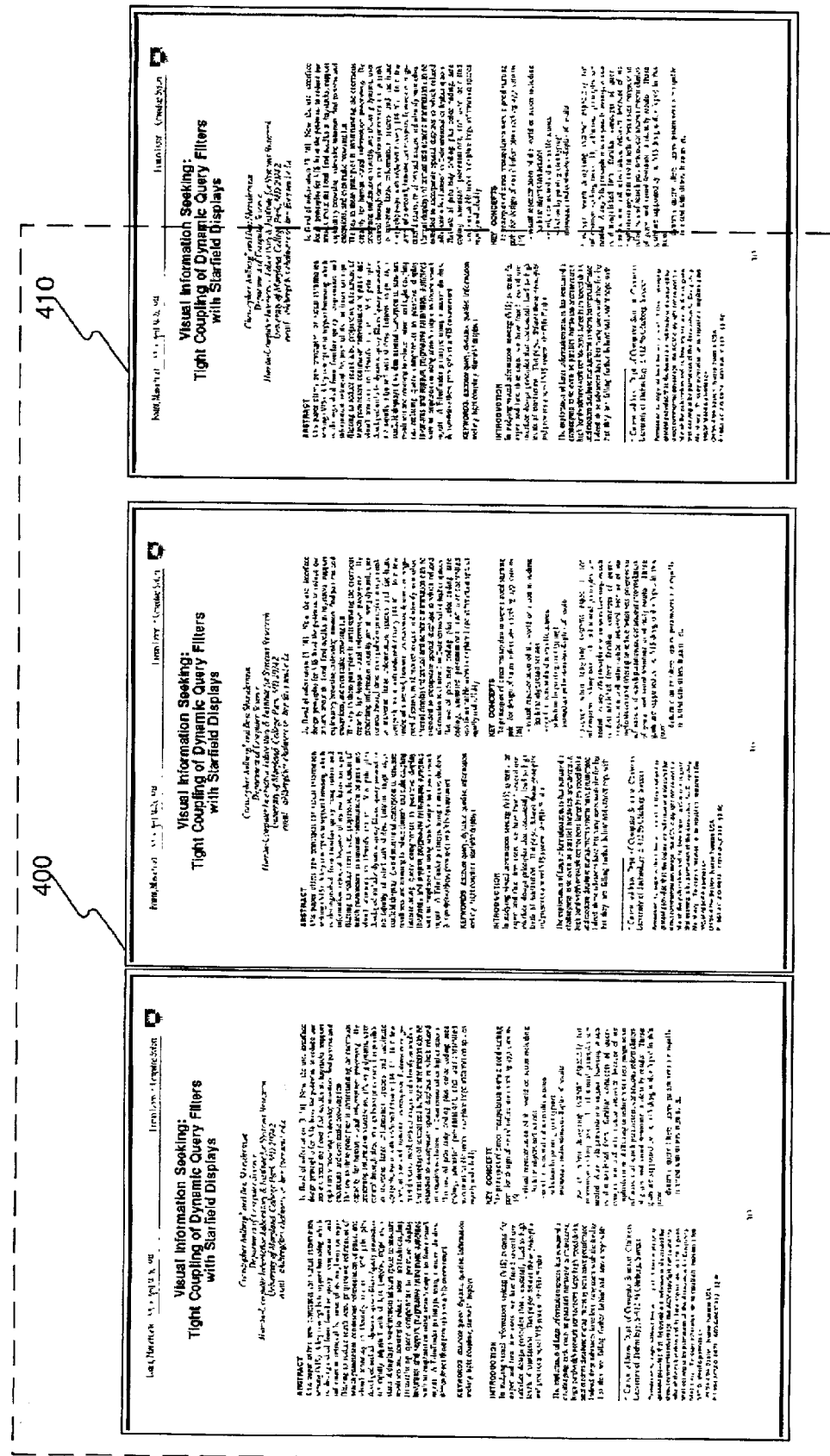
FIGS. 4A–4T are diagrams of different combinations of book and page sizes according to the invention.
Figure 4B:
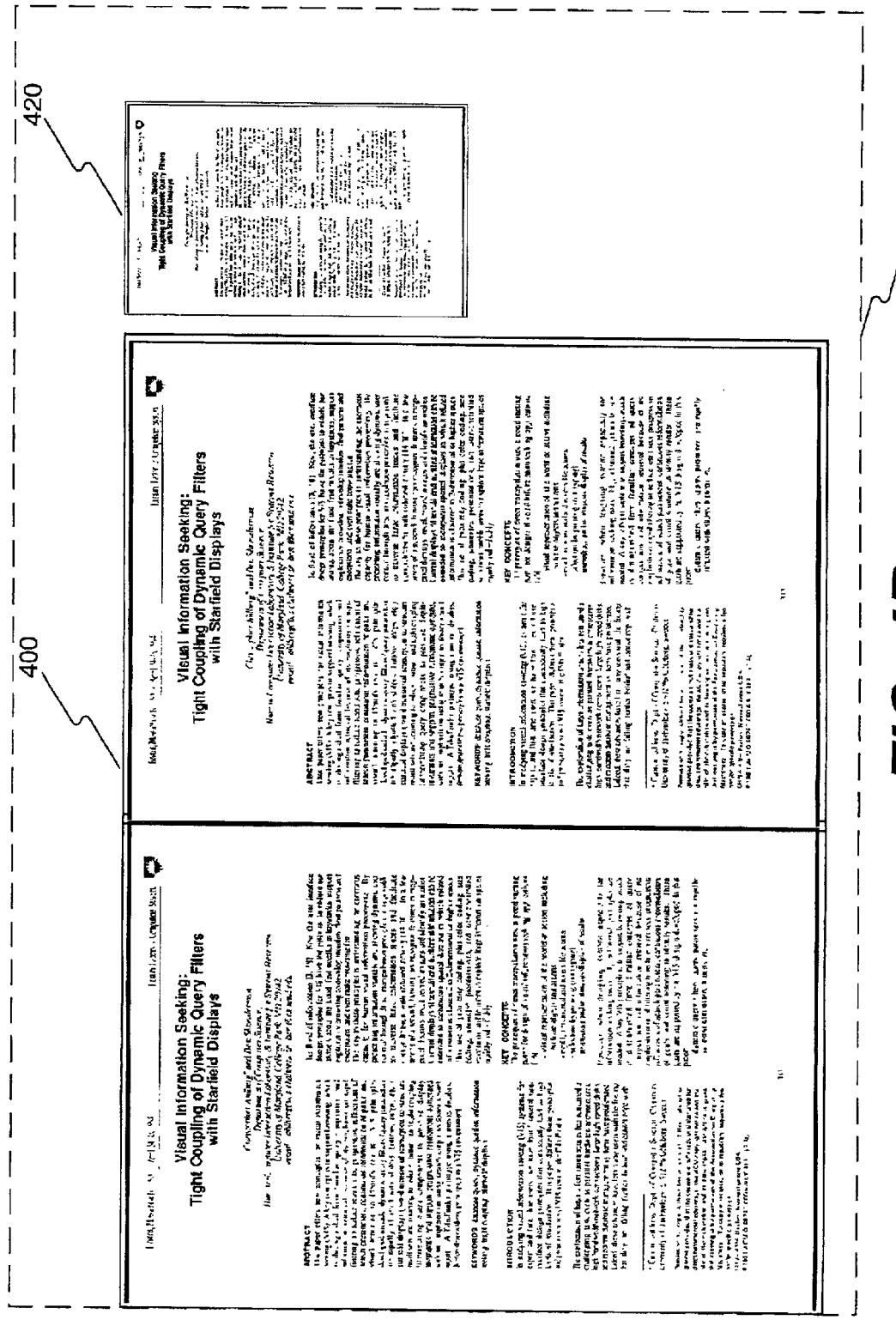
Figure 4C:
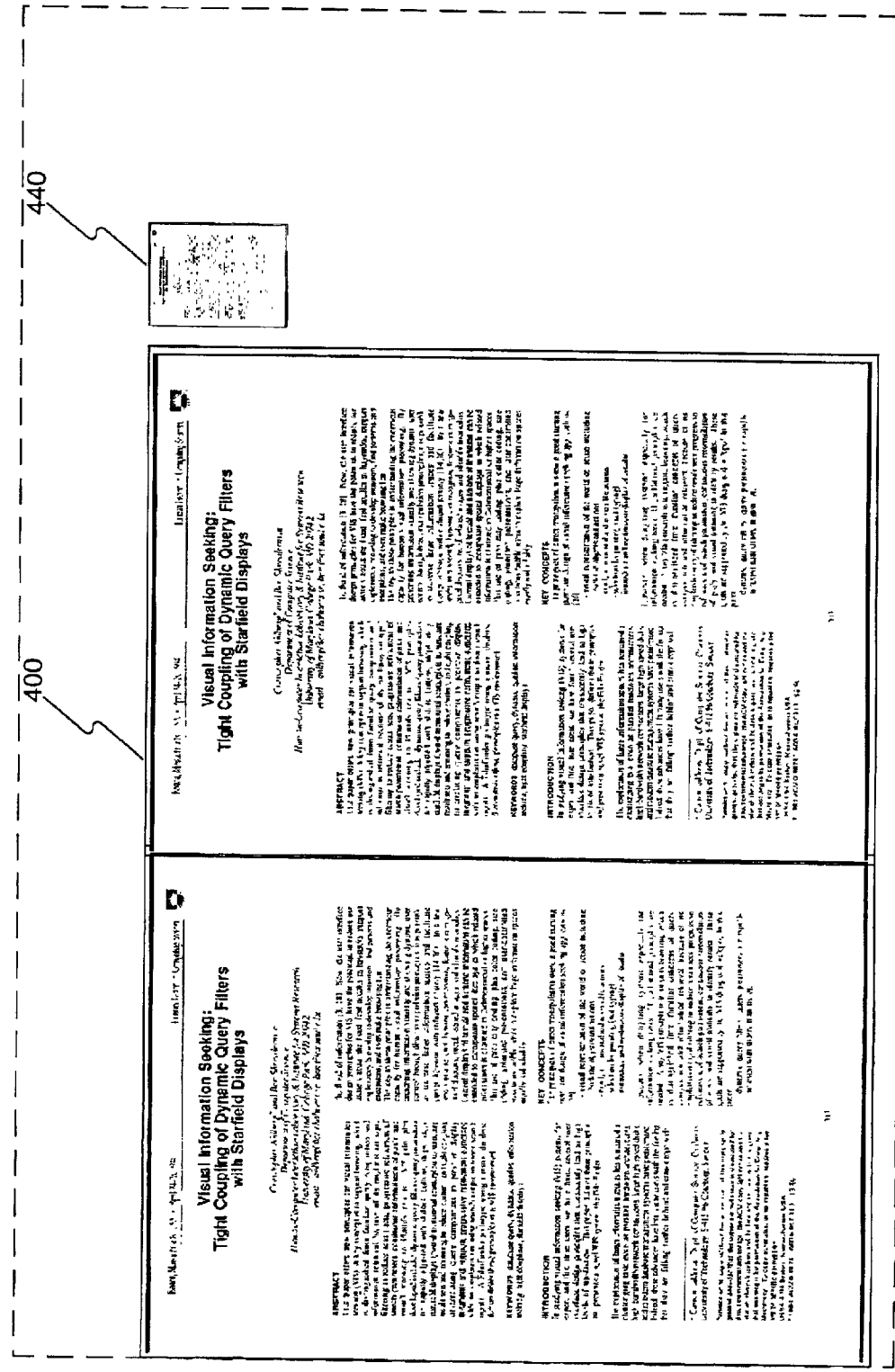
Figure 4D:
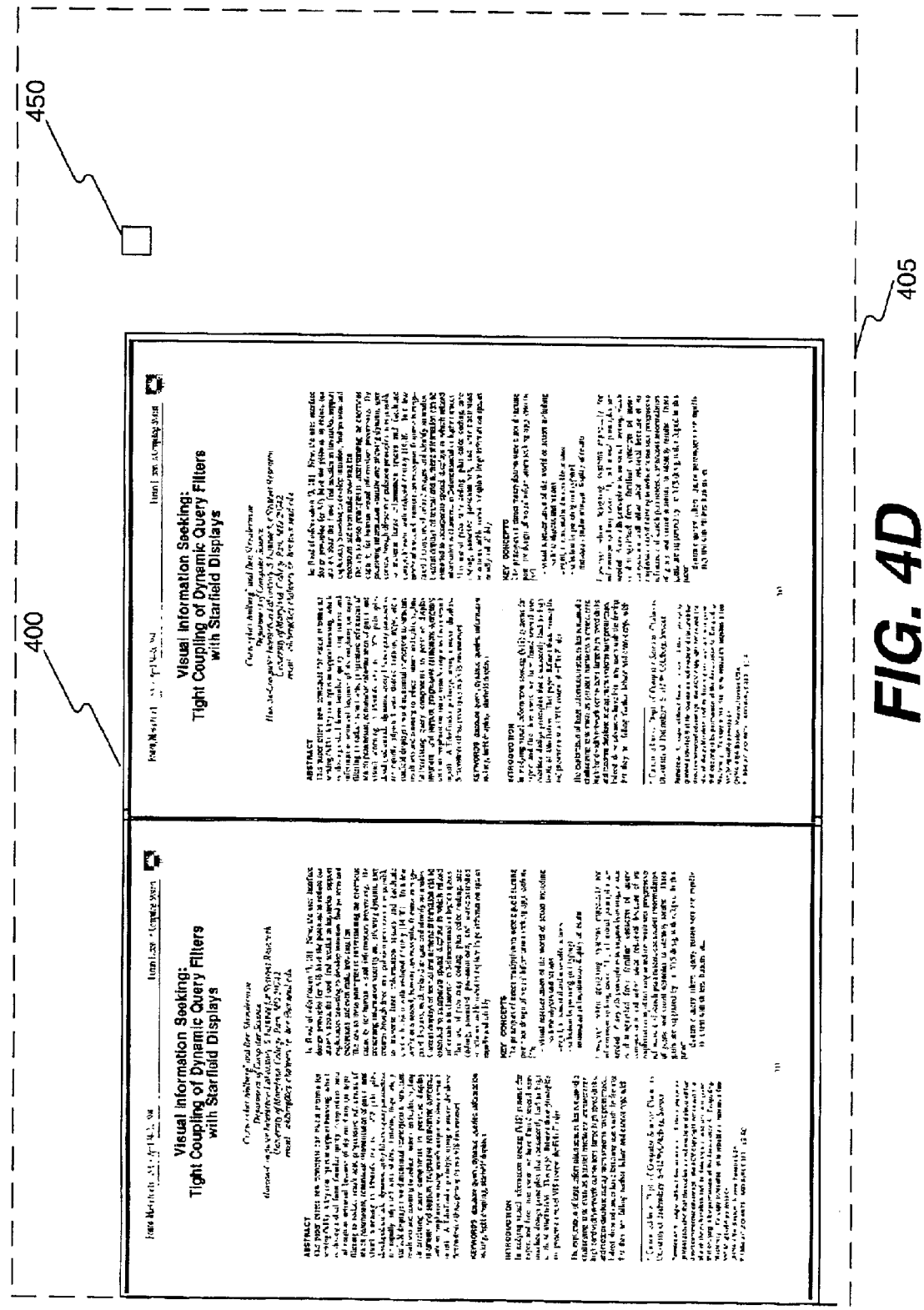
Figure 4E:
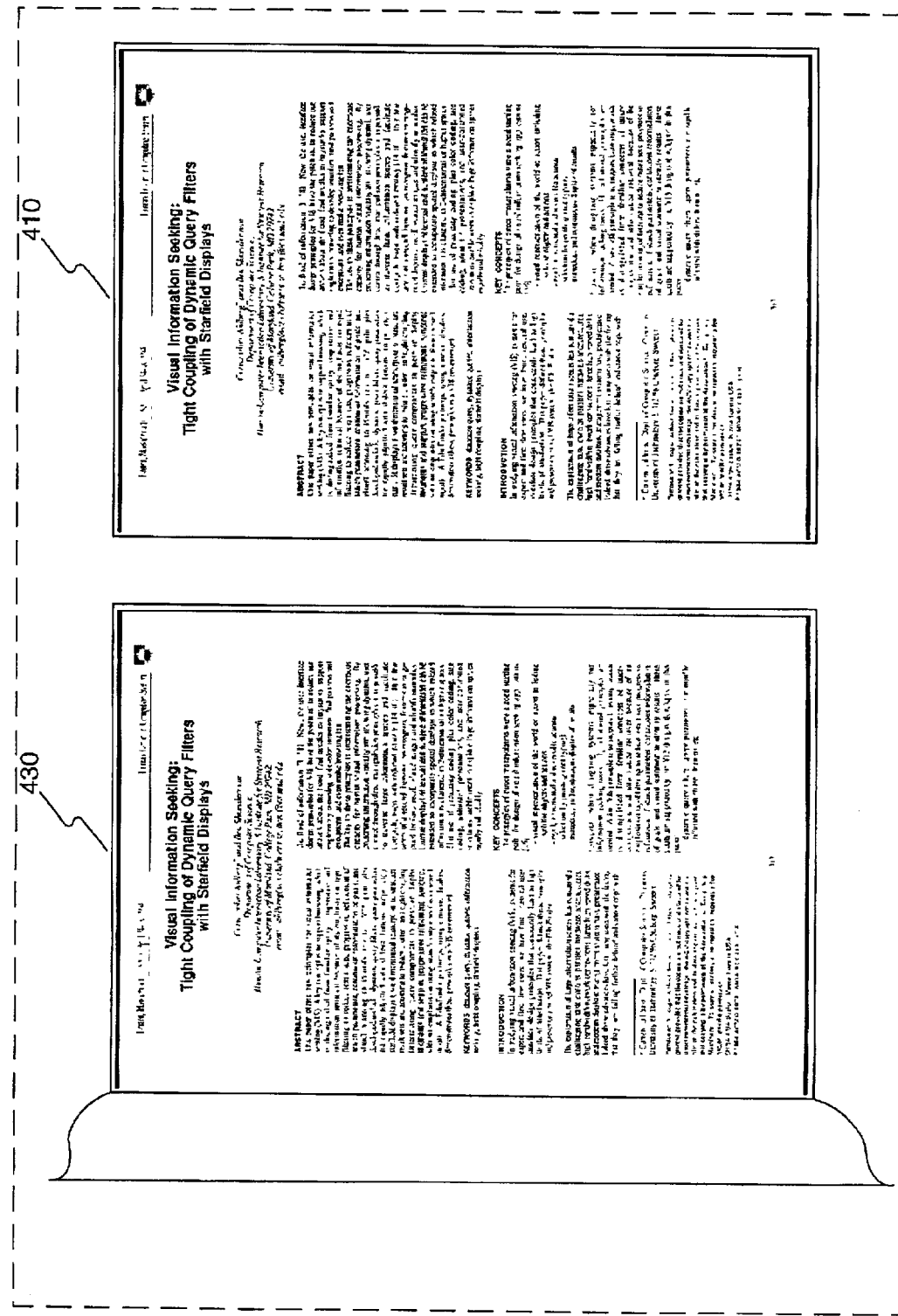
Figure 4F:
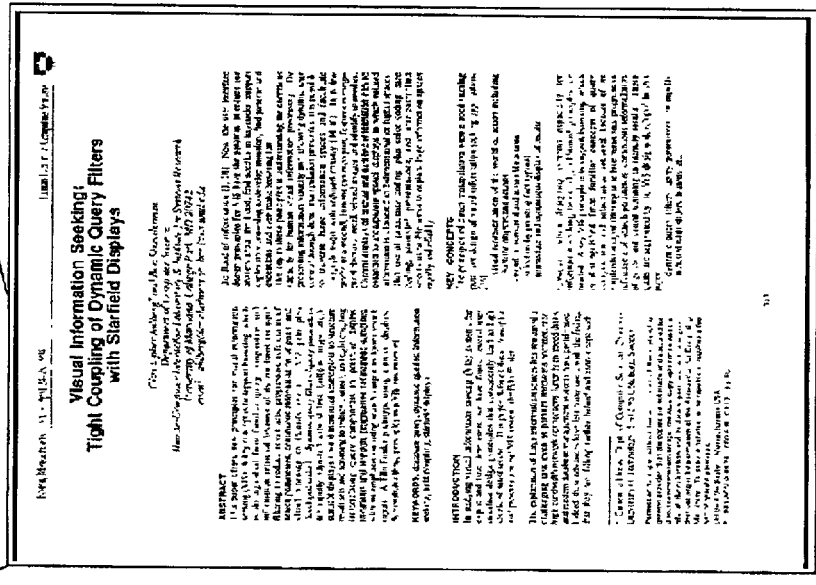
Figure 4G:
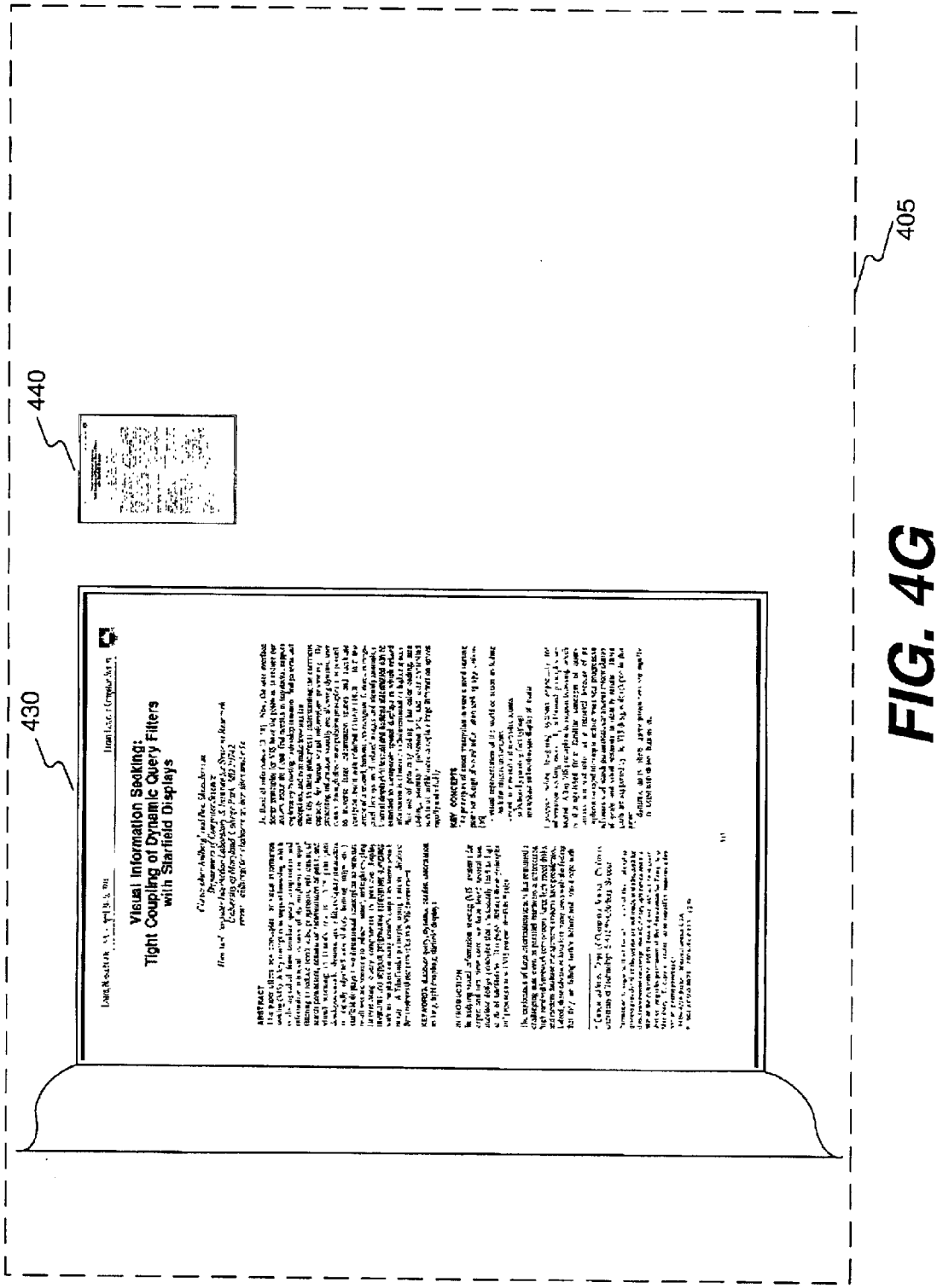
Figure 4H:
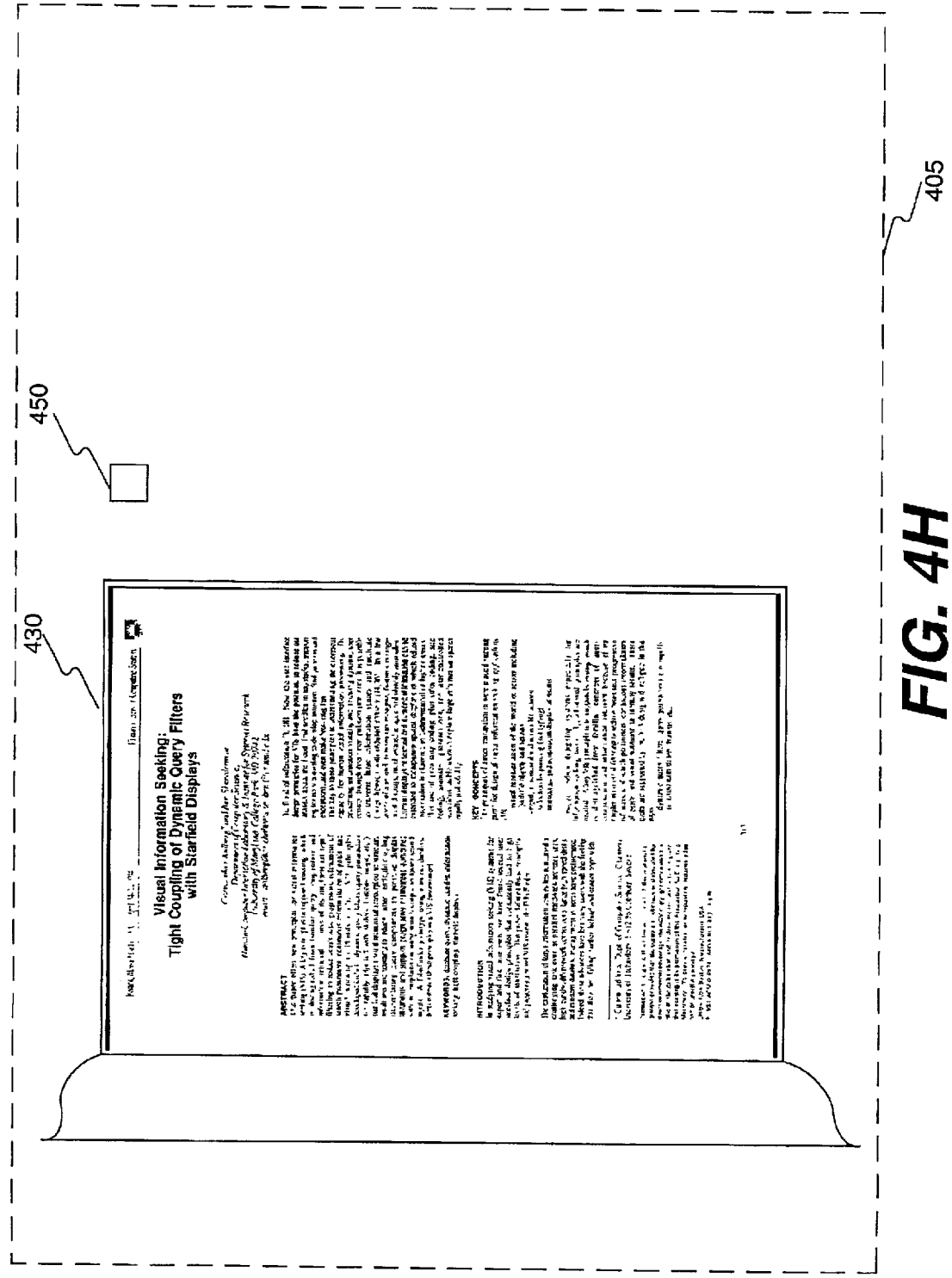
Figure 41:
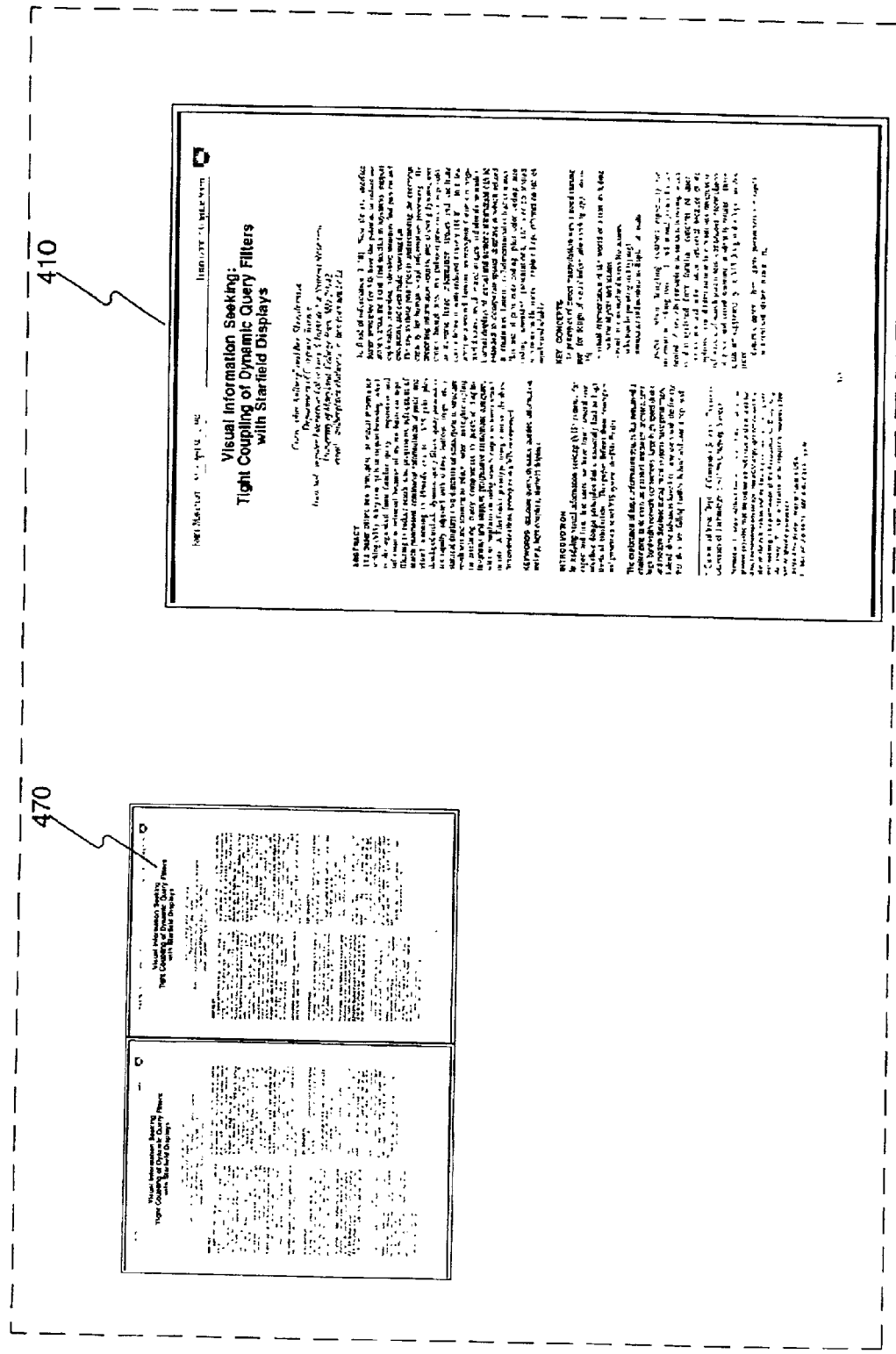
Figure 4J:
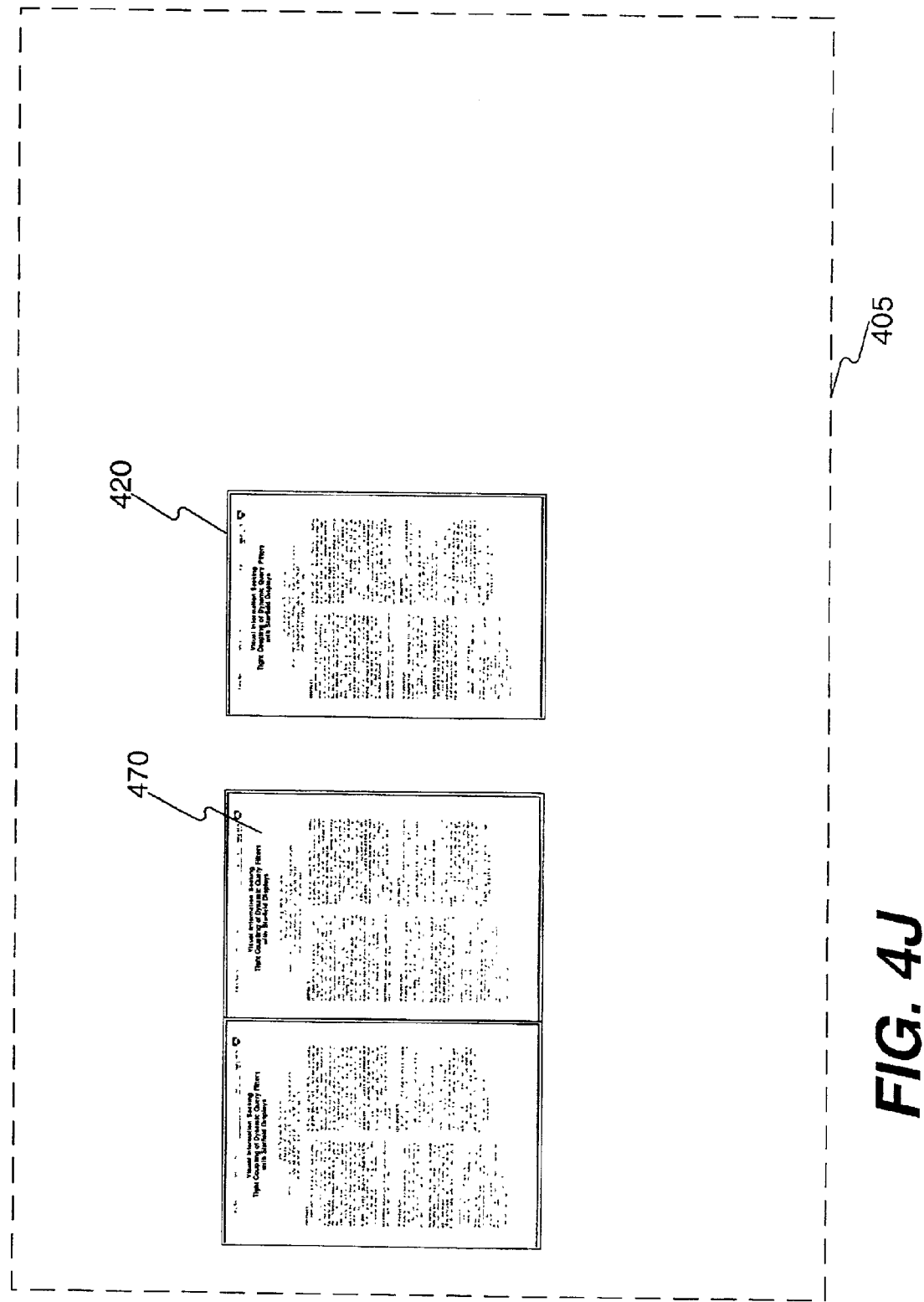
Figure 4K:
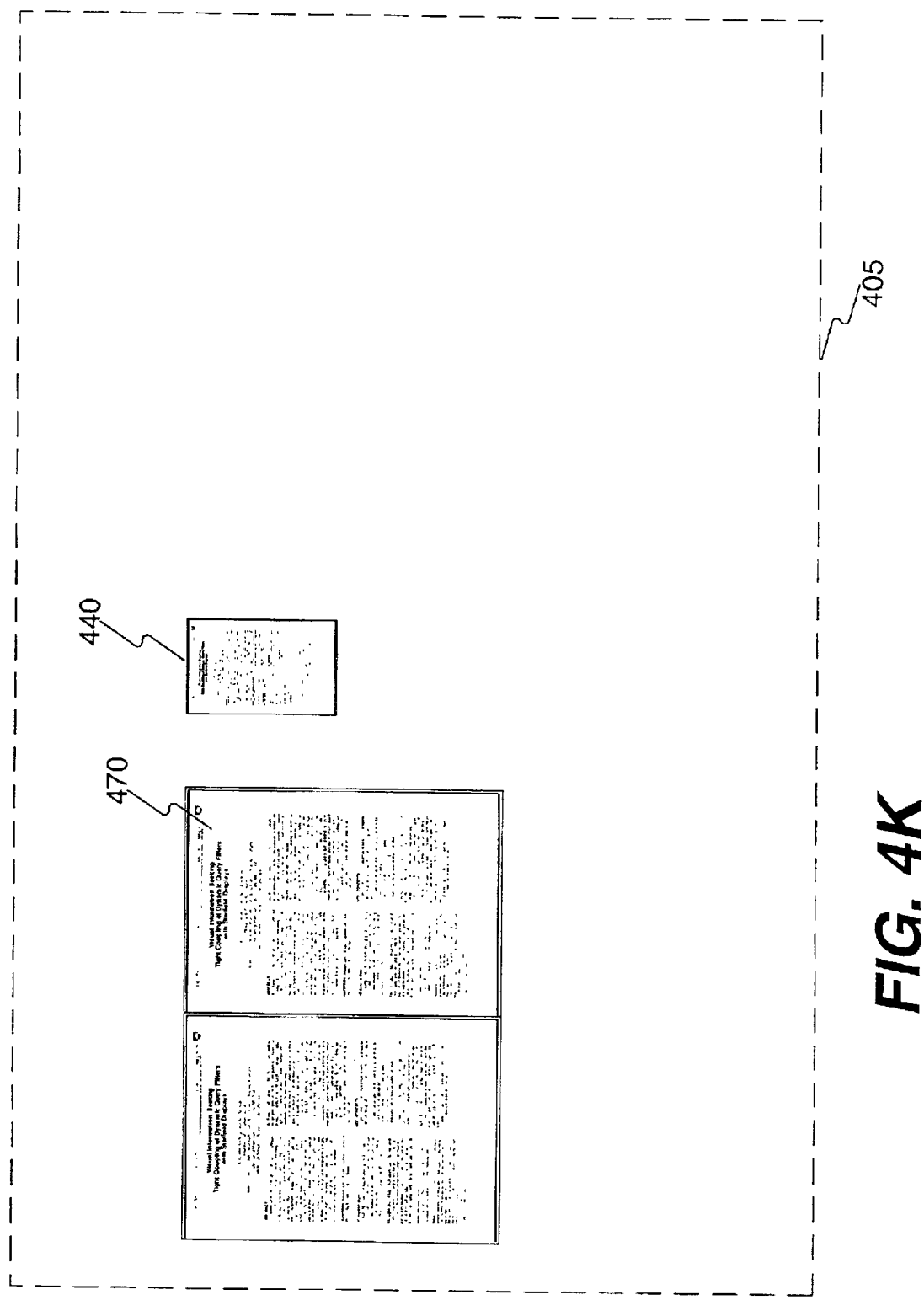
Figure 4L:
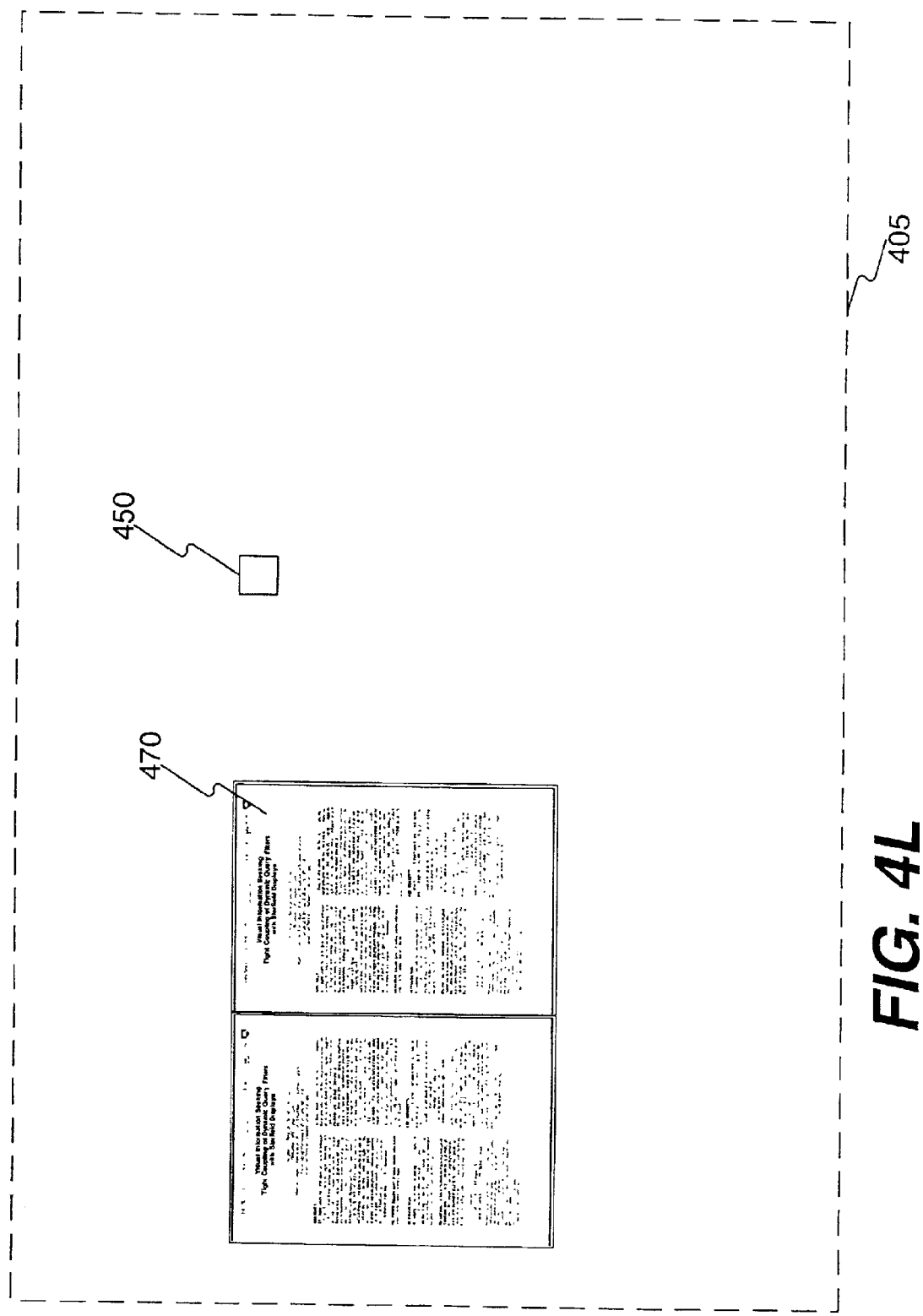
Figure 4M:
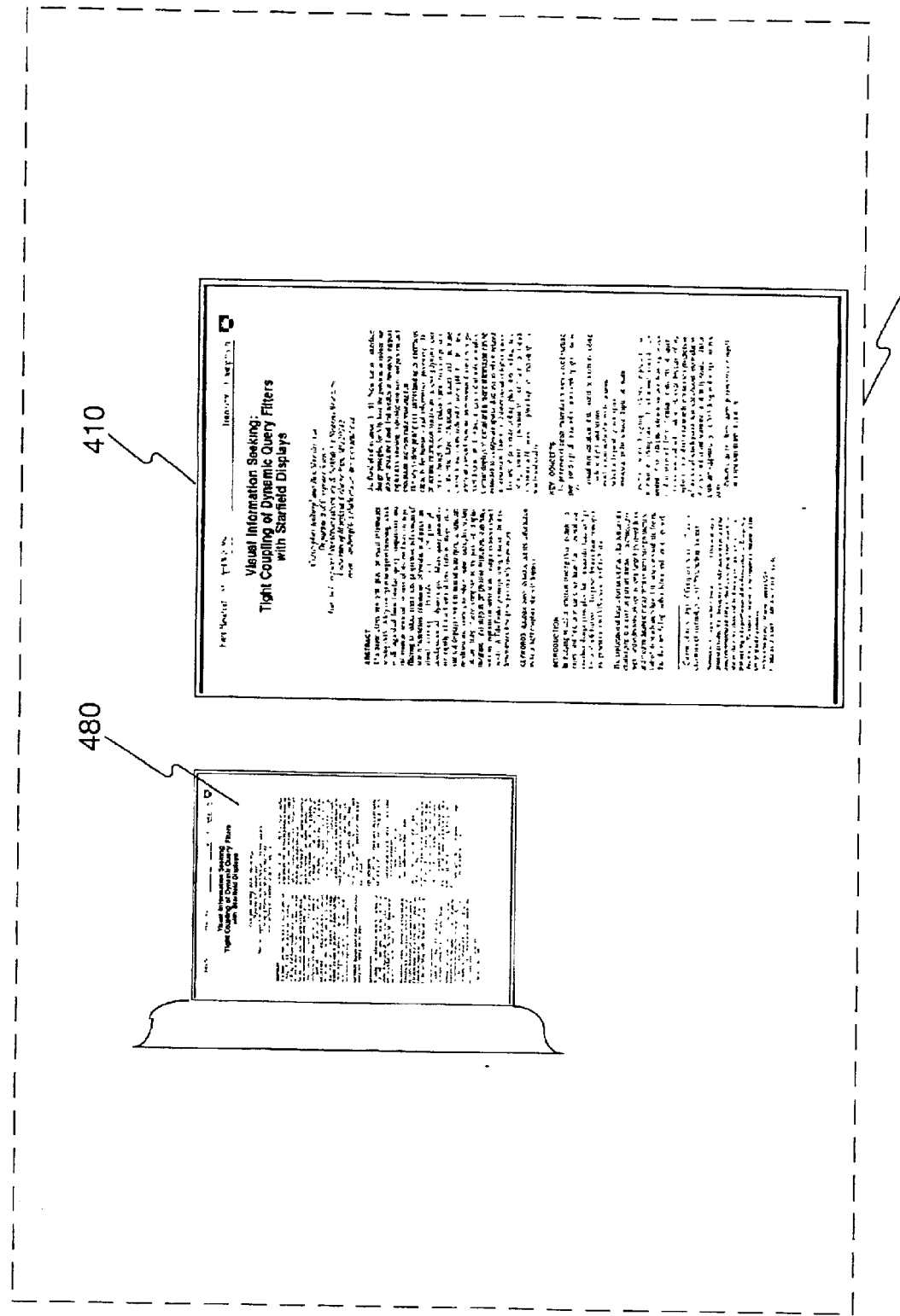
Figure 4N:
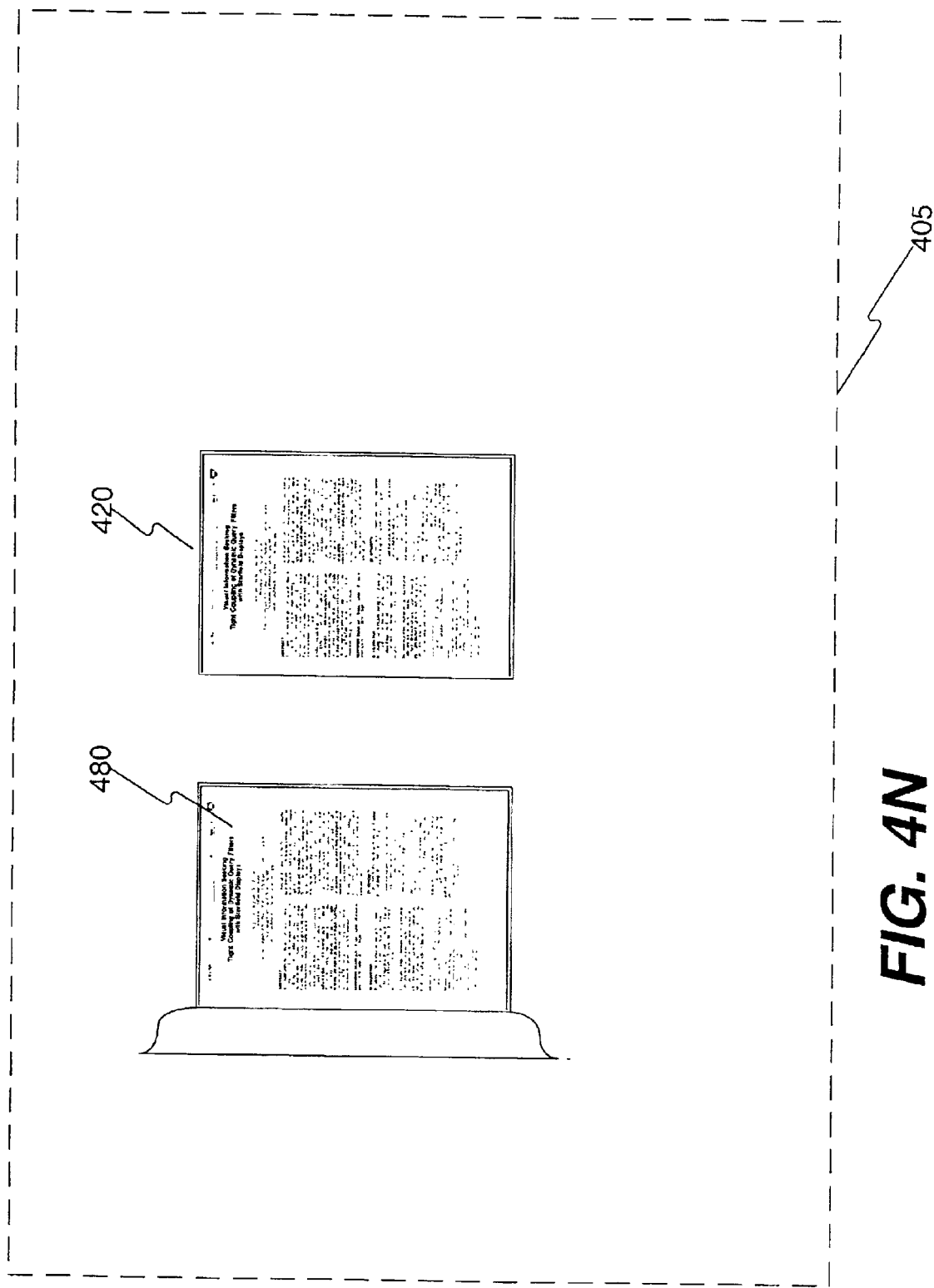
Figure 40:
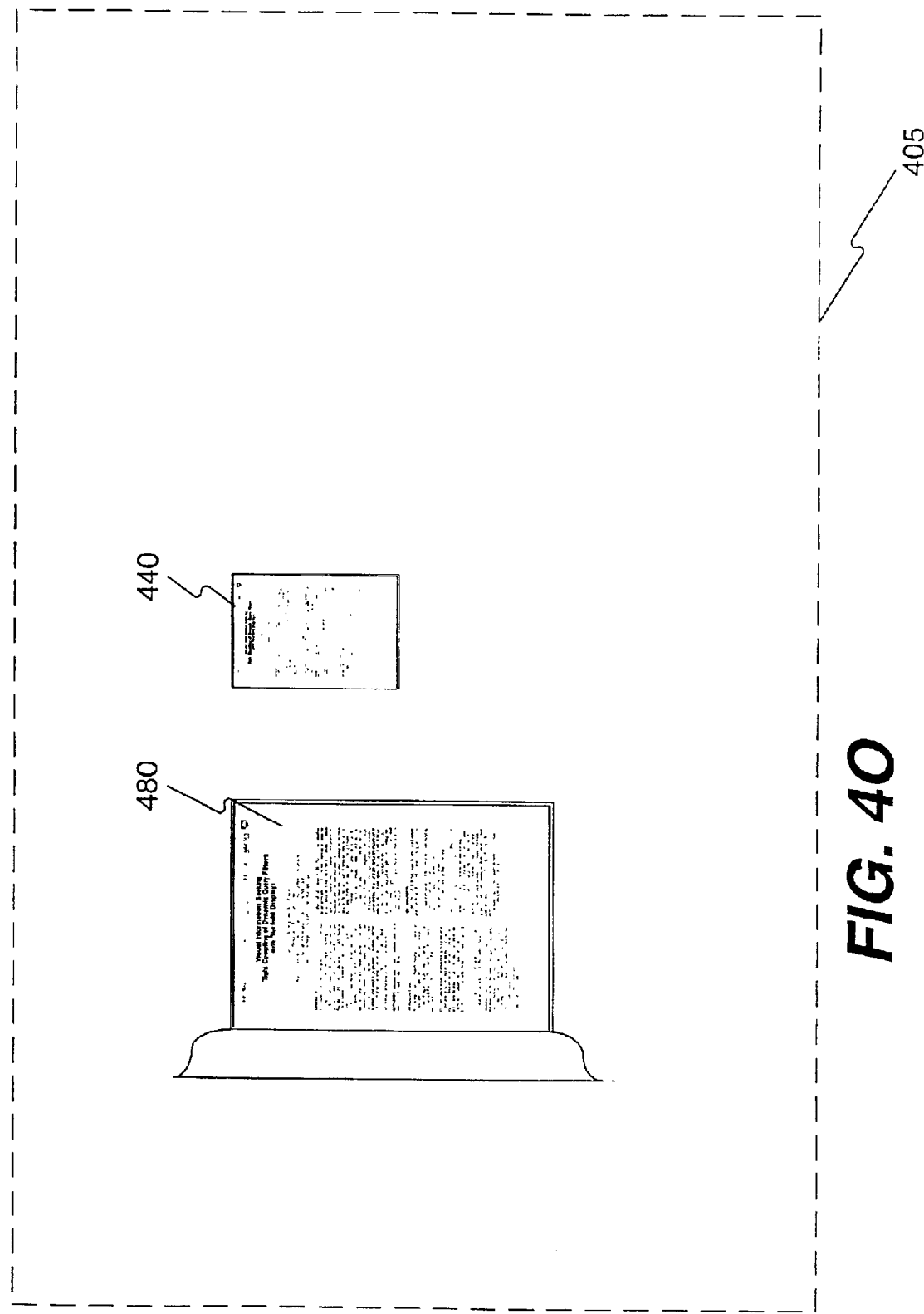
Figure 4P:
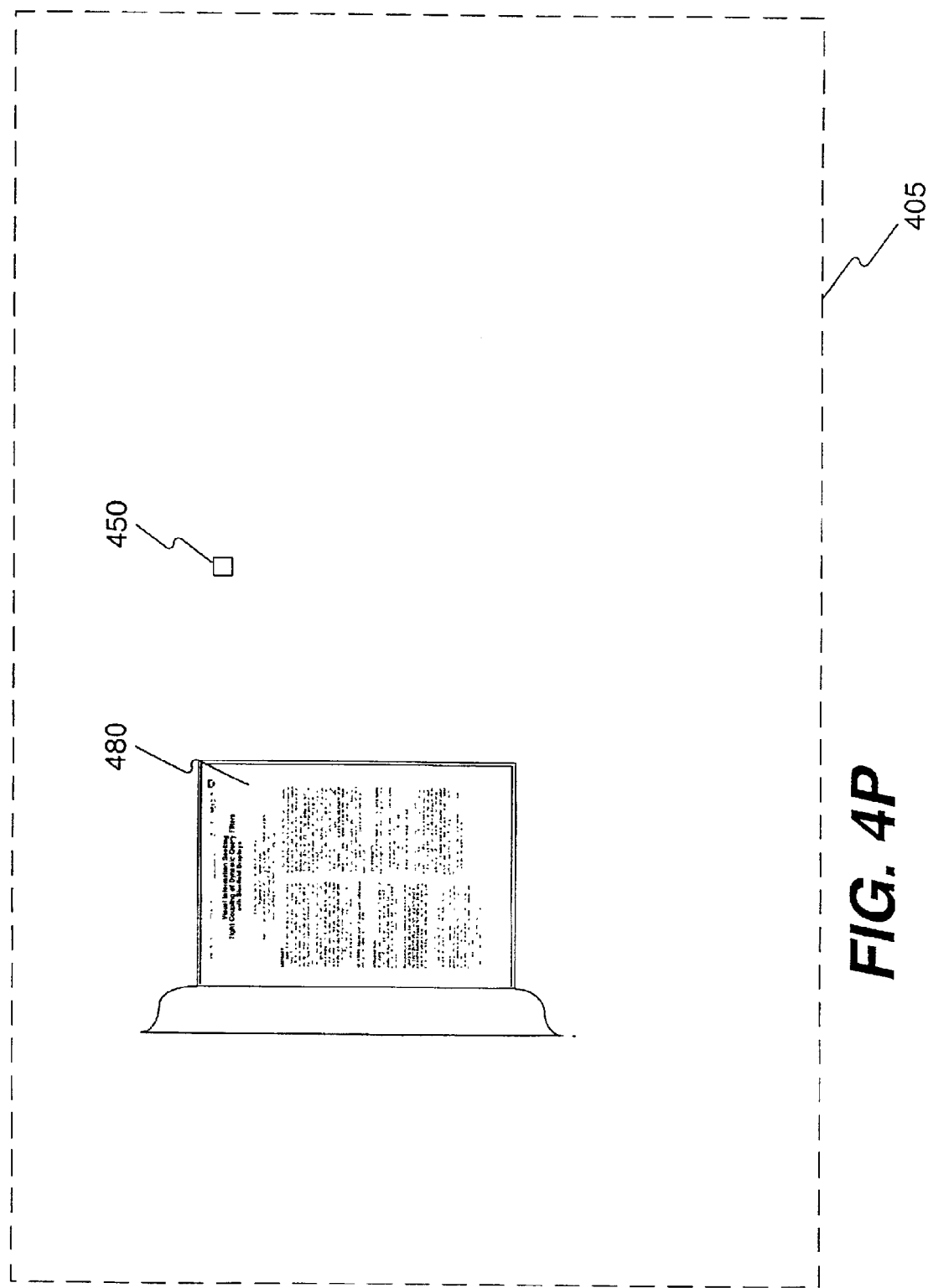
Figure 4R:
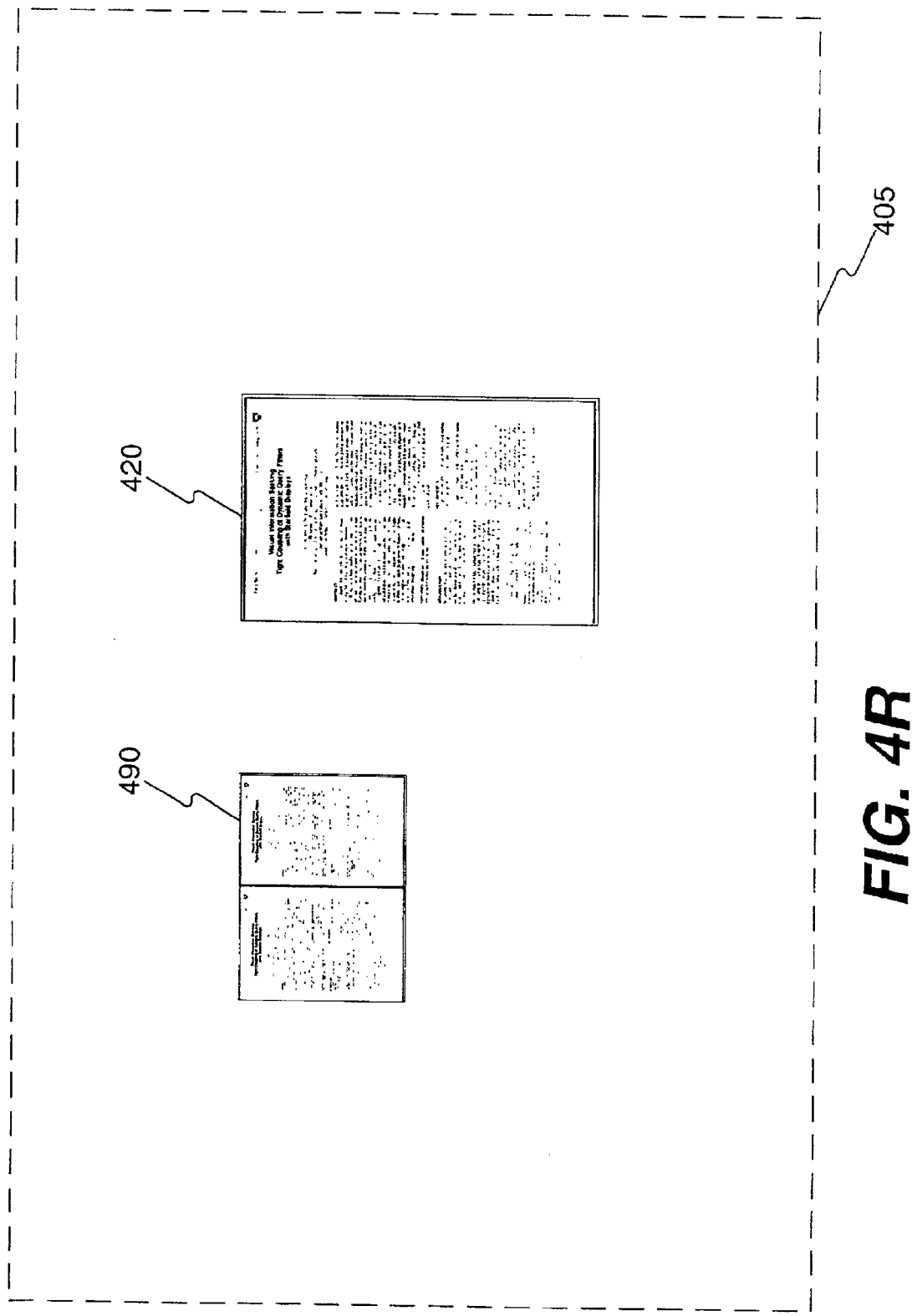
Figure 4S:
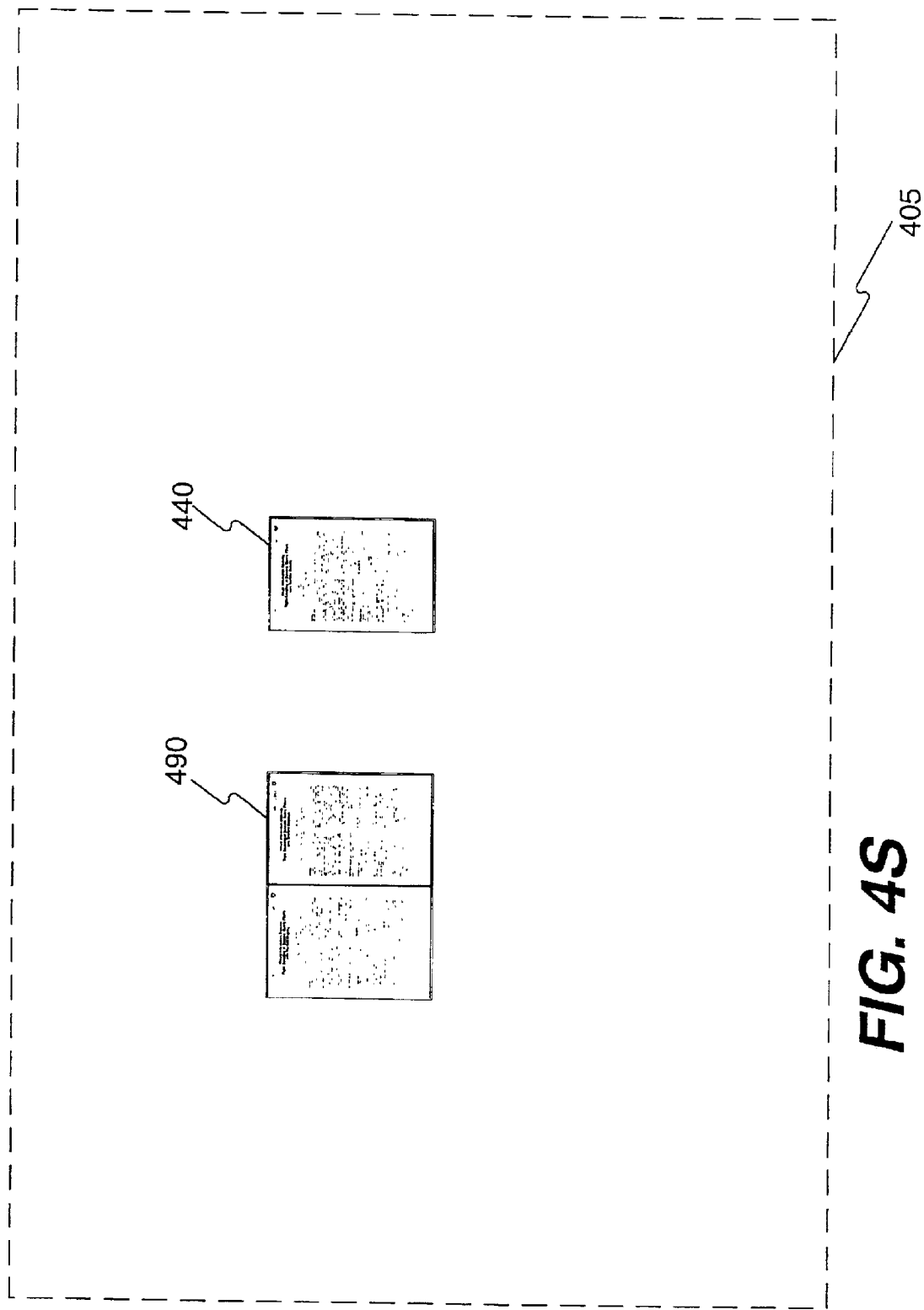
Figure 4T:
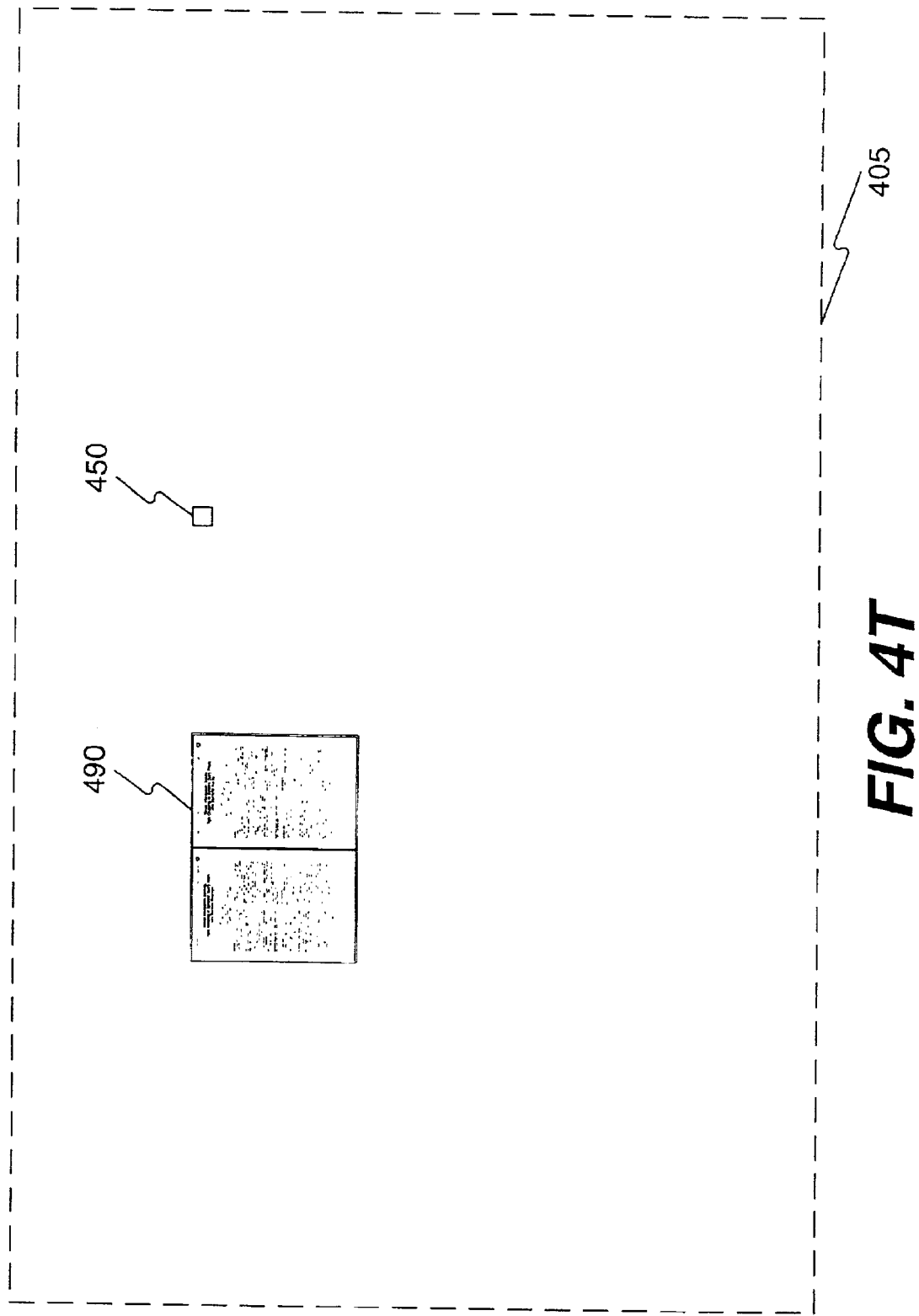

An exemplary large page book 400 is shown in FIGS. 4A–4T. In FIGS. 4A–4T, a dashed line bounding box 405 represents the border of an exemplary display device, wherein portions of images which extend beyond bounding box 405 would not be displayed. As shown in FIG. 4A, when using the large format book 400 having both pages open to view, the display used to display the book may be insufficient to show a large slide-out page 410. This can be solved by showing the slide-out page in a smaller format 420 (FIG. 4B), for example, 3" in height. In this format the title and images of page will be readable. Alternatively, the large format book may be shown as a rocker book 430 (FIG. 4E), so that a large scale slide-out 410 can be located next to the rocker book 430.

The slide-out page also can be displayed as a thumbnail size slide-out 440, taking up about 1" of display space (FIG. 4C). In order to use even less space, instead of providing an image of the slide-out page, an icon 450 can be used to represent the page to the user (FIG. 4D). The representation may be reduced even further, such as a dot (not shown), which can be implemented simply to indicate the presence of a page.

FIGS. 4A–4T also show a plurality of different combinations of full view book 400 (FIG. 4A) and rocker book 430 (FIG. 4E) with differently sized slide-out pages. These include small book 470 (FIG. 4I), small rocker book 480 (FIG. 4M), thumbnail book 490 (FIG. 4Q), etc. The following exemplary combinations are illustrated in FIGS. 4A–4T:

| FIG. 4A | Large page book 400 with large slide-out page 410 (partially outside of display area) |
|---|---|
| FIG. 4B | Large page book 400 with smaller format slide-out page 420 |
| FIG. 4C | Large page book 400 with thumbnail size slide-out page 440 |
| FIG. 4D | Large page book 400 with icon 450 |
| FIG. 4E | Rocker book 430 with large slide-out page 410 |
| FIG. 4F | Rocker book 430 with smaller format slide-out page 420 |
| FIG. 4G | Rocker book 430 with thumbnail size slide-out page 440 |
| FIG. 4H | Rocker book 430 with icon 450 |
| FIG. 4I | Small book 470 with large slide-out page 410 |
| FIG. 4J | Small book 470 with smaller format slide-out page 420 |
| FIG. 4K | Small book 470 with thumbnail size slide-out page 440 |
| FIG. 4L | Small book 470 with icon 450 |
| FIG. 4M | Small rocker book 480 with large slide-out page 410 |
| FIG. 4N | Small rocker book 480 with smaller format slide-out page 420 |
| FIG. 4O | Small rocker book 480 with thumbnail size slide-out page 440 |
| FIG. 4P | Small rocker book 480 with icon 450 |
| FIG. 4Q | Thumbnail book 490 with large slide-out page 410 |
| FIG. 4R | Thumbnail book 490 with smaller format slide-out page 420 |
| FIG. 4S | Thumbnail book 490 with thumbnail size slide-out page 440 |
| FIG. 4T | Thumbnail book 490 with icon 450 |

The user can rapidly expand and contract the sizes of the displayed pages between the various formats to provide differing levels of information to the user. Those skilled in the art will undoubtedly divine other permutations and combinations of book sizes, formats, and slide-out pages, all of which are within the scope of the present invention.

An exemplary action for changing the size of the images would be to use a mouse to click on the page and gesture upwards to increase page size or downward to decrease the page size. The use of the various size formats permits the user to keep track of pages, to bookmark pages, and, in the case of formats showing images of the page, to make information available directly from the displayed image. For a given three-dimensional book, a set of standard page sizes may be predetermined to allow pre-planned arrangement of the pages in the available display space. The images of the different page sizes may be stored, for example, as bit maps or texture maps of the page images, wherein each page will have a number of different page size images associated therewith. Upon selecting the page, the stored bit map is accessed to display the proper page and page size. Alternatively, a single bit map for each page can be stored, whereby the page to be displayed can be sized on-the-fly as it is resized.

The use of texture maps of different fidelity may also be used to allow more rapid display and motion of the pages. For example, the use of a large format book for page flipping would limit the ability of the computer to use the highest information content texture map to efficiently flip through the pages. As the speed of flipping increases, however, the amount of information that can be gained from the page is limited by the speed of flipping itself. In order to maximize this speed, therefore, a lower fidelity image can be increased in size to fit the large format book, while allowing greater processing and display speed.

Figure 5A:
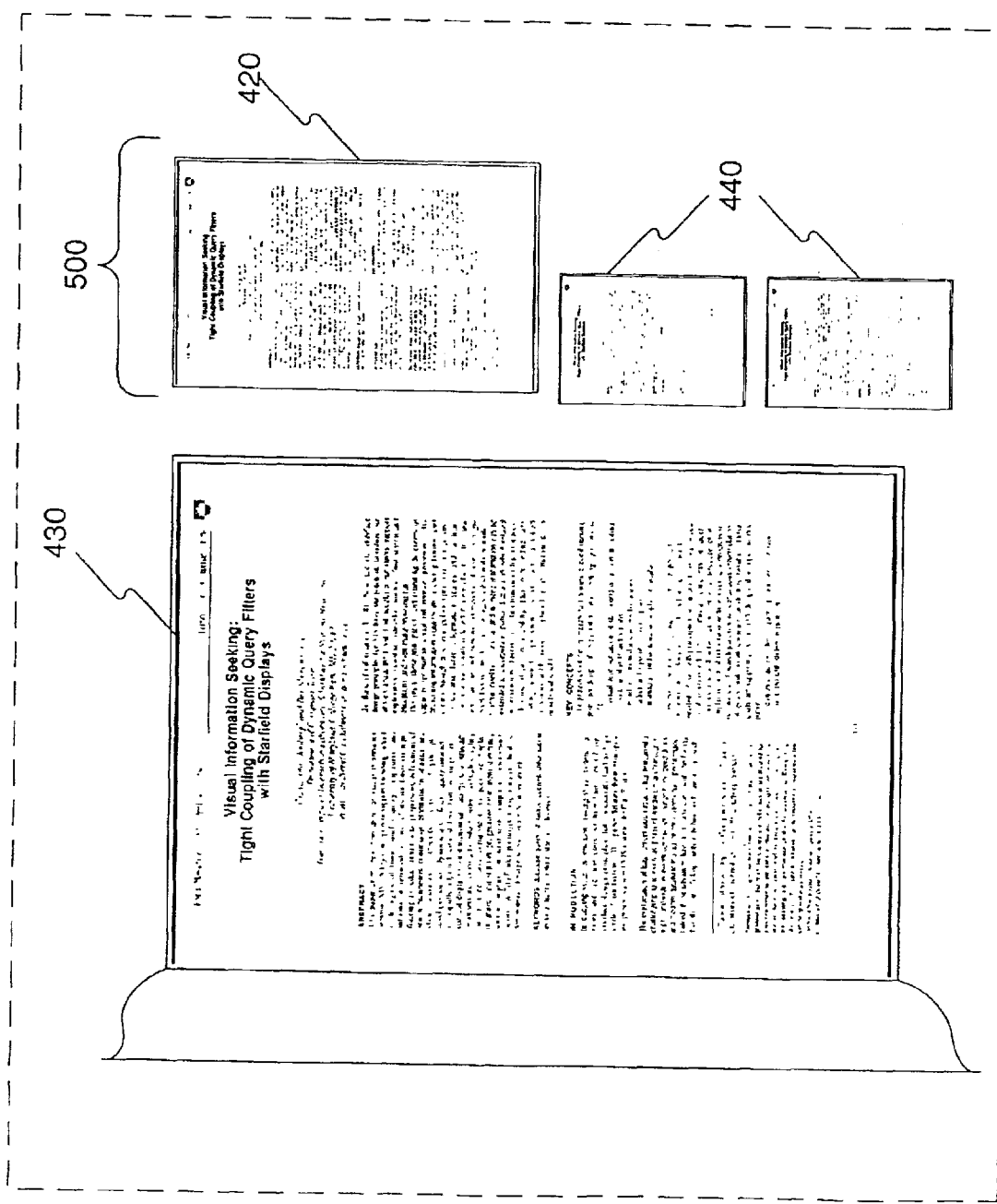
FIGS. 5A and 5B are two alternate arrangements for the display of multiple slide-out pages according to the invention.
Figure 5B:
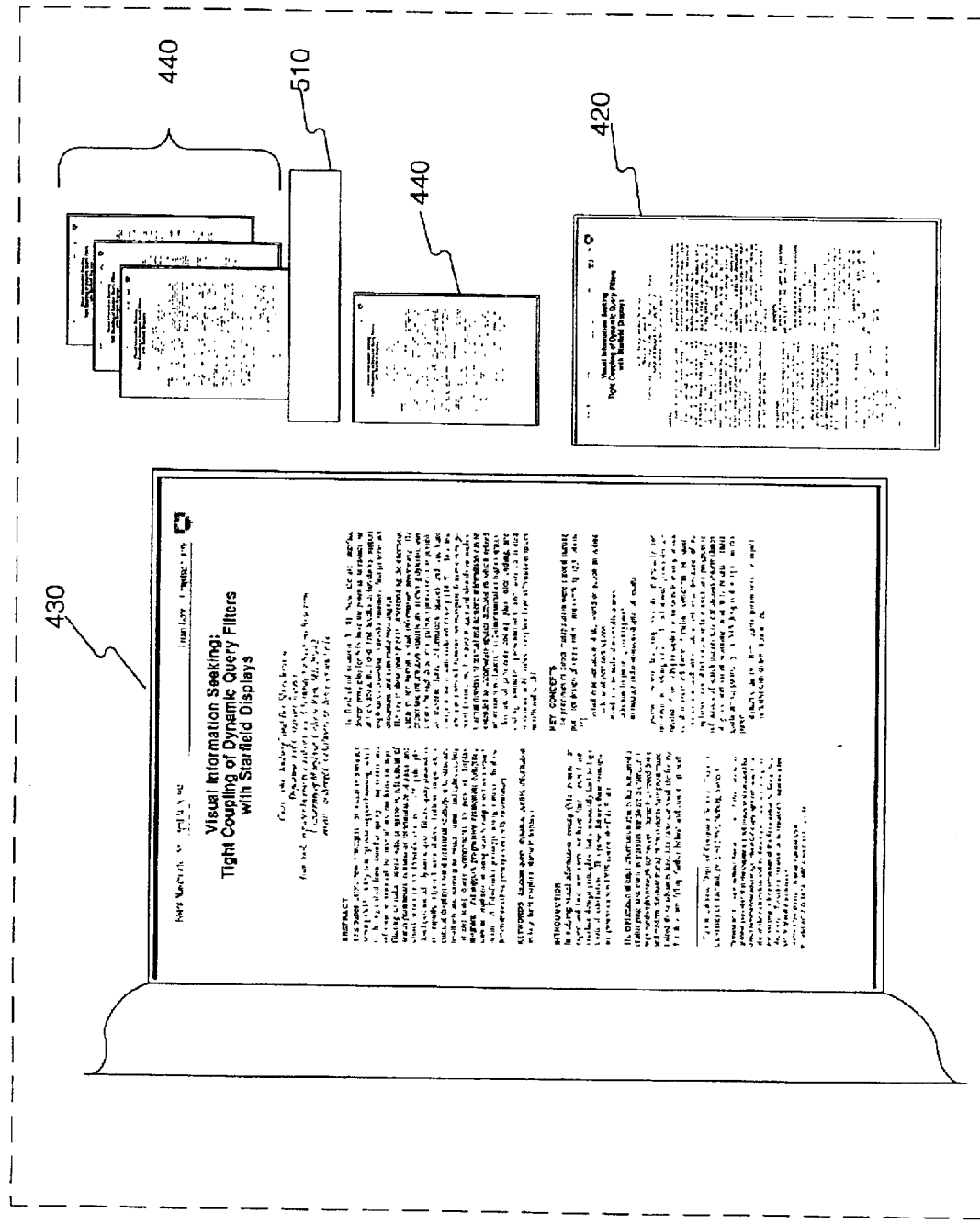

Referring to FIG. 5A, multiple slide-out pages 500 (comprising smaller format slide-out page 420 and thumbnail size slide-out pages 440, for example) may be shown in any of the aforementioned size formats. Alternatively, as shown in FIG. 5B, one or more slide-out pages may be placed in a bin 510, wherein all of the pages are of the same size format. FIG. 5B illustrates, by way of example, three thumbnail size slide-out pages 440 placed in bin 510. Adjacent bin 510 is another thumbnail size slide-out page 440 (which is not placed in bin 510) and a smaller format slide-out page 420.

In order to efficiently allocate the available display size to the images to be displayed, an automatic page arrangement function can be used. The automatic page arrangement function can use a degree of interest function in order to determine the proper size allocation. The degree of interest function calculates the degree of interest that the user has in each of the objects to be displayed. One algorithm for calculating the degree of interest is called a "fisheye lens" algorithm, as described in G. W. Furnas, "The Fisheye View: A New Look at Structured Files," Bell Laboratories Technical Memorandum #81-11221-9 (Oct. 12, 1981), which is expressly incorporated herein by reference.

The fisheye lens algorithm contains two parts, an intrinsic degree of interest (DOI) function and a distance-based DOI function. The intrinsic DOI function corresponds to the intrinsic interest of a given object, while the distance-based DOI corresponds to the spatial or temporal proximity of a given object. The net degree of interest is obtained by adding the two values together:

$$DOI = \text{Intrinsic } DOI + \text{Distance-Based } DOI$$

Figure 6:
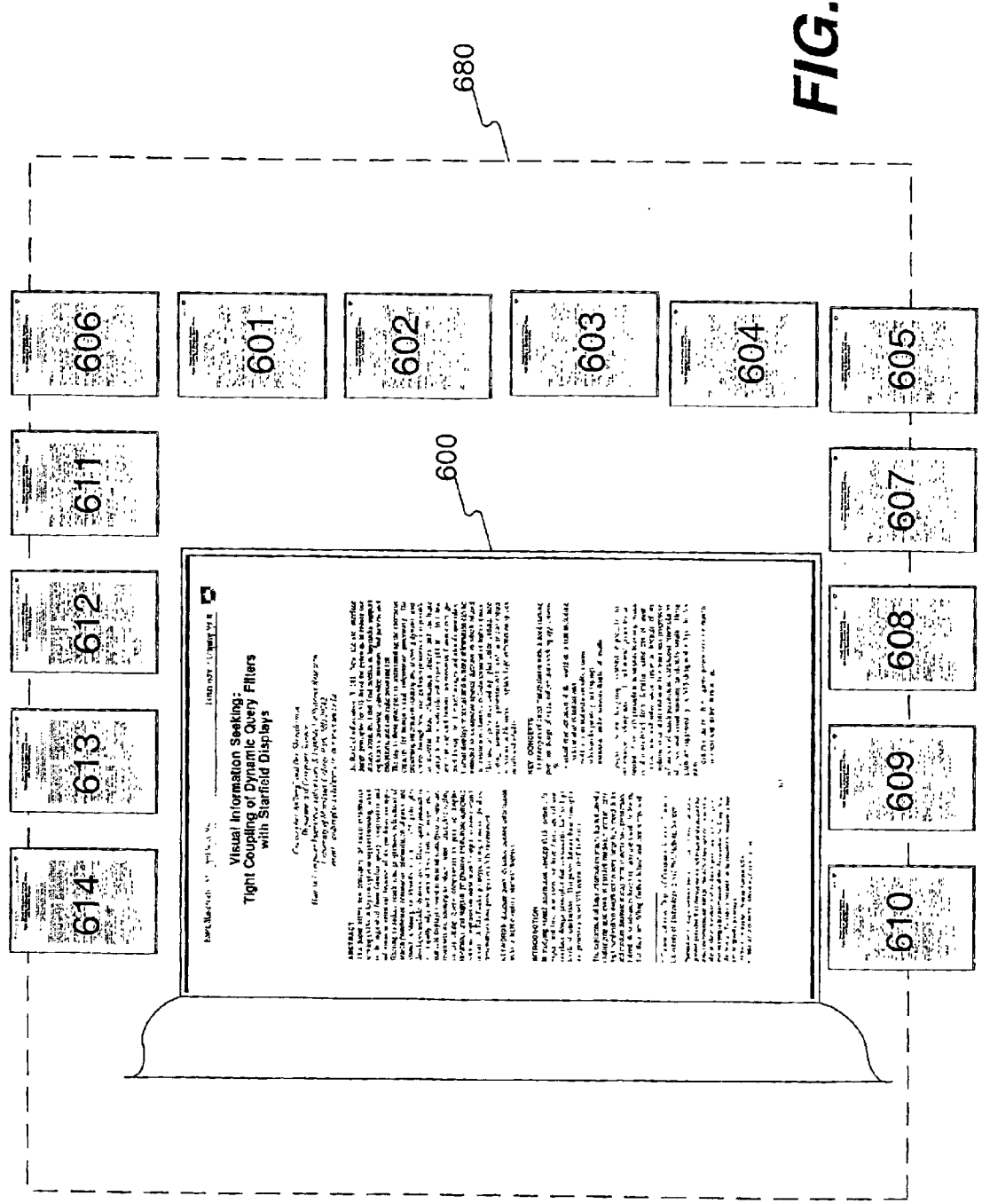
FIG. 6 shows an exemplary arrangement of multiple slide-out pages according to the invention.

As described by Furnas, however, the fisheye algorithm does not take into account the amount of available resources that can be used for the display of the images. If no accommodation is made for the limits of available resources, the images displayed may exceed the size of the page, as shown in FIG. 6. The instant invention therefore combines the fisheye lens algorithm with a technique to ensure that all images will fit within the resources of the display.

The "Intrinsic DOI" value can be assigned based on the nature of the object. A book, for example, may be assigned a higher degree of interest value than a slide-out page in order to classify the book as more likely to be of interest to the user than the slide-out page. A book could be assigned, for example, a degree of interest value of −1 and all other objects could be assigned a degree of interest value of −2.

The "Distance-Based DOI" value may be chosen as an interval in time since the page was last accessed. This time interval would count the temporal interval since a user had clicked on a page or used a magnifier function on the page. The pages are assigned a degree of interest value decreasing with the amount of time since last accessed. The assignment may be, for example, −1 for the most recently accessed document object, −2 for the second most recently accessed document object, −3 for the third most recently accessed document object, and so on.

The degree of interest value can also be used to determine the placement of objects relative to each other on the page. As shown in FIG. 6, a book 600 which is currently in view will have a high degree of interest value. Book 600, therefore, is placed centrally and displayed in a large format. For the layout shown in FIG. 6, the book is displayed in combination with thumbnail slide-out pages 601–614. The thumbnail slide-out pages would be placed on the display in order of their corresponding reference number, i.e., 601 first, 602 second, etc. The degree of interest function can be used to limit the size at which the images are displayed along with limitations on the placement of the images. Rectangle 680 shown around the images is a bounding box indicating the available resources, i.e., the available display space.

In accordance with the present invention, an automatic page placement algorithm works by computing the degree of interest function for each of the pages and the book. If the layout exceeds the width or height of the bounding box, the pages are all ordered using the degree of interest value assigned to the individual pages. Using, for example, a threshold value $DOI_1$, all pages having a degree of interest below that value are reduced in size to small-size pages. If the display of the images would still exceed the available resources, those pages having degree of interest values below a second threshold $DOI_2$ are reduced to a thumbnail-size page. If the layout would still exceed the available resources the pages may be reduced in size in reverse degree of interest value order to icon-size pages or dot-size pages. Finally, the pages may be culled individually in reverse degree of interest value order in order to ensure that the displayed images result in a permissible layout.

Because automatic control of page size is governed by the degree of interest algorithm, the user is also given the option to control the size and positioning of objects within the display space. The use of these control functions affects the distance degree of interest function applied to the individual images. Further, the user may be given the option to override the degree of interest function to display objects at a selected size and position regardless of degree of interest value. For example, the degree of interest function may be overridden for a particular virtual page (e.g., an index page) such that that page will remain at a selected size and position. While this page remains at the selected size and position, other pages may still be adjusted according to the degree of interest algorithm.

In order to permit optimal functionality with simple gestures, the user may change the size and position of objects by, for example, holding down a mouse button while moving across the image of the object. A downward sweep could, for example, shrink the size of the page, while an upward sweep could increase the size. A left-to-right sweep on a page in a book could, for example, transfer the page from the book to become a slide-out page outside the book. The creation of a slide-out page is indicated, for example, by displaying the page in the book in a grayed-out state. Further, a left to right gesture on a page to another page could, for example, create a pile of pages from the pages.

The optimal use of available resources becomes important when the display of an object would result in exceeding the display size. As discussed above, one of the general principles of the three-dimensional book is to provide the sensory experience of viewing a real world book in virtual space. This metaphor, however, becomes strained with large format books and small display sizes. Further, at times, it may be helpful to view different portions of long lists of items together, for example, an index or table of contents of a book.

One solution to this problem is to remove portions of the object from view. An extension to the three-dimensional metaphor to such removal is a visual display of the object (i.e., page) folding in and out of view. As shown in FIG. 7A, a page 700 is shown including information under categories A and C. The information under category A is selected as shown in a page 702 of FIG. 7B. In FIG. 7C, the program uses a folding animation to show the information on a page 704 being folded into a crevice 710. The image information is mapped onto the plane formed by the page as the angle of view of that portion of the page is bent out of view. As shown in FIG. 7D, the information under the category B of page 706 is then selected. In FIG. 7E the category information is folded out of the page 708 from a crevice 720 in a reverse sequence to that shown in FIG. 7C. Finally, in FIG. 7F, the newly constructed page 730 is shown.

Beyond fitting an image of a three-dimensional book on the page, the ability to access the information provided in the book in an easy and timely manner increases the utility of the three-dimensional book metaphor. In a physical book, the ability to select a particular page from the entire text involves approximating the desired position in the book using the side edge of the book in the thickness direction. Generally, however, since the side edge of a book in the thickness direction encompasses a relatively small space, it is not amenable to detailed page selection.

Figure 8:
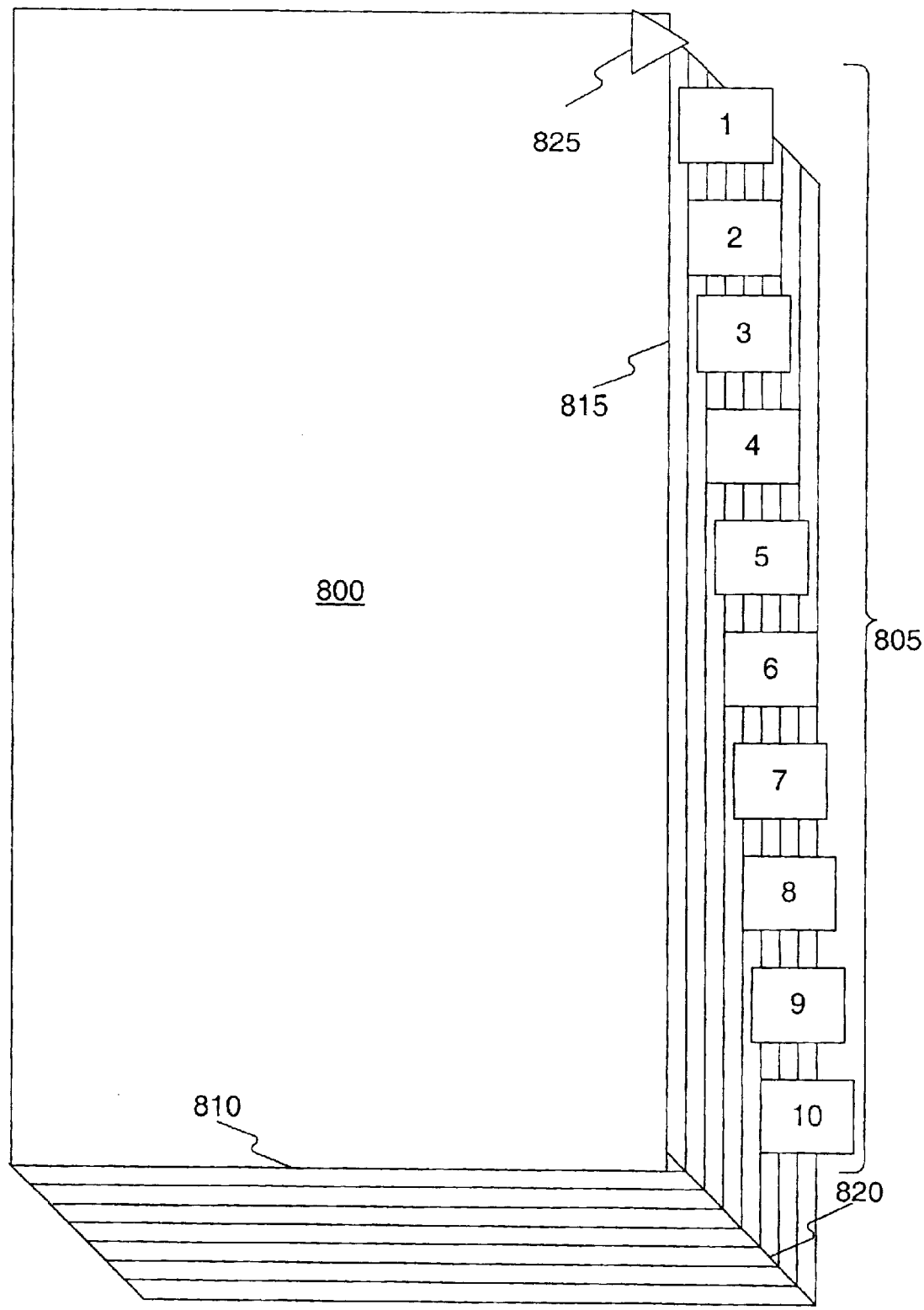
FIG. 8 shows an exemplary three-dimensional book having tabs according to the invention.

Referring to FIG. 8, similar page navigation problems are found with a virtual three-dimensional book 800. A user would have extreme difficulty in precisely locating pages by selecting along a relatively small side edge 820 in the thickness direction of virtual three-dimensional book 800. To alleviate this problem, a user-selectable slider 825 may be disposed along an edge 815 in the height direction of virtual three-dimensional book 800. A user may relocate slider 825 up and down the length of edge 815 using a click and drag operation, for example. Upward movements of slider 825 result in backward page movements in book 800, while downward movements of slider 825 result in forward page movements.

Further, as shown in FIG. 8, the utility of the edge 815 can be increased by providing chapter tabs 805 extending from the edge 815 showing the divisions of the book. A user could perform a simple click selection on any of these tabs 805 to navigate to the first virtual page associated with a given chapter tab.

Alternatively, tabs 805 can be shown "cut into" the side of the book, such as those commonly used in thumb-indexed dictionaries. These chapter tabs 805 can be evenly sized, or differently sized to reflect the relative sizes of the chapters. Further information can be provided using color coding of the chapter tabs or by including text identifications of the chapters. The utility of tabs 805 may also be increased by providing the information on both sides of the tab, so that as the pages corresponding to the chapters are turned the information contained thereon remains available.

The edge 815 of book 800 may comprise, for example, 400 vertical pixels. Thus, if virtual three-dimensional book 800 comprised 400 virtual pages, for example, each one-pixel movement of slider 825 would result in a corresponding page movement of one page in book 800. However, if book 800 had a greater number of virtual pages, 800, for example, those 800 virtual pages would be mapped to the 400 pixel span of the edge at 2 pages per pixel. Thus, a slider movement of one pixel would result in a page movement of 2 pages in this example.

Figure 9B:
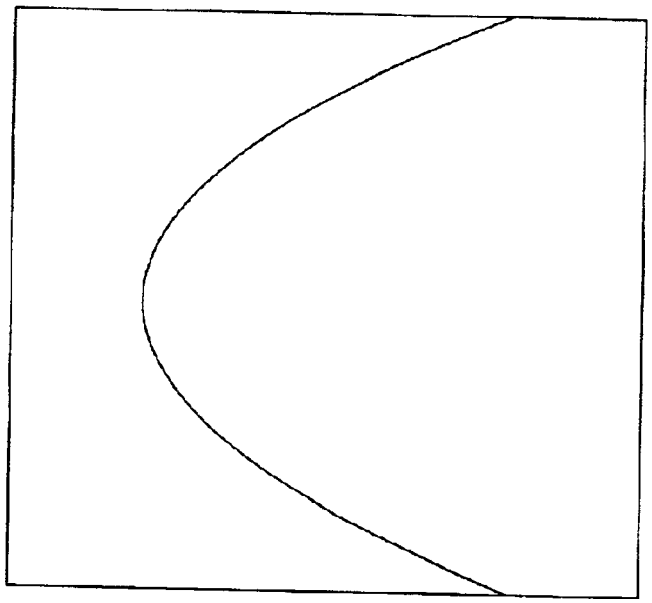
FIG. 9 is a graph of the relationship between pixels and page number according to the invention.
Figure 9A:
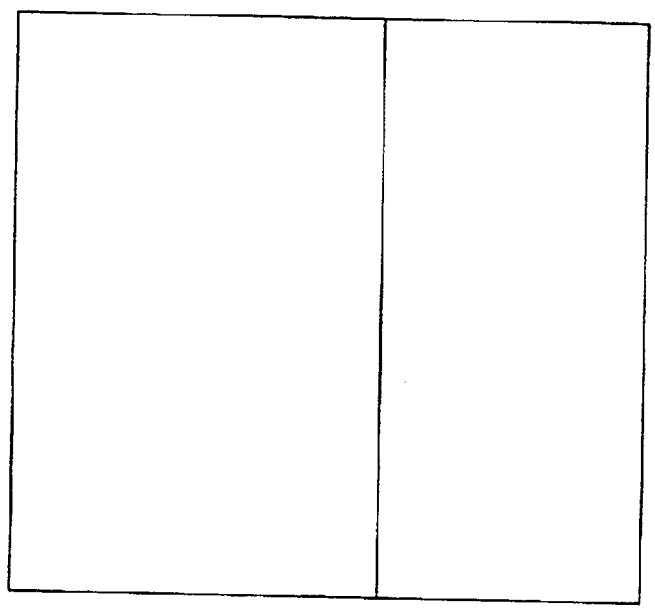

Those skilled in the art will recognize that any number of virtual pages can be proportionately mapped to any number of pixels along edge 815. A graphical representation of proportional pixel mapping is illustrated in FIG. 9A. For example, when a user clicks adjacent to book 800 but not on a tab 805 and not on slider 825, the virtual pages would turn to a page whose location is proportional to the distance along edge 815.

For larger books, e.g., a book having 1200 pages, the slider 825 moving along edge 815 would not provide enough page selectivity. In order to increase the utility of the page selection process, therefore, a non-proportional pixel mapping may be introduced along edge 815, as illustrated in FIG. 9B. In this way, greater discriminability of virtual pages would be accommodated in certain portions of edge 815.

In a preferred embodiment of the present invention, a degree of interest function could be used to warp the correspondence between edge 815 of book 800 and the page to which a selection is made. This technique would also help in page selection for smaller books, since pointing need not be so precise. Specifically, a non-uniform mapping process could be used in accordance with the user's calculated degree of interest in order to more efficiently utilize the space provided.

As discussed above, the degree of interest (DOI) function used can operate with a temporal distance value based on the amount of time since an object was last viewed. Alternatively, the distance value may be based on a spatial distance, such that the currently viewed page would have a high degree of interest assigned thereto, and the degree of interest values would fall off as the number of the other pages are located further from that page in the book. The degree of interest calculation could be performed for each page p using an exponential function such as:

$$DOI(p) = \frac{1}{Ae^{k|c-p|}}$$

wherein A and k are constants, e is the base of natural logarithms (approximately 2.71828), and |c−p| is the absolute value of difference between a current page number c and each page number p. FIG. 9B shows values used in an exemplary non-uniform mapping process using the degree of interest function above. Values of A and k can be derived so that the DOI function mimics the shape of the curve portrayed in FIG. 9B, taking into account the range of all page numbers (the x-axis) and the total number of display pixels which may be allotted to all virtual pages to be displayed (which dictates the number of pixels allotted per page, the y-axis).

Figure 10:
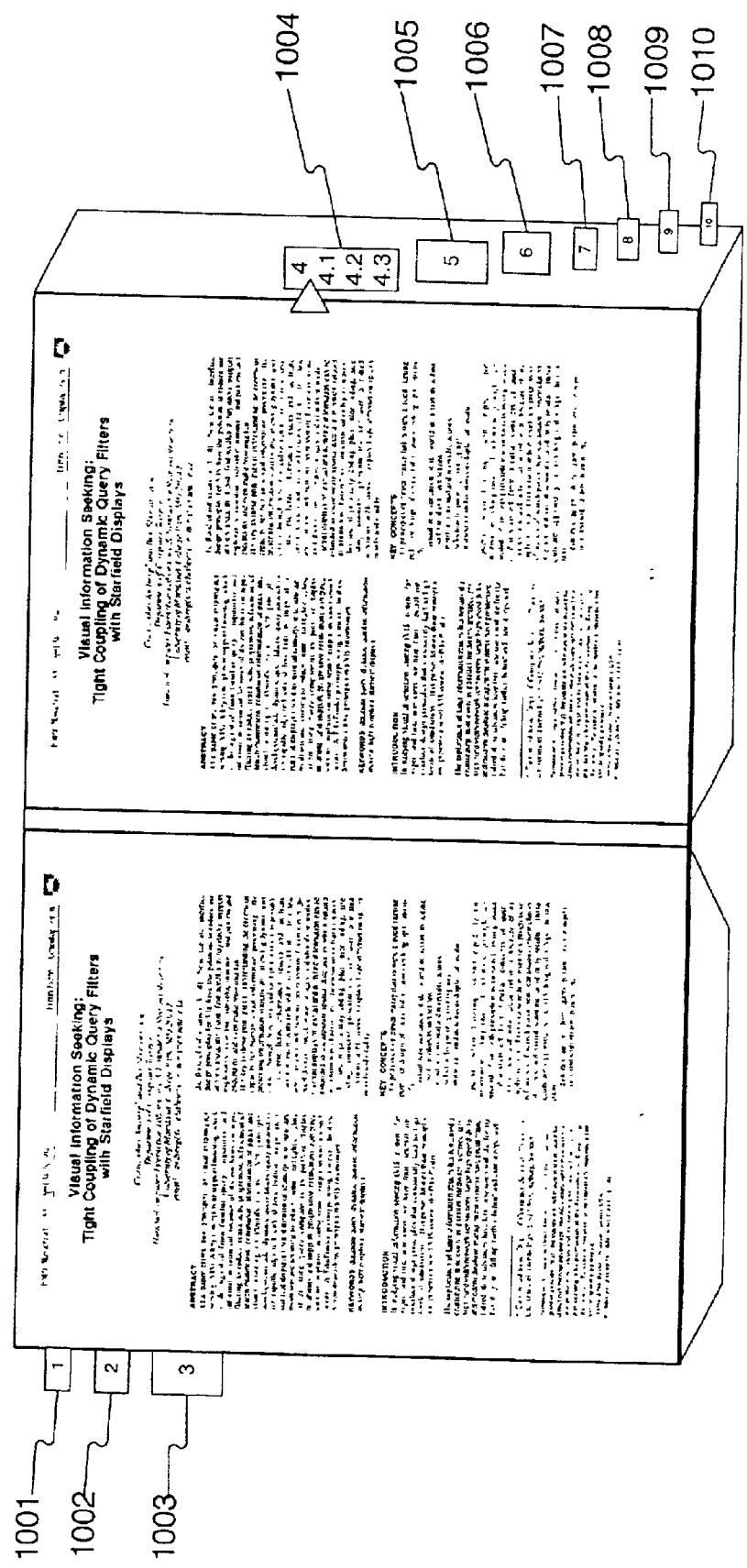
FIG. 10 shows an exemplary three-dimensional book in an open state according to the invention.

This non-uniform mapping process can also be extended to provide further information from the chapter tabs discussed above. As shown in FIG. 10, the degree of interest mapping of the selectable Y-axis results in a non-uniform mapping of chapter sizes. The larger chapter tabs 1003, 1004, and 1005 corresponding to those chapters closest to the currently viewed chapter have extra space that can be used, for example, to display sub-chapters or sections as shown on chapter tab 1004 in FIG. 10. Further, the relative sizes of the chapters shown can be used to provide the user with information about the relative page selectability of the sections of the book as shown, i.e., to provide a visible scale of the distortion of page size by adjusting the size of the tabs accordingly.

With the book and book edge metaphor in place, a number of different methods of navigating through the book may be made available. One page turning method is to allow single pages to be flipped from the current page by clicking on either the right side page or left side page of the book. Clicking on the right side page results in moving one page forward and the left side page in moving one page back. Alternatively, this might be accomplished by holding a mouse button down while making a rightward gesture to move forward one page or a leftward gesture to move back one page, simulating the hand movement of turning a physical page. The act of opening to the next or previous page is shown as an animation of the page flipping within the view of the user.

Alternatively, page flipping may be accomplished by, for example, selecting a point on the edge of the book and dragging it up or down to cause the pages to flip in the selected direction (i.e., up-flips in the direction of the front of the book and down-flips in the direction of the back of the book). Because different page flipping speeds may be needed for differing tasks of the user, the user is given the ability to select the desired flipping speed by, for example, correlating the page flipping speed to the distance along the edge of the book that the cursor moves once page flipping is initiated.

For slow flipping speed, i.e., where the user does not move the cursor far after initiating the page flipping process, a full animation is provided to show each individual page flipping. In this way, all information for the displayed page is mapped onto the flipping page. Further, by moving the cursor back and forth, the user can very selectively control the flipping of the page by, for example, stopping it in mid-flip, or moving the flipped page back and forth.

As the speed of page flipping increases, however, the computer may not be able to successfully show the individual page flipping and keep up with the mapping of all of the information necessary to display the animation. In order to maximize the book metaphor and still provide useful information to the user while the flipping is in progress, therefore, an alternate viewing scheme can be adopted for accommodating the faster flipping speed. This faster flipping speed would commence once the flipping speed increases beyond a preselected threshold speed.

Figure 11:
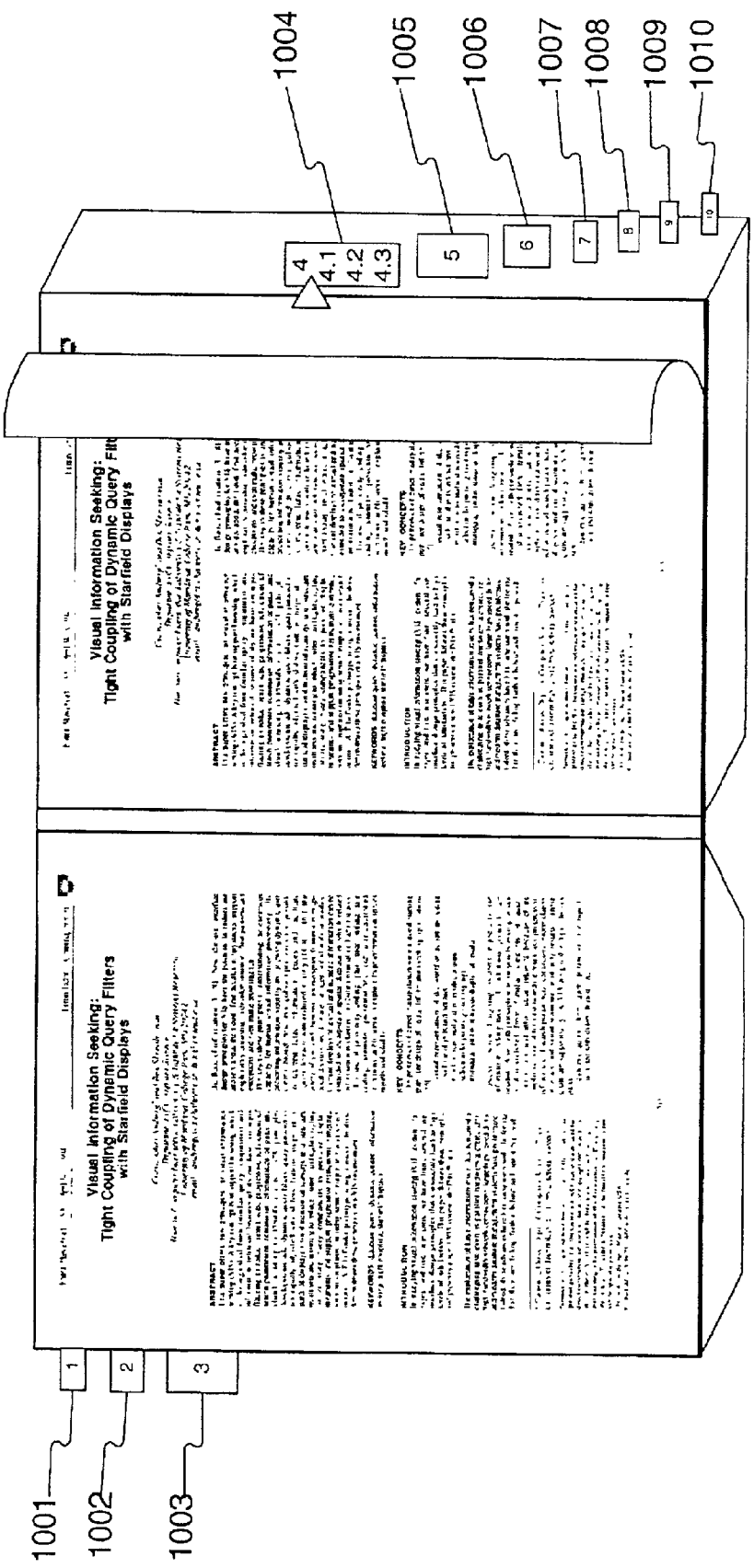
FIG. 11 shows an exemplary three-dimensional book in a stripe flipping state according to the invention.

One exemplary animation would show a fraction of the page containing at least some of the content of the page, e.g., a quarter of the page, folding over. One such animation is called stripe flipping, as stripes of the both the facing and following page are shown during the flipping animation. Alternately, any corresponding fractions of a facing and a following page may be displayed during a partial flip animation. In this way, the user may see information available on the displayed portions of the facing page being flipped and its following page. An exemplary partial flip animation, stripe flipping, is illustrated in FIG. 11.

Figure 12:
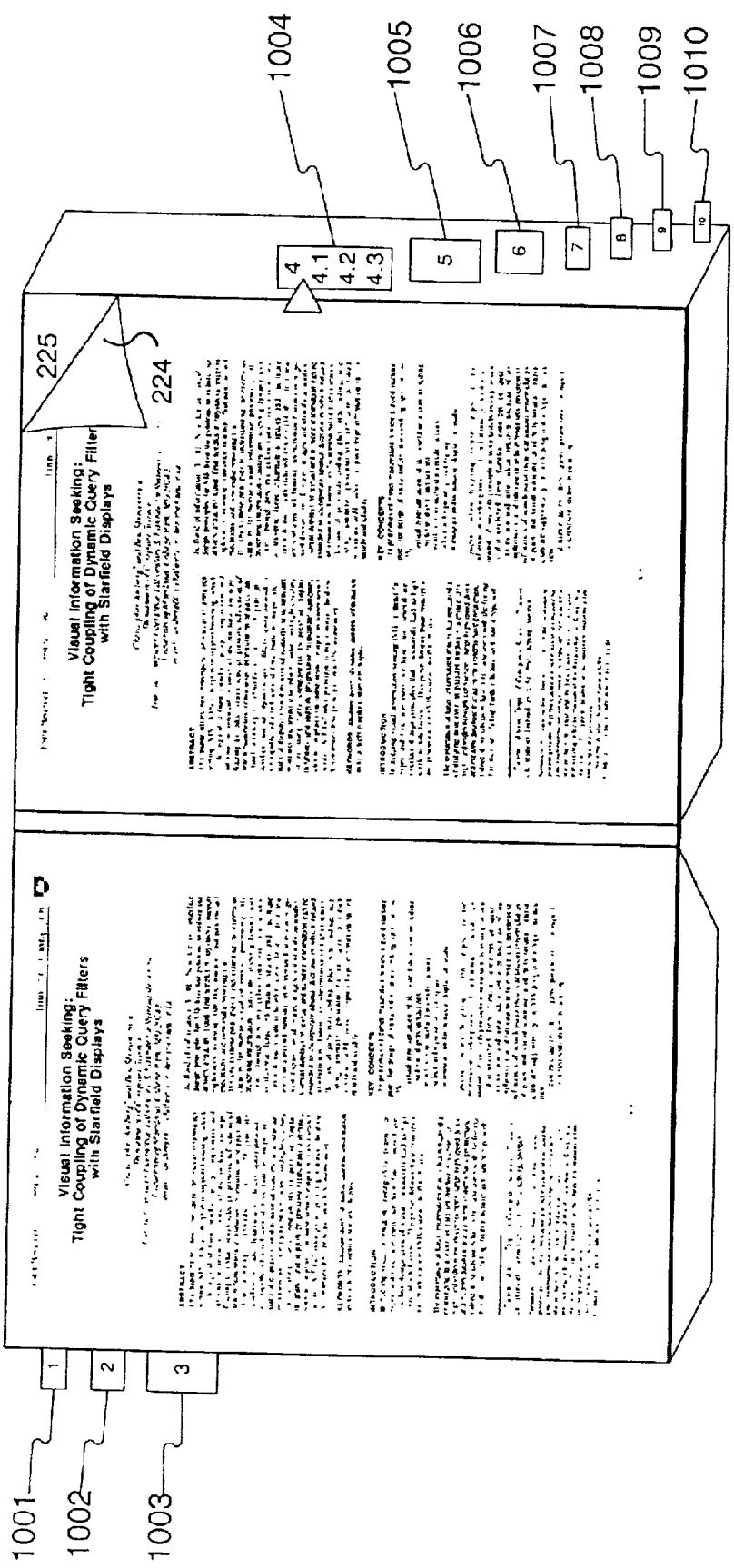
FIG. 12 shows an exemplary three-dimensional book in a corner flipping state according to the invention.

For even faster flipping speeds, the animation required to show even a fraction of the content of each page would likely not provide much utility to the user, and could possibly exceed the processing power of the computer. Instead, as shown in FIG. 12, the book can be shown flipping only the corner of the page, which would reveal the page number of a flipped page and a potential facing page (here shown as page 224 and page 225, respectively), but no other information. This mode is activated by passing a second preselected threshold of page flipping speed. Since corner flipping does not require page content data, it does not require as much processing time as full or partial page flipping. Thus, it may be processed and performed quickly. The animation can include accumulations of curled pages in order to keep with the three-dimensional book metaphor.

Figure 13:
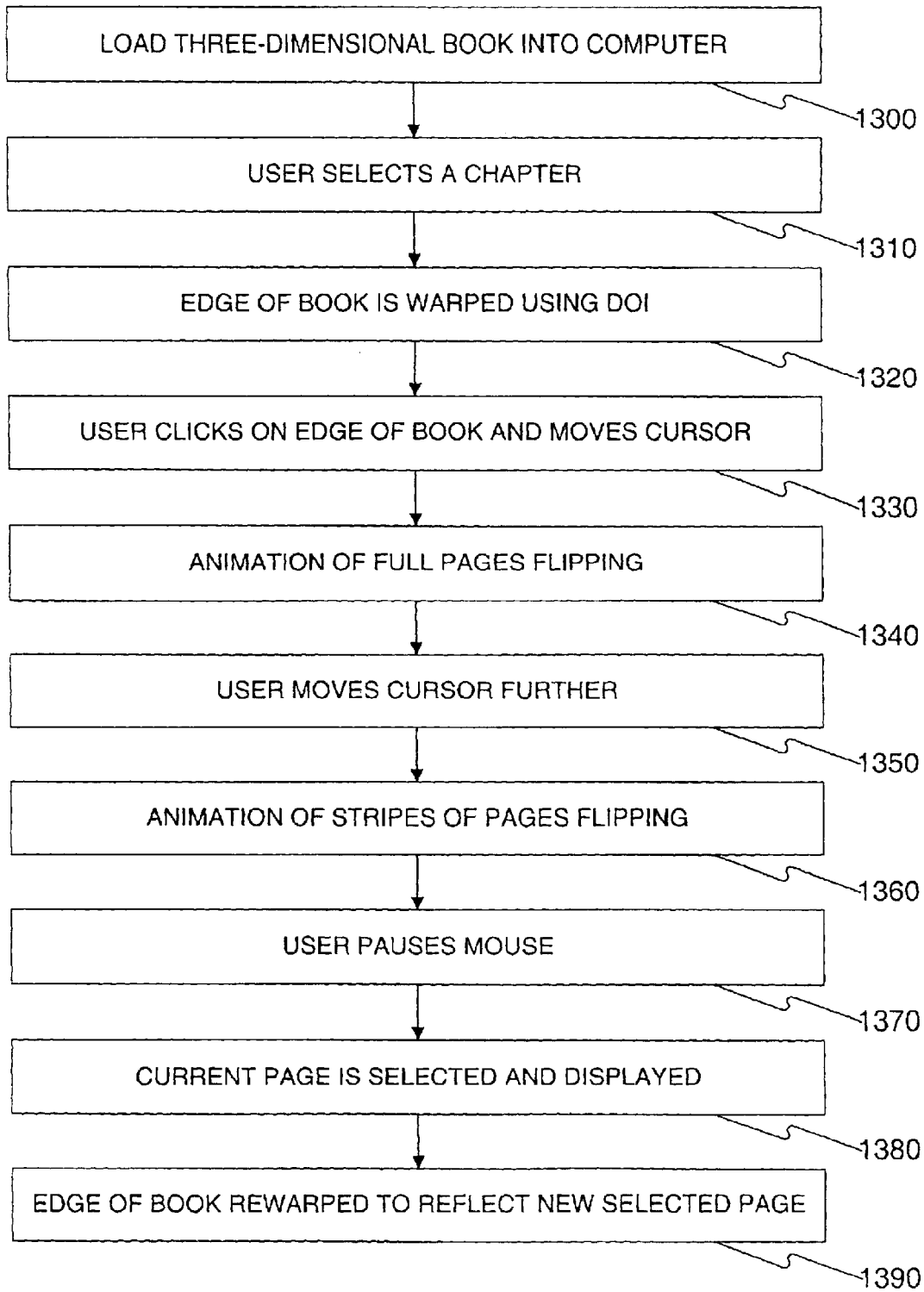
FIG. 13 is a flow chart of an exemplary navigation through a three-dimensional book according to the invention.

FIG. 13 is a flow chart of the processing of a three-dimensional book for viewing as a user performs certain commands with the program. In step 1300, a book is first loaded into the computer, and is shown, for example, in the manner displayed in FIG. 10. Because the book has not yet been opened, the degree of interest function is not used to warp the edge of the book. In step 1310, the user selects, for example, chapter 4 by clicking on the chapter tab assigned to chapter 4. In step 1320, the computer warps the edge of the book using the degree of interest function, and opens the book to chapter 4 to show the image shown, for example, in FIG. 10. In step 1330, the user clicks on the edge of the book and moves the cursor slowly downwards. In response to this command, in step 1340, the computer shows the pages flipping slowly. In order to proceed more quickly through the book, the user moves the cursor further downward in step 1350. Because the edge of the book is warped using the degree of interest function around the current page, the further from the starting point the user moves, the more sloped the page versus distance function becomes, as shown in FIG. 9B. Once the first threshold speed is exceeded, in step 1360, the computer adopts the stripe flipping format shown in FIG. 11. In step 1370, the user pauses the mouse during the page flipping operation for longer than a predetermined threshold time. The computer then determines in step 1380 that the user has selected the page currently partially flipped open. The selected page is then fully flipped to show the entire contents. The edge of the book is then re-warped to reflect the new page selected at step 1390.

For documents shown in a form other than a book metaphor, the warping of the edge of the book function described above can be modified to accommodate the alternative display format. One version of this alternate display format is exemplified by the scroll format used by many word processors. The document being displayed is viewed as a continuous scroll including all of the information included in the document. For these programs, the display often includes a "scroll bar" that can be used to navigate through the document. The scroll bar is shown as a linear mapping of scroll bar distance versus position within the document. Instead of this linear mapping, the scroll bar may be warped using a function similar to the above-discussed degree of interest function. In this way, portions of the document closer to the currently-viewed section will be correlated to a greater area on the scroll bar than areas a greater distance from the currently viewed section.

FIGS. 14A and 14B show two exemplary versions of a modified scroll bar. In FIG. 14A, the document is divided into sections, wherein the degree of interest function has been used to warp the correlation between a position in a document and a scroll bar position on scroll bar 1400. For example, in scroll bar 1400, section 4, the current section, is accorded a larger portion of the scroll bar than are sections 1 and 10. Optionally, sub-section information may be provided for a section with a high degree of interest, as shown for section 4 in scroll bar 1400. A slider 1405 is provided for navigating with scroll bar 1400.

Additional information may be added to the scroll bar as shown in scroll bar 1410 of FIG. 14B, wherein a table locator 1420 and a figure locator 1430 indicate table and figure locations in the document. A distinction between table and figure locators can be made using texture or color for each type of document object. A user may navigate using slider 1405 as provided on scroll bar 1410 or by clicking on a table locator 1420 or a figure locator 1430.

Figure 7:
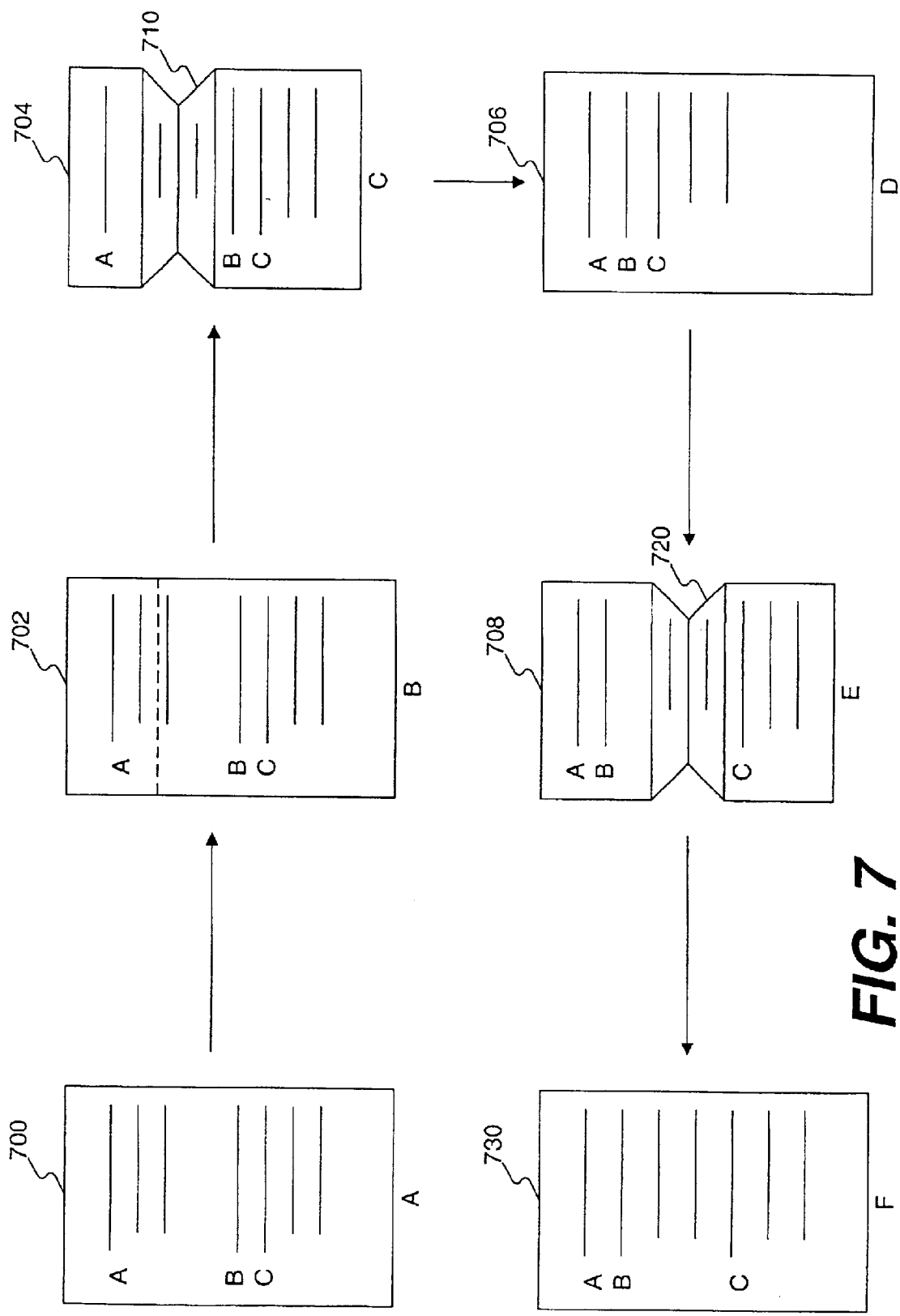
FIGS. 7A–7F show a process of folding and unfolding a page according to the invention.

As discussed above with respect to folding pages as discussed in relation to FIG. 7, it may not be possible to display an entire page of a book in a sufficiently large format to permit a user to view the information provided thereon. A solution to this problem is to display the entire page in a small format, such that much of the information provided thereon, such as title, image, and contextual information is available, while enlarging a select portion of the image to a size easily readable to the user. This enlargement can be performed using a mathematical approximation of a lens enlarging a select portion of the viewed image. An exemplary lens is described, for example, in "The Document Lens," by George G. Robertson and Jock D. Mackinlay, *Proceedings of UIST '93*, 101–108 (1993), which is incorporated herein by reference.

Figure 15A:
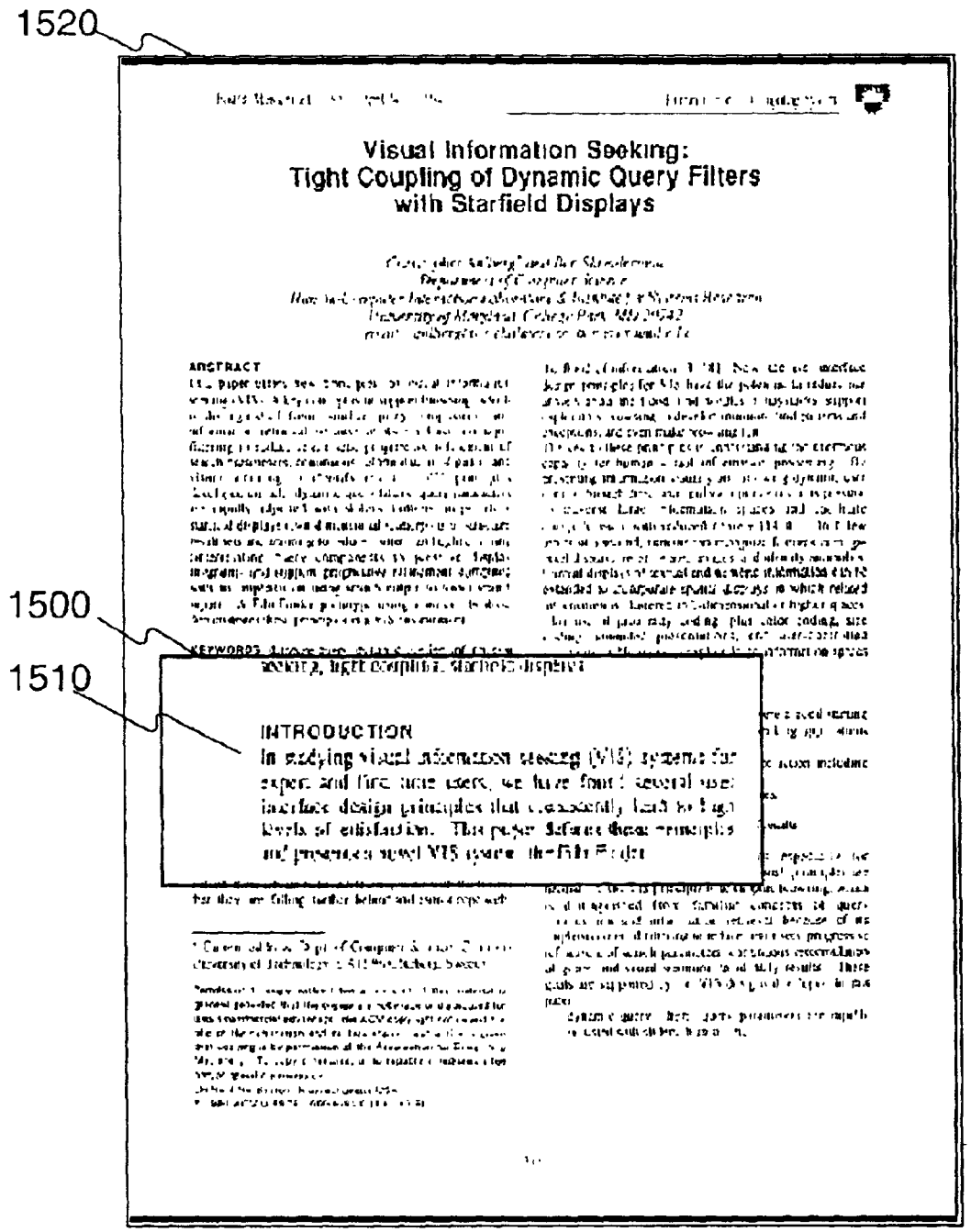
FIGS. 15A and 15B show a page having a section thereof magnified according to the invention.
Figure 15B:
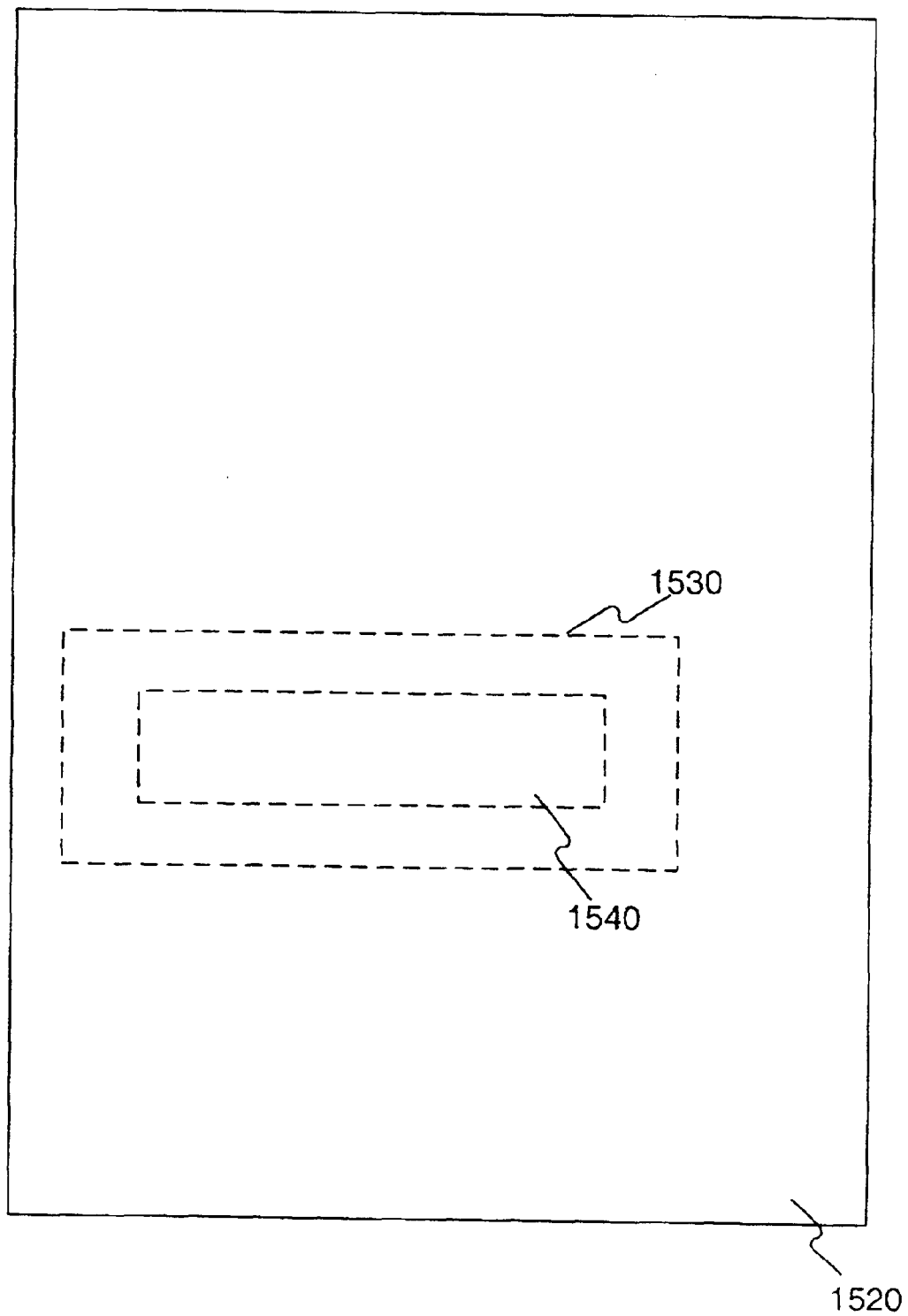

A simple magnifier representative of a magnifier metaphor is shown in FIG. 15A, wherein a magnifier 1500 is shown magnifying a region 1510 of a document 1520. Region 1510 corresponds to a magnified version of an unmagnified region 1540 of document 1520 in FIG. 15B. As can be seen by comparing FIGS. 15A and 15B, the simple magnifier 1500 obscures a region 1530 (shown in FIG. 15B) from view.

Figure 16A:
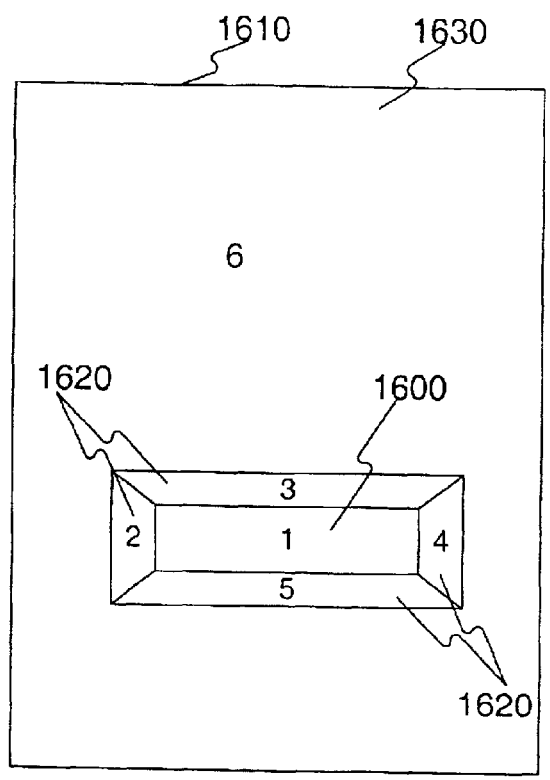
FIGS. 16A and 16B show exemplary portions of a page magnified according to the invention.

Instead, as shown in FIG. 16A, a stretchy lens can be used, wherein a central region 1600 of the lens is used to provide a direct magnification of a central region of the area of the document 1610 to be viewed in a similar manner as the magnification shown in FIG. 15A. In the regions 1620 surrounding the central region a differential magnification is adopted, such that the portion of areas 1620 abutting the central region 1600 is magnified to the same extent as central region 1600, the magnification falling off (e.g., in a linear fashion) down to the side of areas 1620 abutting unmagnified regions 1630 of document 1610, which will not be magnified. In this manner, the information provided in the area 1530 of FIG. 15B which was obscured is now shown, though the text or images in this areas will purposefully appear warped using a stretchy lens. Thus, in this preferred embodiment, the stretchy lens substantially defines a virtual pyramidic solid.

Figure 16B:
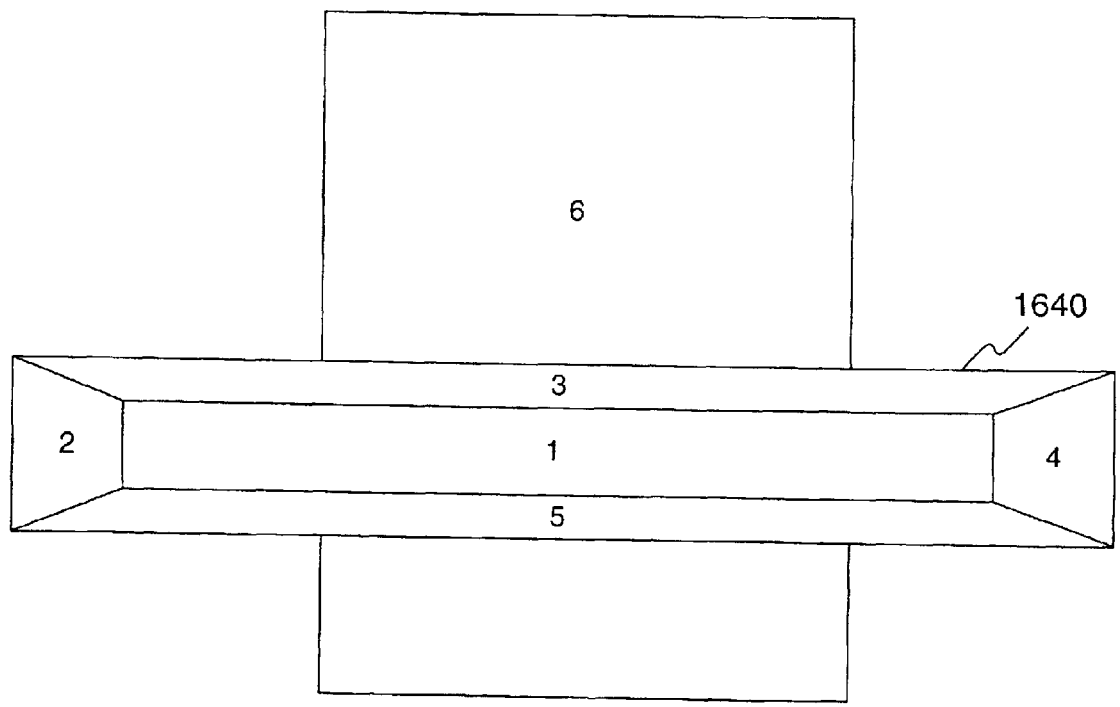

As shown in FIG. 16B, the magnifier 1640 can be selected so as to span the entire width of the page 1640. Here, all of the text or images spanning the entire width of the document are viewable by the user, and all of the remaining information from page 1640 can also be viewed in a lower magnification around the magnified region. In alternate arrangements, three-dimensional lenses having different spatial magnifications may be used or multiple lenses may be employed.

Another method of displaying all of the information provided on a page within a limited area allotted is shown in FIGS. 17A–17C. This display method is called the "stretchy page" display method. In this arrangement, as shown in FIG. 17A, a page 1700 is divided into a number of regions, here shown, for example, as six regions: 1710, 1720, 1730, 1740, 1750, and 1760. Region 1710 is the focal area at which the user currently is directing his/her attention. Because this is the region of interest, this region is displayed having a constant large magnification. Regions 1720 and 1730, respectively above and below region of interest 1710, are shown having full magnification in the horizontal direction, but are less magnified in the vertical direction, such that areas 1720 and 1730 have a shortened appearance. While contextual information within regions 1720 and 1730 is visible, the text and images are purposefully distorted to accommodate the focal area of region 1710.

The other side of the page is also broken into three regions. All three regions 1740, 1750, and 1760 are shown having lower magnification in the horizontal direction. Middle region 1750 is fully magnified in the vertical direction to match the vertical magnification of the area of interest 1720, while regions 1740 and 1750 share the lower vertical magnification of areas 1720 and 1730. Examples of the page as magnified are shown in FIG. 17B and FIG. 17C.

For both the stretchy page and stretchy lens display formats a number of different focal area movement options are possible. Exemplary focal area movements include dragging the lens across the document to display different areas of the document in enlarged format. Alternatively, a clicking operation before or after the lens on the page could be used to relocate the lens a set distance forward or backward along the page. Another possibility is to move the lens to the next paragraph, such that the lens would resize itself to fit the paragraph unless the paragraph were too long to fit within a reasonable display area. The lens may also be moved at a constant set speed along the page, the speed being set by the user to conform to the speed at which the user reads. This alternative is analogous to the method of speed reading.

Another exemplary area of interest movement scheme utilizes an eye-tracking device, such that the computer could determine the position on the display at which the user is currently looking. When eye movements are within a threshold distance of the bottom of the area of interest the area would be moved forward. Such an eye movement tracker could be used in combination with the constant speed method described above to ensure that the lens keeps pace with the reader. Because quick movements of the eye may not correspond to specific changes in the users interest, e.g., where the user looks briefly to the side, a delay may be implemented to ensure that such brief changes may be ignored.

In another page viewing technique (called "pop and pick"), the starting view of the document is shown as a full view of the entire page. As discussed above, when the entire page is viewed at once the text or image may not be sufficiently magnified for use. The user, therefore, selects a specific position on the page, resulting in an animation of zooming in toward that particular part of the page. Once the zoom is complete the selected area is sufficiently magnified for use. To view another portion of the page, the user indicates by a control (such as a button press or mouse movement) for an animated zooming out to the full page view. The user may then pick a place and zoom in as before.

These two zooming functions may be combined. For example, while the display is in a zoomed position, a user may click and hold a mouse button to cause the display to zoom out to a full-page view. With the mouse button still held down, the user may move the mouse until it is positioned at another portion of the document which is to be read. At this point, the user may release the mouse button to zoom the display into the portion to be read. Optionally, all zooming actions may be animated.

Expanding on the three-dimensional book metaphor, the viewing perspective of the book itself can be modified to improve readability. As shown in FIGS. 18A and 18B, the view of the page 1800 can be tilted or angled to provide a view of the full page. The mapping of the texture of the page on the angled page results in large print for the portion of the page closer to the user in three-dimensional space and smaller print for the portions of the page farther from the user in three-dimensional space.

The starting view for this method (called "duck and zoom") is a partial page display sufficiently zoomed to allow for the user to read the text. Using, for example, a mouse or other suitable input device, the user may activate a tilting function to rotate the page in three-dimensional space about a horizontal axis at the middle of the virtual page. The display program provides an animation as the page is in the process of tilting. For example, the user may press a mouse button and move the mouse up slightly while holding the button down to cause the top portion of the page to tip toward the user in the display. Once tilting is complete, as shown in FIG. 18A, information displayed at the top of the page is readable. The position of a pointing device such as a mouse may be indicated by a cursor 1805. The user may also click and drag the cursor over the portion of the display which is of interest to the user; this action causes the display to zoom to this region of interest.

When the user no longer wants to view this portion of the page, the user may press the mouse button and move cursor 1805 down in the display, the page would tilt the bottom of the page forward into view, as shown in FIG. 18B. Again, the display program animates the transition. The user may again use a zooming feature to select and zoom into an area of interest.

This tilting function may be generalized by allowing any adjustment of the viewing angle in three dimensions. Nonetheless, limiting the tilting function to a single axis of rotation has the virtue of lending simplicity to user interfaces.

Figure 19:
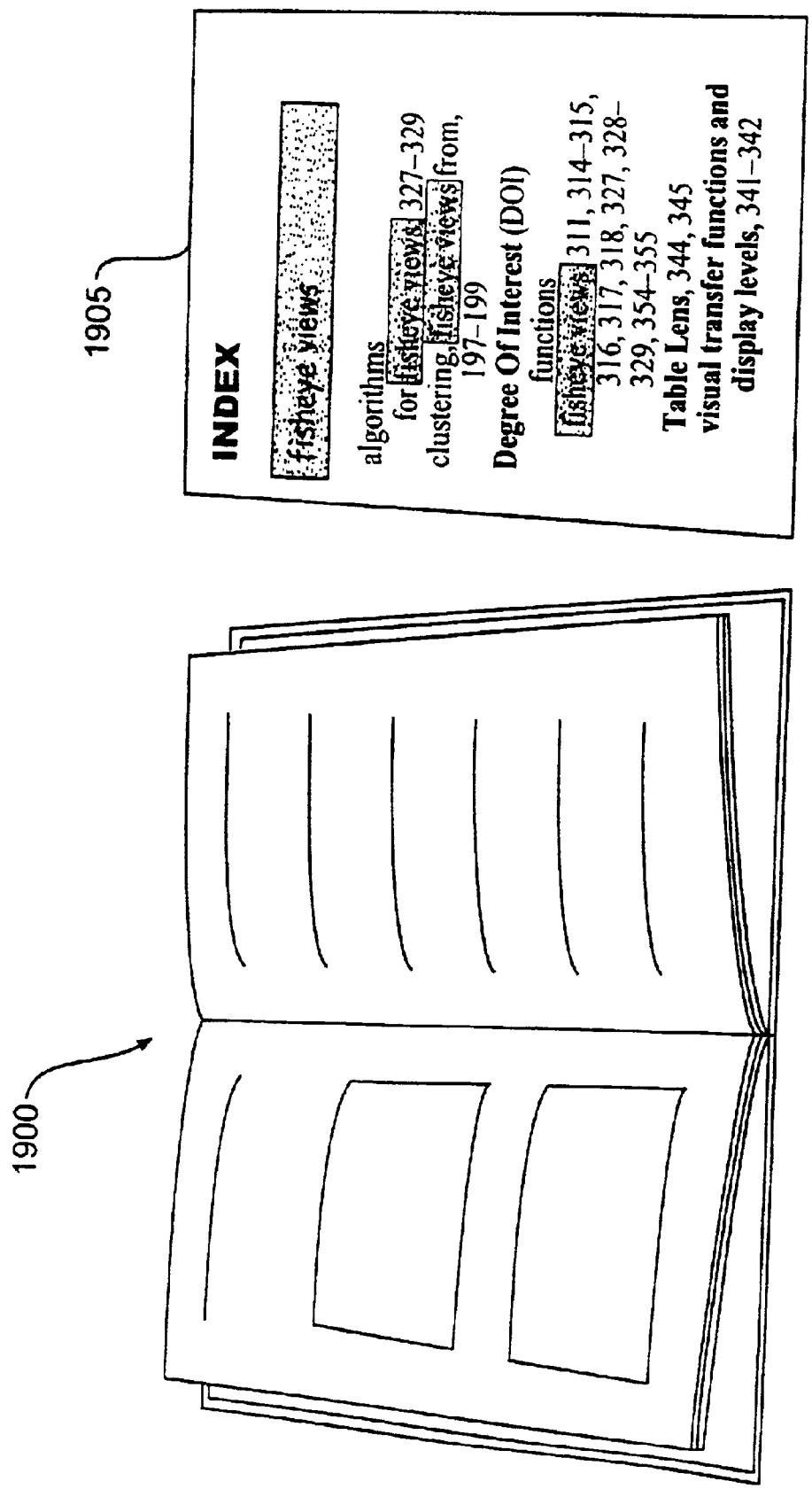
FIG. 19 shows the display of a index as a slide-out page according to the invention.

In addition to the methods of showing the image and textual information provided within the document, methods for locating and displaying information about the three-dimensional book are also disclosed. A well-known method of finding needed information within a book is to look in the index of the book. Expanding on this index concept is the creation of an index using "focus and context" as a page of the three-dimensional book. Referring to FIG. 19, an index page 1905 may be slid out from a book 1900 so that index page 1905 and book 1900 can be viewed simultaneously.

An exemplary focus and context index page is shown as page 2000 of FIG. 20. Page 2000 includes a search box 2010 for inputting a term based on which the index will be created. Upon inputting the term into search box 2010 by, for example, typing or pasting text, the computer constructs a customized index for that term. An preferred process for constructing this unique index will now be described.

The starting point for this construction should preferably be an actual index for the document from which the three-dimensional book was created. Ideally, this index may already exist from a physical representation of the book, but it may be constructed by using any of the many indexing algorithms known to those skilled in the art. Obviously, the ready-made or preprocessed actual index should be in electronic format.

Another necessary ingredient for processing a customized index is an inter-term similarity matrix for the terms in the book. The conceptual basis of the inter-term similarity matrix is to provide a semantic analysis of the relationship between the words within the analyzed document. Due to the great processing resources necessary to create an inter-term similarity matrix, this matrix should ideally be preprocessed.

An exemplary method for creating an inter-term similarity matrix is called the windowing method. With this method, contiguous groups of a preselected number of words n are iteratively isolated within the text of the book. Preferably, the window may encompass 40–300 words at a time. As the window is moved over each contiguous group of n words in the document, a matrix is created for recording associations between pairs of words within the window. For each instance a pair of words appear together within the window, a value for recording this association is incremented. Thus, at the end of the iterative process, a large matrix is created which records how many times each word was present in the window with each other word in the document. Finally, the values within the matrix are normalized to values between 1 and 0.

Figure 21:
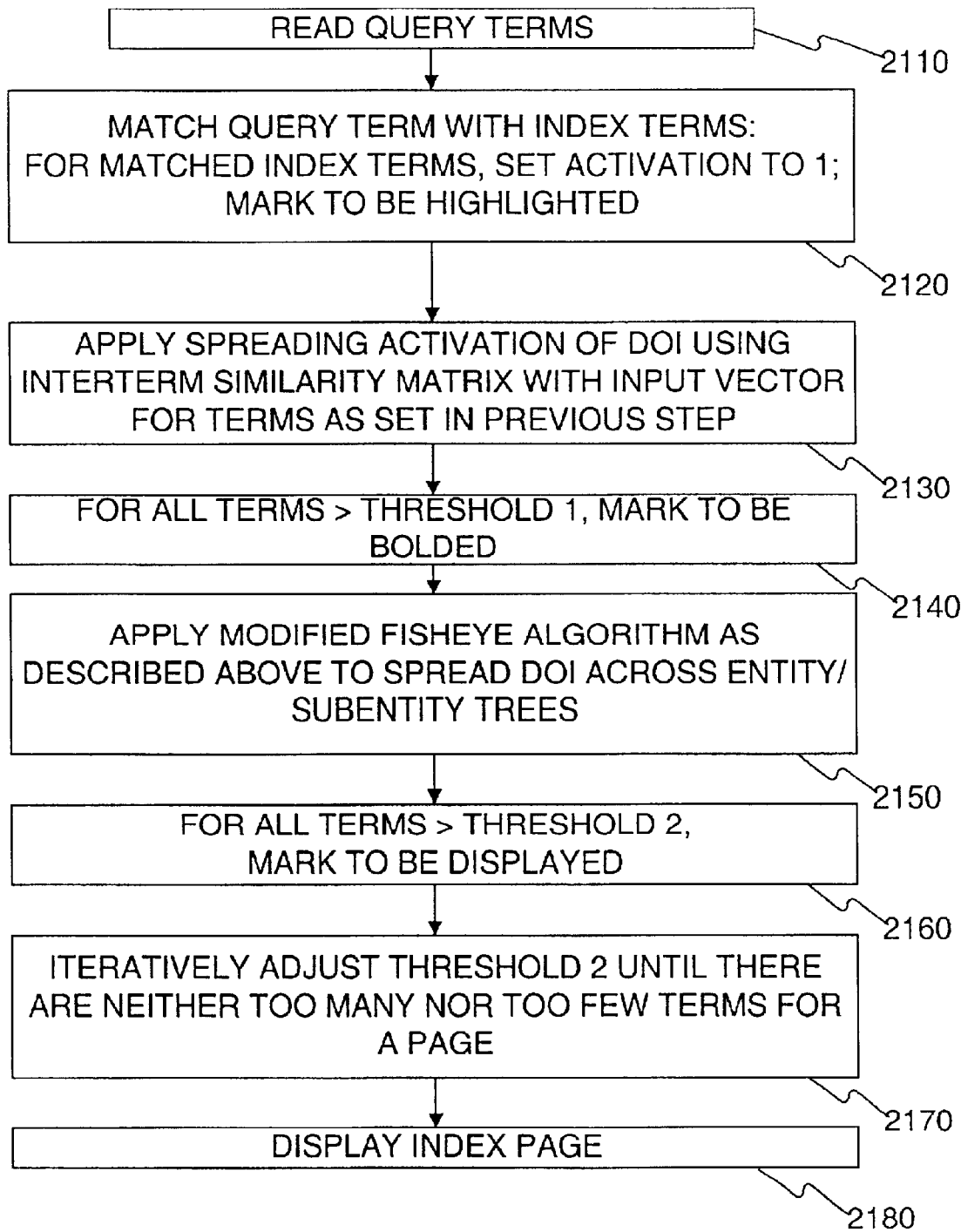
FIG. 21 is a flow chart of an exemplary method of creating an index page according to the invention.

The method of creating a customized index for a given search term is illustrated in FIG. 21. Starting with an actual index, the method uses several different processes to refine and condense this actual index into a customized index for the search term. In step 2110, the search term is read from search box 2010 of FIG. 20. As illustrated in search box 2010, this term would be "fisheye views." In step 2120, if the search term is found within the actual index, that term is assigned a maximum degree of interest value to indicate the likelihood that the information provided in the actual index will be of interest to the user. This assignment of a maximum degree of interest is performed, for example, by assigning an activation value of 1. In a preferred embodiment, search terms which match actual index terms are be differently displayed in the customized index, such as with highlighted terms 2020 of FIG. 20.

Next, in step 2130, a method of spreading activation is applied to create a new set of DOI values for the words in the book. This method utilizes inter-term similarity matrix 2100. Spreading activation is described in U.S. Pat. No. 5,835,905, which is incorporated by reference. The type of spreading activation used is, for example, the so-called leaky capacitor model. The leaky capacitor model is described in "Spread of Activation", *Journal of Experimental Learning and Cognition*, Vol. 10, No. 4, pages 791–798 by Anderson & Pirolli, 1984, which is expressly incorporated herein by reference. To compute spreading activation using the inter-term similarity matrix, the vector term of degrees of interest are multiplied by the inter-term similarity matrix R according to the following equation:

$$A(t)=C+MA(t-1)$$

$$M=(1-\gamma)I+\alpha R$$

where, I is the identity matrix, M is a matrix that determines the flow and decay of activation among nodes, $\gamma$ determines the relaxation of a node back to zero when it receives no additional activation input, $\alpha$ determines the amount of activation that spreads from a node to its neighbors, and R is a matrix constructed by assigning the strength of association between nodes i and j as the value of $R_{ij}$. The diagonal of the matrix R is assigned the value zero.

The amount of activation that flows between nodes is determined by the activation strengths. The activation strengths correspond to bibliographic coupling and cocitation strengths. Source activation is represented by a vector C, wherein $C_i$ represents the activation pumped in by node i. The dynamics of activation can be modeled over discrete steps t=1, 2, . . . N, with activation at step t represented by a vector A(t), with element A(t, i) representing the activation at node i at step t.

The application of spreading activation to the degree of interest for each term results in a new vector comprising degree of interest values for each term. Those terms similar to selected terms will have an increased degree of interest as determined using the inter-term similarity matrix. The degree of interest values originally set to a maximum value in step 2120 (because they were found in the actual index of the book) will remain in the maximum state.

In step 2140, terms having a degree of interest (DOI) value in excess of a threshold1 are identified as being of interest to the user. When later displayed, these terms may be differently displayed in the customized index by, for example, bolding the terms. Alternatively, threshold1 may be dynamically adjusted according to the number of terms marked in bold in the final display.

In step 2150, the entry-subentry structure of the actual index is taken into account. For each of the sub-entry terms having a high DOI value, the degree of interest value its parent entry (the more general term above the sub-entry) is assigned an increased degree of interest value. The degree of interest values of the "sibling" entries (other sub-entries of the same parent entry) may also be assigned an increased degree of interest value. These tasks are accomplished by applying the same "fisheye lens" algorithm disclosed above to the set of DOI values from step 2130. In step 2150, the "intrinsic DOI" would be related to the DOI value from step 2130, while the "distance-based DOI" would reflect the entry-subentry structure.

In step 2160, a second predetermined threshold value threshold2 is used to select additional terms to be displayed. Those terms having a degree of interest value in excess of threshold2 are slated for display. Depending on the amount of information selected, threshold2 may, in step 2170, be iteratively adjusted to increase or decrease the amount of information selected. The purpose of the adjustment is to ensure that the i amount of information will fit within the allotted display space, e.g., on a single slide-out page without leaving too much of the allotted space blank.

In some cases, the adjustment of threshold2 is very sensitive to increase or decrease, such that a minimum change results in a large increase or decrease in the number of items for display. In this case, a lower of two values for threshold2 results in too few customized index entries, while the greater of two values for threshold2 results in too many index entries. In such cases, threshold2 is set to the lower value, resulting in a customized index that has too few entries to fill a slide-out page, for example. To supplement these entries, a random number of terms from those additional terms that would have been displayed with the higher threshold2 value are selected for display. The result is an optimally-sized custom index.

In step 2180, the custom index is constructed into a virtual page for display. Next to each of the terms, the page number on which those terms may be found is displayed. Clicking on a term or page number from the list directs the program to animate the book opening to either the first page containing the term (if the user clicks on the term) or to the specific page selected (if the user clicks on a page number). Further, an interface may be displayed on the display to permit the user to travel through the book through each usage of the selected term.

As shown in FIG. 22, further search boxes may be displayed for the entry of further terms. FIG. 22 shows a first search box 2200 and a second search box 2210 are provided at the top of an index page 2220. Terms matching one or the other of the selected terms are set with a maximum degree of interest value, and the terms corresponding to each of the two terms are differently displayed by, for example, using two different colors of highlighting. In this way, entries matching the term in the first search box 2220 appear as first-color highlighted terms 2230, while entries matching the term in the second search box 2210 appear as second-color highlighted terms 2240.

The spreading activation method described above is used to process the pair of terms, wherein terms related to both of the selected terms will necessarily possess an increased degree of interest due to the relationship to both terms. Again, terms having a degree of interest in excess of a first threshold threshold1 may be displayed in bold to signify the likelihood that the term will be of interest. Threshold1 may be set at a variable level so as to ensure that a portion of the terms within a given range are displayed in bold.

In a manner similar to that described, a focus and context or customized table of contents may also be created based on terms input by a user. As with the focus and context index, the focus and context table of contents may be displayed as a slide-out page from the three-dimensional book. An exemplary focus and context table of contents 2300 is shown in FIG. 23A. The starting point for the table of contents 2300 is the actual table of contents of an exemplary three-dimensional book.

Each entry in the table of contents (the stored version of the entire table of contents including chapter headings, chapter subheadings, etc.) is assigned a degree of interest value. The value of the degree of interest for a given entry is variable in view of interactions between the user and the table of contents. The degree of interest may increase, for example, if the user clicks on an entry of the table of contents. The degree of interest may also increase, for example, if the user types in a term contained within the entry into search box 2310.

When the table of contents is first opened, i.e., before the user has interacted with the table of contents, it will appear in an undetailed manner by displaying only for example, chapter headings and undetailed chapter subheadings as shown in FIG. 23A. If the user were to click on a specific entry of the table of contents, for example, the entry associated with chapter 4, the table of contents expands that portion of the table of contents to provide more information about chapter 4, as shown in FIG. 23B. The expansion of the amount of information displayed regarding chapter 4 could possibly exceed the available space allotted for the display of the table of contents. To contend with this problem, the subheadings of the other chapters may be culled in order to maintain all of the displayed information within the allotted space as shown in FIG. 23B.

As discussed above, the degree of interest values of the table of contents are also responsive to queries input in search box 2310, say, by typing. As shown in FIG. 24, when a search term such as "fisheye" is typed into search box 2410, the display alters to reflect the altered degree of interest values associated with the items in the table of contents. The display of the items in the table of contents may also be altered, for example, by highlighting the uses of the term found in search box 2410, as shown with highlighted terms 2420. All entries containing the search term are set to a maximum degree of interest value.

Further, by using the spreading activation process determination discussed above with respect to the creation of a focus and context index, terms having a certain degree of similarity to the search term may be bolded to reflect the likelihood that those terms in the table of context will be of interest to the user. This likelihood is again determined by setting a threshold value threshold1 to decide which terms should be differently displayed. Entries having a degree of interest value above a second threshold value threshold2 are set to be displayed as part of the focus and context table of contents. The intrinsic degree of interest value discussed above may be set in view of the level in the tree of the table of context. Specifically, chapter headings may be set having a higher intrinsic degree of interest than sub-chapter headings, increasing the likelihood that chapter headings will be displayed.

Again, the total of the entries to be displayed may be selected by using a iteratively adjusted threshold2 value to ensure that the items to be displayed do not exceed the available space while also ensuring that the page does not remain mostly blank.

A search term may also be entered into search box 2410 by clicking on a term in the table of contents and dragging it into the search box 2410. The size of the focus and context table of contents is adjustable either manually or automatically using the degree of interest value assigned to the table.

Figure 25:
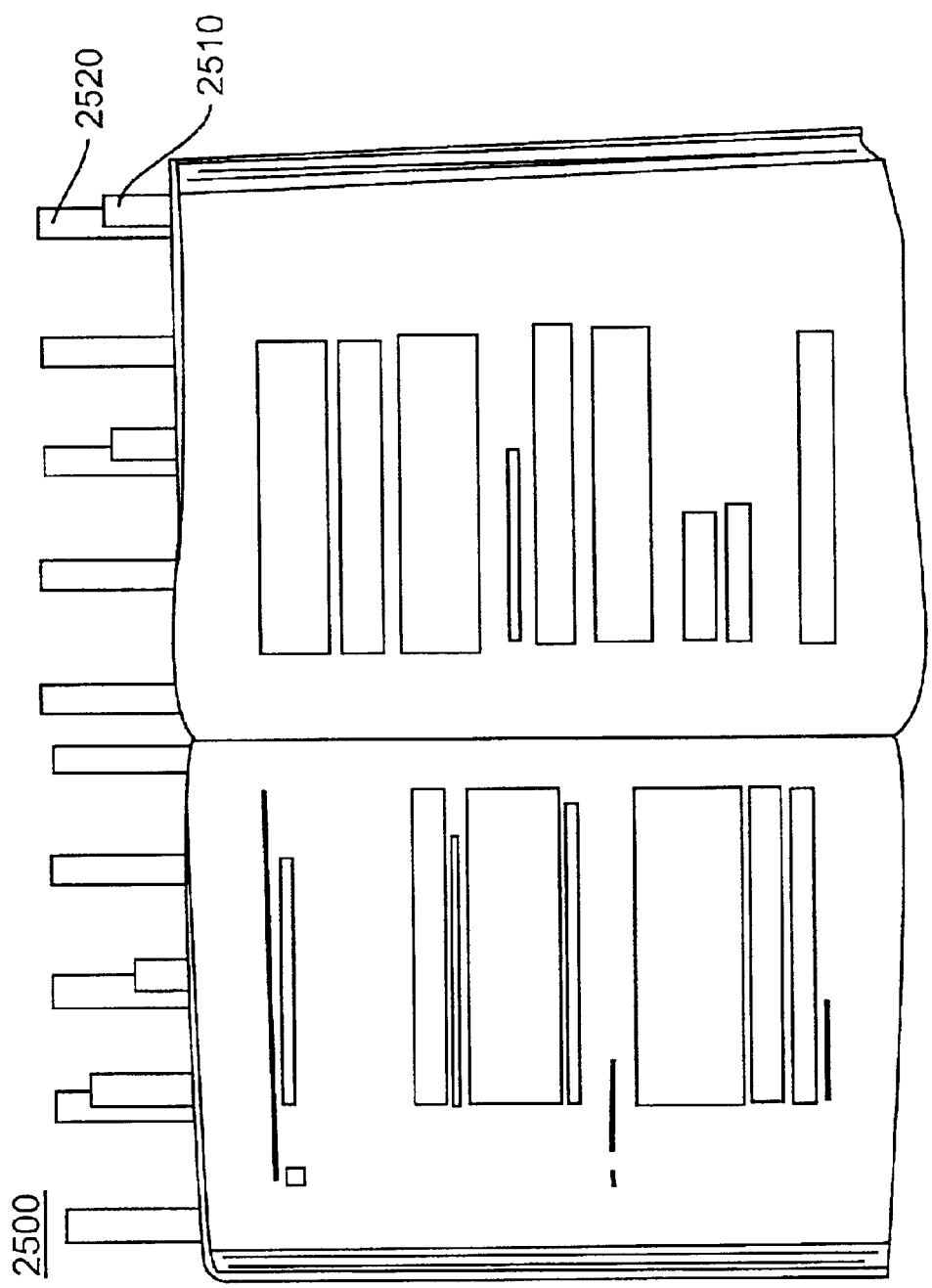
FIG. 25 shows an exemplary three-dimensional book having dynamic bookmarks according to the invention.

Information may also be made available to users via objects called "dynamic bookmarks." FIG. 25 shows an exemplary three-dimensional book 2500 having dynamic bookmarks 2510 appended thereto. Exemplary dynamic bookmarks 2510 are shown as bar marks. These bar marks are based on bar graph technology. The bar marks are presented as bars that rise from, for example, the three-dimensional book (or browser, hyper-text collection, or container medium).

The dynamic bookmarks may be used, for example, to display textual information. The textual information can be, for example, a result of a search query, wherein each of the bar marks extend from the top of a chapter of the book 2500 in which the search term is found. Further, the height of each of the bar marks may be selected so as to display the number of instances of the search term in the individual chapters. The determination of the number of uses may be performed as an adaptation of the find function. In order to provide the user with a scale against which the query results may be compared, reference marks 2520 may be added.

Figure 26:
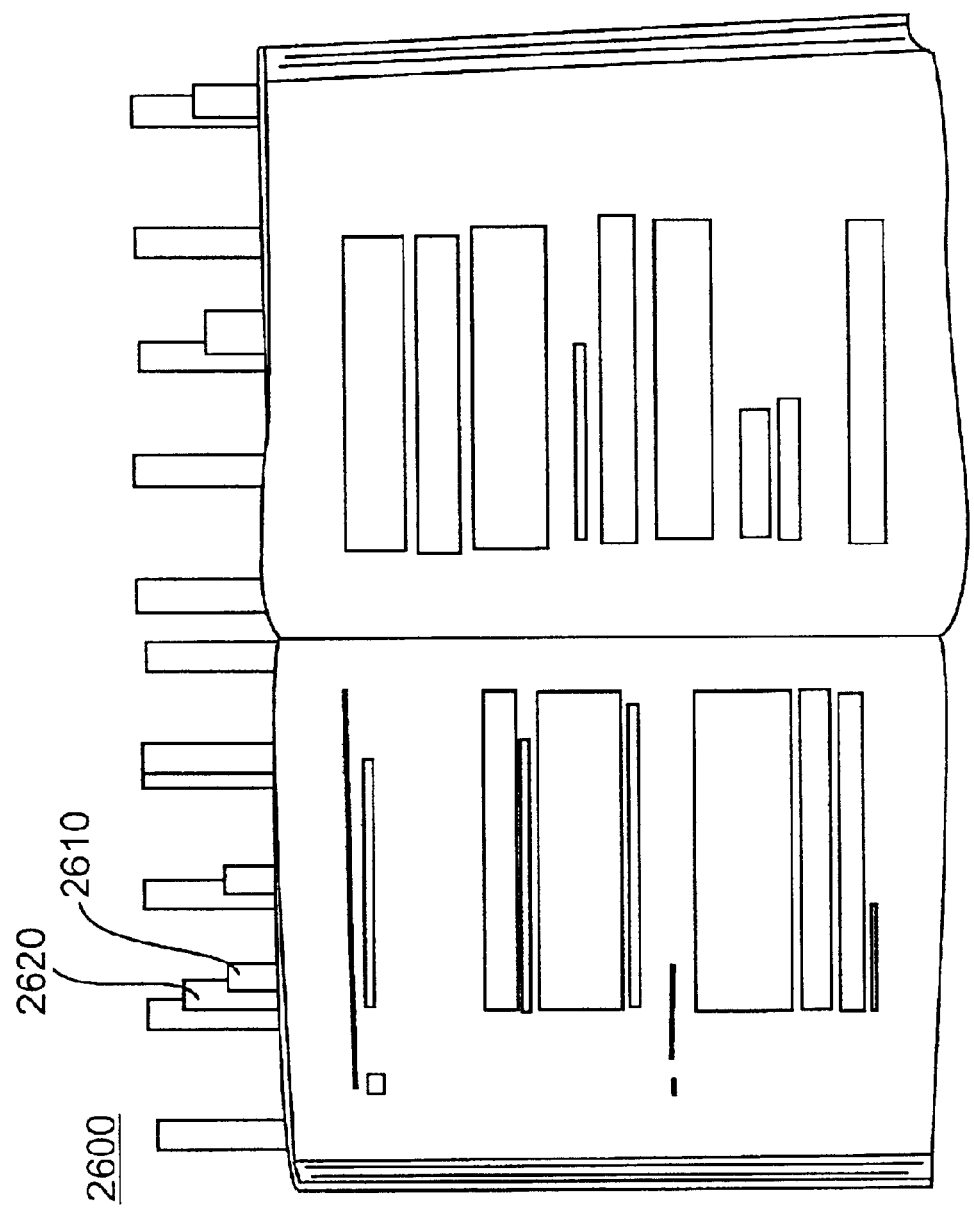
FIG. 26 shows an exemplary three-dimensional book having dynamic bookmarks according to the invention.

FIG. 26 shows an example of how the display shown in FIG. 25 may be adapted for the use of multiple search terms. The second search term will be added as bar marks 2610 above book 2600 having different colors or textures than those of the first bar marks 2620. As an alternative to showing the bar marks as side-by-side, they may be shown as overlapped or vertically placed one atop the other.

The bar marks as a separate graphical representation can be manipulated by the user. The user may, for example, click on a subset of the bar marks and perform a sub-query on the new selection. They user may also drag and drop the bar marks into another container to preserve the results and use the results later as a base set for other database operations.

Another optional use of dynamic bookmarks is as an adjunct to the focus and context index and/or table of context. Dynamic bookmarks could be added to the three-dimensional book showing the places at which the terms used to create the focus and context index and/or table of context are found. Further, clicking on the dynamic bookmark may be used to open the three-dimensional book to the page on which the search terms are used.

Physical limitations on the sizes of real books is one analogy that need not be transferred to electronic three-dimensional books. For example, a book such as *Information Visualization* by Stuart Card, Jock Mackinlay, and Ben Schneiderman (San Francisco, Morgan-Kaufmann, 1999) has 650 bibliographic references and comprises 680 pages. If the contents of each of the non-book references were to be added as pages of the book, then the resulting book would have roughly 7000 pages, resulting in a book approximately 12 inches thick in physical form. Such a book is described, for example, in U.S. patent application Ser. No. 09/488,563 entitled "A Medium Containing Information Gathered from Material Including a Source and Interface for Graphically Displaying the Information." A portable document reader containing a three-dimensional book of prodigious size would not use nearly as much space.

Figure 27:
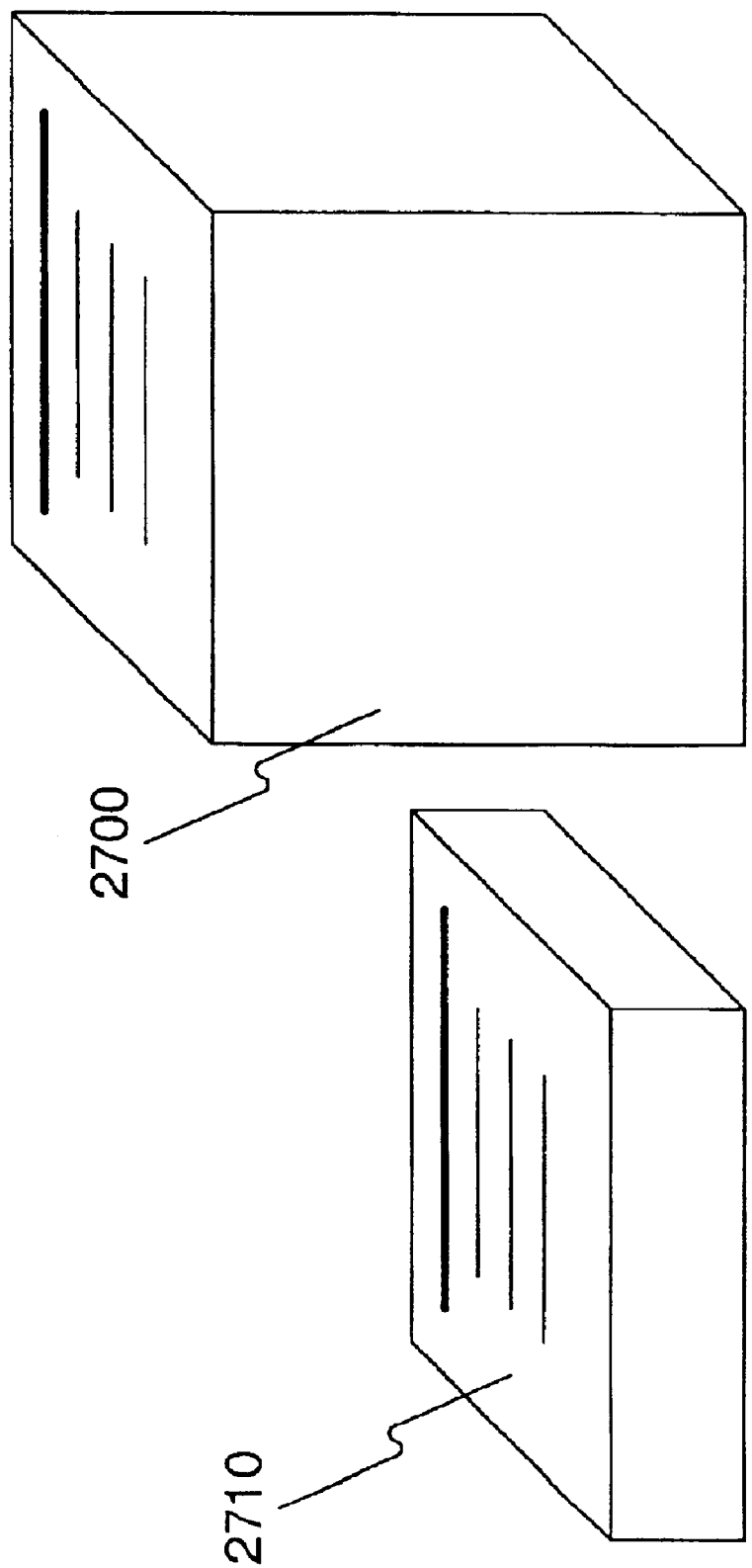
FIG. 27 shows an exemplary ordinary and big book according to the invention.

The adaptation of a large book to the three-dimensional format would provide a prospective view of the large book. An exemplary "big book" is shown as book 2700 in FIG. 27. Because of the size of the side edge of book 2700 is far larger than that of typical book 2710, this side edge may be used to present information about book 2700.

Figure 28B:
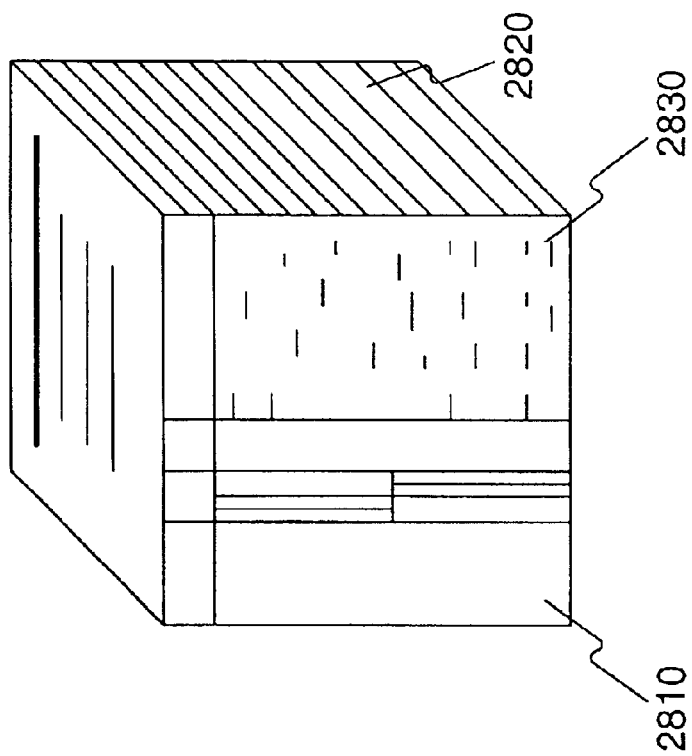
FIGS. 28A and 28B show two alternate display techniques for information about a big book according to the invention.
Figure 28A:
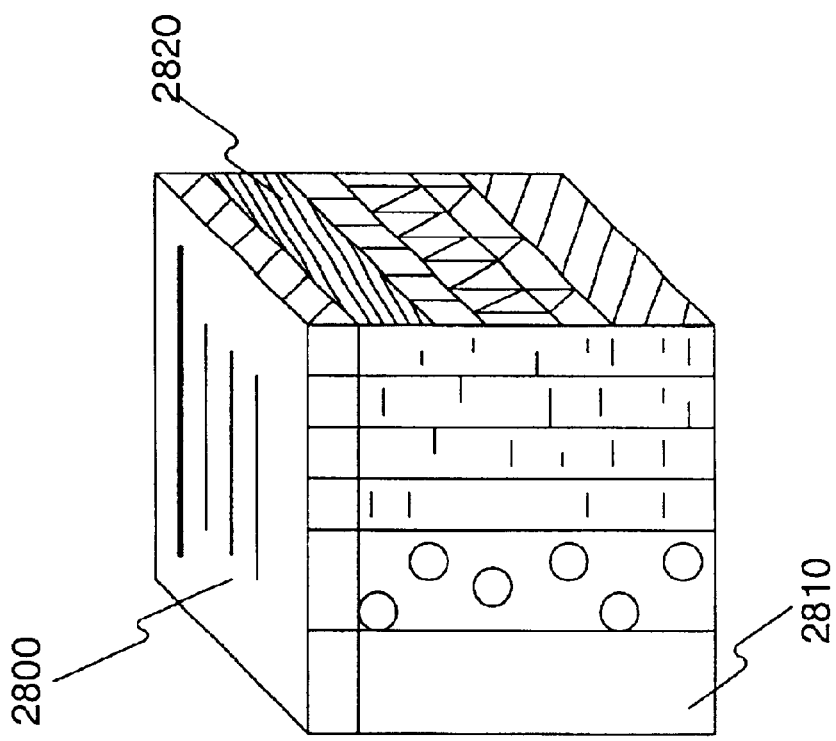

As shown in FIG. 28, the two visible side edges of book 2800 can be used to provide content information about book 2800. One surface 2810 may be used, for example, for displaying a "table image" or "table lens" as described in U.S. Pat. No. 5,632,009; U.S. Pat. No. 5,880,742; U.S. Pat. No. 5,883,635; and U.S. Pat. No. 6,085,202. The data shown on the side surface displays meta-data about references in the book. A second surface 2820 of the book may be used with colored or textured bands describing the sections/subsection structure of book 2800. In FIG. 28A, the table image 2810 has one state. In FIG. 28B, the user has focused on the variable in column 2830 causing that column to expand while the other columns contract. Similarly, the information 2820 has also changed state.

Figure 29:
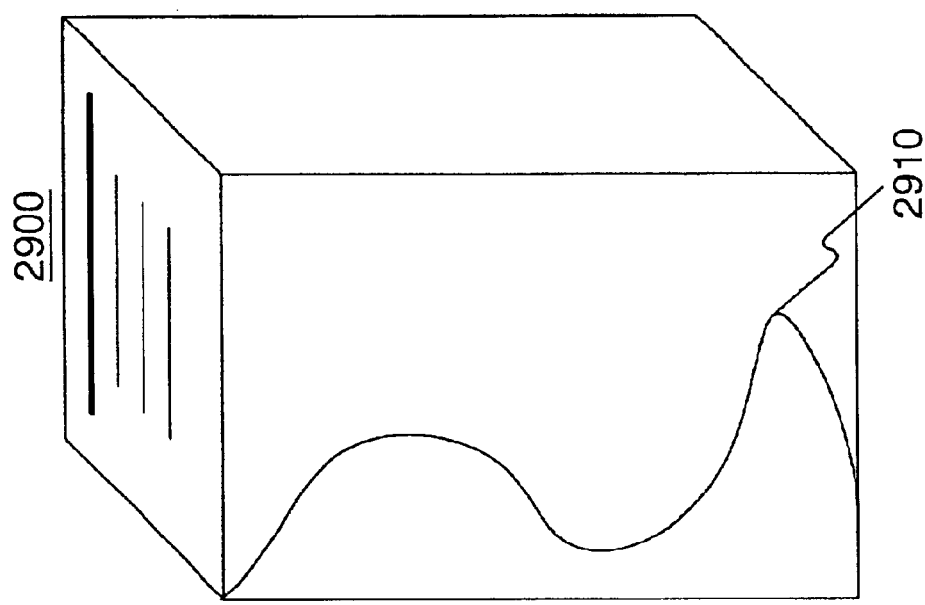
FIG. 29 shows a display technique for information about a big book according to the invention.

Alternatively, graphical and/or numeric data can be displayed on a side surface of book 2900 as shown in FIG. 29. The numeric data may represent, for example, the usage of a search term within the book displayed as a graph 2910. The graph represents how frequently a search term is used in the text of book 2900 on a page-by-page, chapter-by-chapter, section-by-section, or other such basis. Alternatively, a single- or multiple-page window may be passed over the text of the document to create a moving average trend for search term use frequency. In this way, page-to-page variability within the graph can be smoothed in order to more clearly represent trends in search term frequency.

Figure 30:
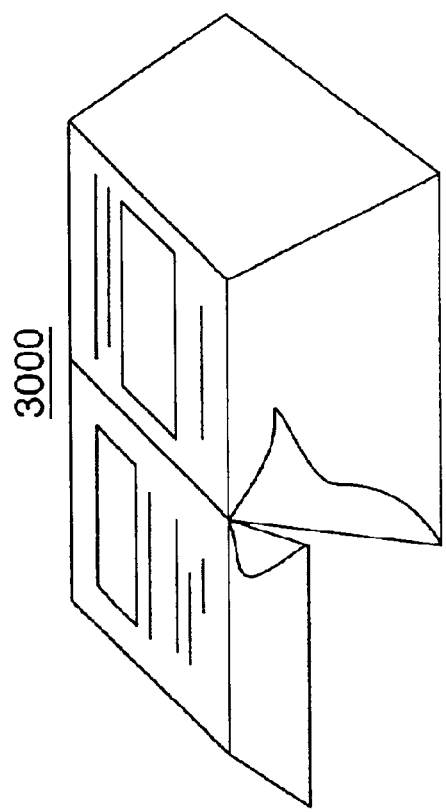
FIG. 30 shows a display method for a big book in angled format according to the invention.
Figure 31:
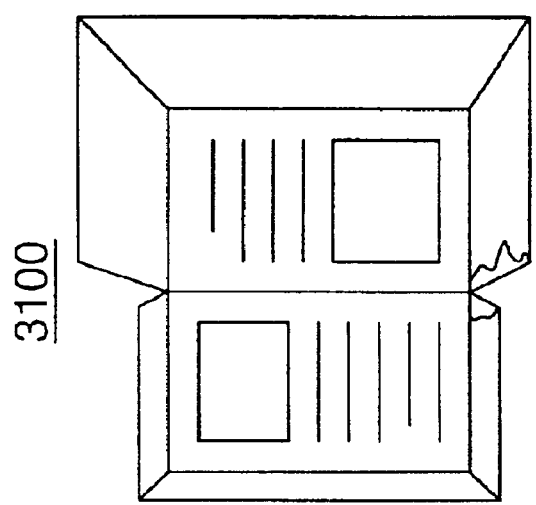
FIG. 31 shows a display method for a big book in vertical view format according to the invention.

Because the side edge of the book when displayed for reading, i.e., parallel to the surface of the display, the side edge may not provide sufficient room to display the information. The three-dimensional book may, therefore, be displayed in an alternate form, wherein the side edge of the book is expanded to provide the needed surface area. An exemplary side expanded book 3000 (splayed edge book) is shown in FIG. 30. When angled toward the viewer for reading, the book 3100 would be displayed as shown in FIG. 31.

The use of the side edge of the big book could be used with the selection of text on the visible page (page in view of the user) and request that the edge of the book provide a visualization that describes some relationship between the selected text and the content of the book. The program could calculate a similarity-based semantic relationship between the search term and the text of pages, groups of pages, chapter etc., and thereafter draw the calculated similarity values on the side edge.

Figure 32:
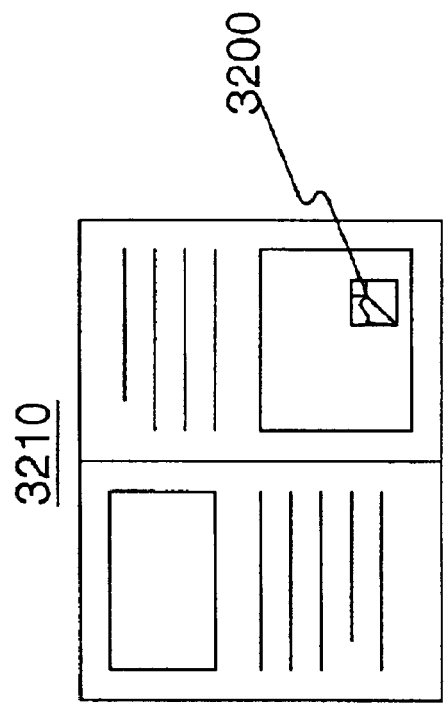
FIG. 32 shows a display method for a big book including a cutout portion according to the invention.
Figure 33:
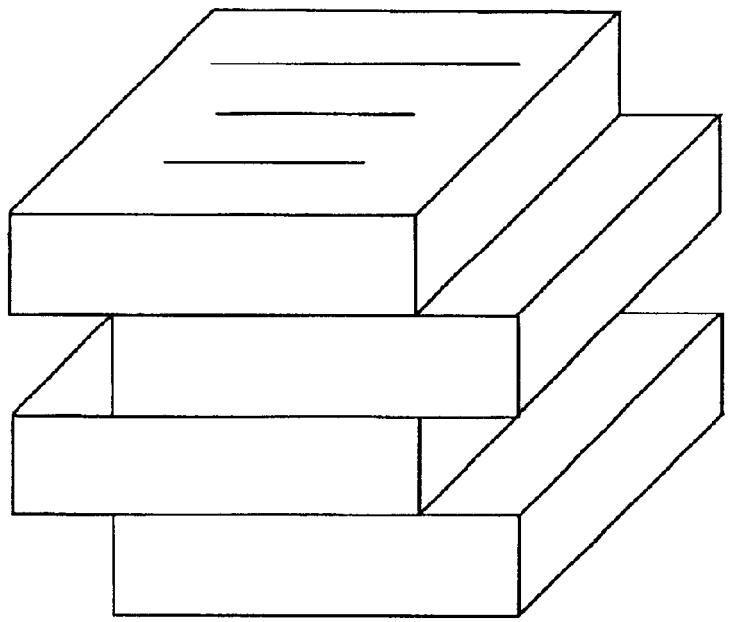
FIG. 33 shows a display method for a big book in a stacked format according to the invention.
Figure 34:
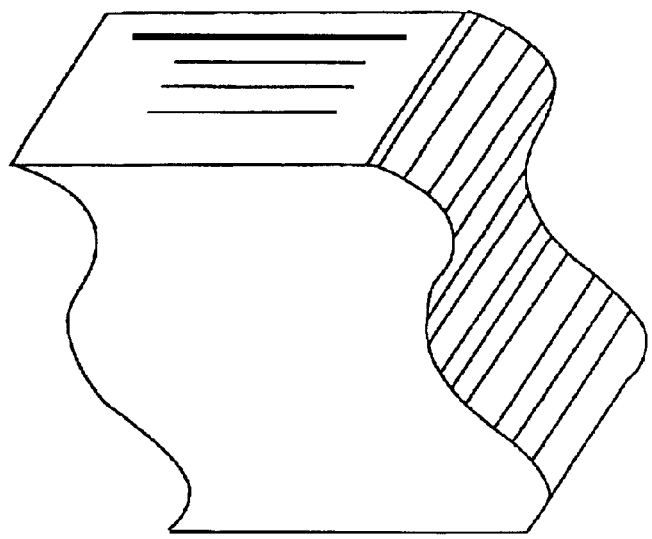
FIG. 34 shows a display method for a big book in a continuous adjustment format according to the invention.

If the splayed edge book shown in FIG. 30 would require too much of the available display space, the book may be depicted with an iconic hole 3200 to provide the graphical information that would otherwise be shown on the side of the book. An exemplary book 3210 with an iconic hole 3200 is shown in FIG. 32. If a search word is used to generate the information, the hole could be shown next to the search word. As shown in FIG. 33, the side edge of the book may be shown as stacks of pages displaced horizontally. The separate stacks 3300 may be sections, chapters, sub-chapters etc. of the book. Alternatively, continuous adjustment of horizontal stack position may be used as shown in FIG. 34. This continuous adjustment could comprise stacks of virtual pages arranged to substantially define a graphical display of information relating to the virtual three-dimensional book. For example, the stack could assume the shape of a graph representing, on the horizontal axis, the number of instances of a given search term on each individual virtual page.

It will be apparent to those skilled in the art that various modifications and variations can be made in the virtual three-dimensional book and functions used in cooperation with the display of such a book of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for displaying images of a virtual three-dimensional book having one or more virtual pages, the system comprising:
    a display system capable of executing a display program,
    wherein images of the virtual three-dimensional book are produced on the display system, and
    wherein a magnification function is provided for dividing a virtual page into a plurality of rectangular sections, and
    wherein the magnification function comprises a piecewise step function along one or both of a horizontal or a vertical axis of the virtual page, such that at least one magnified region of the page is directly magnified, while one or more regions vertically adjacent the magnified region are directly magnified in a horizontal direction but demagnified in a vertical direction, and one or more regions horizontally adjacent the magnified region are directly magnified at the same magnification level of the magnified region in a vertical direction, but demagnified in a horizontal direction.

2. The system of claim 1 wherein the magnification function includes a process capable of resizing the magnified region.

3. The system of claim 1 wherein the magnification function includes a process capable of relocating the magnified regions by a dragging operation across the regions of the virtual page.

4. The system of claim 1 wherein the magnification function includes a process capable of relocating the magnified regions by a clicking operation that relocates the magnified region a set distance along the virtual page.

5. The system of claim 1 wherein the magnification function includes a process capable of relocating the magnified regions by a clicking operation that relocates the magnified region on a subsequent region of the virtual page.

6. The system of claim 5 wherein the subsequent region is a paragraph of the virtual page.

7. The system of claim 6 wherein the magnification function includes a process capable of resizing the magnified region to fit the paragraph of the virtual page.

8. The system of claim 1 wherein the magnification function includes a process capable of relocating the magnified regions using a constant speed operation.

9. The system of claim 1 wherein the magnification function includes a process capable of relocating the magnified regions using an eye-tracking device.

10. The system of claim 9 wherein the eye-tracking device includes a delay.

11. The system of claim 1 wherein in the magnification function includes a process capable of relocating the magnified regions using an eye-tracking device and a constant speed operation.

12. A system for displaying images of a virtual three-dimensional book having one or more virtual pages, the system comprising:
 a display system capable of executing a display program, wherein images of the virtual three-dimensional book are produced on the display system, and
 wherein, with respect to a partial page display, a tilting function is provided to rotate a virtual page in three-dimensional space about a central axis of the virtual page to accommodate viewing of a full page view of all information on the virtual page that is associated with the partial page information initially displayed, the tilting function being executed via user input that causes information previously unseen via the partial page display to be tilted forward in virtual three-dimensional space and thereby become readable to the user.

13. The system of claim 12 wherein a virtual page is tilted forward about a horizontal central axis to accommodate viewing of a top portion of the virtual page.

14. The system of claim 12 wherein a virtual page is tilted backward about a horizontal central axis to accommodate viewing of a bottom portion of the virtual page.

15. The system of claim 12 wherein a virtual page is tilted clockwise about a vertical central axis to accommodate viewing of a right portion of the virtual page.

16. The system of claim 12 wherein a virtual page is tilted counterclockwise about a vertical central axis to accommodate viewing of a left portion of the virtual page.

17. The system of claim 12 wherein the tilted virtual page comprises a first portion closer to a user than a second portion in three dimensional space, the first portion comprising larger print than the second portion of the tilted virtual page.

18. A computer program product comprising:
 a computer usable medium having computer readable code embodied therein for producing images of a virtual three-dimensional book having one or more virtual pages on a display device, the computer readable code comprising:
 a magnification function for providing a virtual magnifier movable over the one more virtual pages, the virtual magnifier comprising:
 a central region for providing direct magnification for a desired portion of a virtual page; and
 one or more transition regions surrounding the central region for providing differential magnification for transitioning from direct magnification adjacent the central region to no magnification at the edge of the virtual magnifier, wherein portions of the virtual pages displayed within the transition regions are specified by a transfer function that provides magnification fall off such that no part of the virtual page is obscured.

19. The computer program product of claim 18 wherein the virtual magnifier substantially defines a virtual pyramidic solid.

20. A computer program product comprising:
 a computer usable medium having computer readable code embodied therein for producing images of a virtual three-dimensional book having one or more virtual pages on a display device, the computer readable code comprising:
 a magnification function for dividing a virtual page into a plurality of rectangular sections,
 wherein the magnification function comprises a piecewise step function along one or more of a horizontal or vertical axis of the virtual page, such that at least one magnified region of the page is directly magnified, while one or more regions vertically adjacent the magnified region are directly magnified in a horizontal direction but demagnified in a vertical direction, and one or more regions horizontally adjacent the magnified region are directly magnified at the same magnification level of the magnified region in a vertical direction, but demagnified in a horizontal direction.

21. The computer program product of claim 20 wherein the magnification function includes a process capable of resizing the magnified region.

22. The computer program product of claim 20 wherein the magnification function includes a process capable of relocating the magnified regions by a dragging operation across the regions of the virtual page.

23. The computer program product of claim 20 wherein the magnification function includes a process capable of relocating the magnified regions by a clicking operation that relocates the magnified region a set distance along the virtual page.

24. The computer program product of claim 20 wherein the magnification function includes a process capable of relocating the magnified regions by a clicking operation that relocates the magnified region on a subsequent region of the virtual page.

25. The computer program product of claim 24 wherein the subsequent region is a paragraph of the virtual page.

26. The computer program product of claim 25 wherein the magnification function includes a process capable of resizing the magnified region to fit the paragraph of the virtual page.

27. The computer program product of claim 20 wherein the magnification function includes a process capable of relocating the magnified regions using a constant speed operation.

28. The computer program product of claim 20 wherein the magnification function includes a process capable of relocating the magnified regions using an eye-tracking device.

29. The computer program product of claim 28 wherein the eye-tracking device is configured to include a delay.

30. The computer program product of claim 20 wherein in the magnification function includes a process capable of relocating the magnified regions using an eye-tracking device and a constant speed operation.

31. A computer program product comprising:
 a computer usable medium having computer readable code embodied therein for producing images of a virtual three-dimensional book having one or more virtual pages on a display device, the computer readable code comprising:
 with respect to a partial page display, a tilting function that rotates a virtual page in three-dimensional space about a central axis of the virtual page to accommodate viewing of a full page view of all information on the virtual page that is associated with the partial page information initially displayed, the tilting function being executed via user input that causes information previously unseen via the partial page display to be tilted forward in virtual three-dimensional space and thereby become readable to the user.

32. The computer program product of claim 31 wherein a virtual page is tilted forward about a horizontal central axis to accommodate viewing of a top portion of the virtual page.

33. The computer program product of claim 31 wherein a virtual page is tilted backward about a horizontal central axis to accommodate viewing of a bottom portion of the virtual page.

34. The computer program product of claim 31 wherein a virtual page is tilted clockwise about a vertical central axis to accommodate viewing of a right portion of the virtual page.

35. The computer program product of claim 31 wherein a virtual page is tilted counterclockwise about a vertical central axis to accommodate viewing of a left portion of the virtual page.

36. The computer program product of claim 31 wherein the tilted virtual page comprises a first portion closer to a user than a second portion in three dimensional space, the first portion comprising larger print than the second portion of the tilted virtual page.

* * * * *